US012496561B2

(12) United States Patent
Kirby et al.

(10) Patent No.: US 12,496,561 B2
(45) Date of Patent: Dec. 16, 2025

(54) VORTEX MIXERS AND ASSOCIATED METHODS, SYSTEMS, AND APPARATUSES THEREOF

(71) Applicant: ModernaTX, Inc., Cambridge, MA (US)

(72) Inventors: Stephanie Kirby, Medford, MA (US); Benjamin Geldhof, Cambridge, MA (US); Kaelyn Vik, Cambridge, MA (US); Brie Skinner, Topsfield, MA (US)

(73) Assignee: ModernaTX, Inc., Cambridge, MA (US)

( * ) Notice: Subject to any disclaimer, the term of this patent is extended or adjusted under 35 U.S.C. 154(b) by 848 days.

(21) Appl. No.: 17/424,799

(22) PCT Filed: Jan. 31, 2020

(86) PCT No.: PCT/US2020/016150
§ 371 (c)(1),
(2) Date: Jul. 21, 2021

(87) PCT Pub. No.: WO2020/160430
PCT Pub. Date: Aug. 6, 2020

(65) Prior Publication Data

US 2022/0126244 A1 Apr. 28, 2022

Related U.S. Application Data

(60) Provisional application No. 62/886,592, filed on Aug. 14, 2019, provisional application No. 62/799,636, filed on Jan. 31, 2019.

(51) Int. Cl.
*B01F 25/10* (2022.01)
*B01F 33/30* (2022.01)
(Continued)

(52) U.S. Cl.
CPC ............ *B01F 25/104* (2022.01); *B01F 33/30* (2022.01); *B01F 33/811* (2022.01); *B01F 33/813* (2022.01); *B01F 2101/22* (2022.01)

(58) Field of Classification Search
CPC ...... B01F 25/104; B01F 25/10; B01F 25/102; B01F 33/30; B01F 33/811; B01F 2101/22
See application file for complete search history.

(56) References Cited

U.S. PATENT DOCUMENTS 5,013,497 A * 5/1991 Yiournas ................ B01F 25/10
514/963
7,837,379 B2 * 11/2010 Fiering .................. B01F 33/30
366/337

(Continued)

FOREIGN PATENT DOCUMENTS

CN 101939087 A 1/2011
CN 107020029 A 8/2017

(Continued)

*Primary Examiner* — Claire X Wang
*Assistant Examiner* — Patrick M McCarty
(74) *Attorney, Agent, or Firm* — Foley & Lardner LLP; Michael L. Jespersen

(57) ABSTRACT

A vortex mixer may have a vortex mixing chamber having a first wall, a second wall, and a side wall connecting the first wall and the second wall. At least two inlet ports may be configured along the side wall, each inlet port having an inlet channel connected thereto. The at least two inlet ports may be approximately equally spaced around the vortex mixing chamber and configured tangentially to the vortex mixing chamber. An exit port may have an exit channel connected thereto. The exit port may be configured at a radial center of the second wall, and the exit channel may extend from the exit port and away from the vortex mixing chamber.

28 Claims, 39 Drawing Sheets

Specification includes a Sequence Listing.

(51) Int. Cl.
*B01F 33/81* (2022.01)
*B01F 101/22* (2022.01)

(56) References Cited

U.S. PATENT DOCUMENTS

| | | | | |
|---|---|---|---|---|
| 8,158,601 | B2 | 4/2012 | Chen et al. | |
| 9,693,958 | B2 | 7/2017 | Zhu | |
| 2001/0048900 | A1 * | 12/2001 | Bardell | F16K 99/0001 422/400 |
| 2010/0051543 | A1 | 3/2010 | Futami et al. | |
| 2013/0037977 | A1 * | 2/2013 | Burke | A61K 9/127 977/840 |
| 2015/0124554 | A1 * | 5/2015 | Haden | B01F 23/451 366/165.1 |
| 2016/0207013 | A1 | 7/2016 | Livshits | |
| 2016/0250606 | A1 * | 9/2016 | Nasman | B01F 25/432 366/173.1 |
| 2017/0281543 | A1 * | 10/2017 | Sugiyama | B01J 13/08 |
| 2018/0043320 | A1 * | 2/2018 | Ramsay | B01F 33/813 |
| 2018/0360956 | A1 * | 12/2018 | Didierlaurent | A61K 39/02 |

FOREIGN PATENT DOCUMENTS

| | | | | |
|---|---|---|---|---|
| CN | 206549481 | U | | 10/2017 |
| EP | 2 090 353 | A1 | | 8/2009 |
| EP | 2 123 349 | A2 | | 11/2009 |
| GB | 2282546 | A | | 4/1995 |
| JP | H04245991 | A | | 9/1992 |
| JP | 2008086889 | A | | 4/2008 |
| JP | 2018158291 | A | | 10/2018 |
| KR | 20110064080 | A | * | 6/2011 |
| WO | WO-2004054696 | A1 | | 7/2004 |
| WO | WO-2007150030 | A2 | | 12/2007 |
| WO | WO-2008108881 | A2 | | 9/2008 |
| WO | WO-2012099755 | A1 | | 7/2012 |
| WO | WO-2014152200 | A1 | | 9/2014 |
| WO | WO-2015130584 | A2 | | 9/2015 |
| WO | WO-2016176505 | A1 | | 11/2016 |
| WO | WO-2017049245 | A2 | | 3/2017 |
| WO | WO-2017062513 | A1 | | 4/2017 |
| WO | WO-2017099823 | A1 | | 6/2017 |
| WO | WO-2017112865 | A1 | | 6/2017 |
| WO | WO-2017192470 | A1 | | 11/2017 |
| WO | WO-2018170306 | A1 | | 9/2018 |
| WO | WO-2018170336 | A1 | | 9/2018 |
| WO | WO-2018232120 | A1 | | 12/2018 |
| WO | WO-2020061367 | A1 | | 3/2020 |
| WO | WO-2021055835 | A1 | | 3/2021 |
| WO | WO-2021055849 | A1 | | 3/2021 |
| WO | WO-2023114889 | A1 | | 6/2023 |
| WO | WO-2023193002 | A1 | | 10/2023 |
| WO | WO-2024091918 | A2 | | 5/2024 |

* cited by examiner

| Scale | 0.3X | 0.5X | 1X | 2X | 4X |
|---|---|---|---|---|---|
| Exit channel/exit port diameter (mm) | 0.33 | 0.5 | 1 | 2 | 4 |
| Minimum Flow Rate (ml/min) | 17 | 50 | 160 | 750 | 5,000 |
| Minimum batch size (as set by mg lost in startup) | 1 | 5 | 10 | 50 | 200 |
| Maximim batch size (g in 4 hr mix) | 1.5 | 1.5 | 5 | 24 | 96 |

*FIG. 16A*

| Mixer Exit Port/Exit Channel Diameter | Effective Velocity Adjustment |
|---|---|
| 1.0mm | 100% |
| 2.0mm | 90% |
| 4.0mm | 70% |

| Mixer Exit Port/Exit Channel Diameter | Minimum Total Flow Rate (ml/min) |
|---|---|
| 0.3mm | 17 |
| 0.5mm | 50 |
| 1.0mm | 160 |
| 2.0mm | 750 |
| 4.0mm | 5000 |

502

1002

VORTEX MIXERS AND ASSOCIATED METHODS, SYSTEMS, AND APPARATUSES THEREOF

CROSS-REFERENCE TO RELATED APPLICATIONS

This application is a U.S. National Phase application, filed under 35 U.S.C. § 371, on International Application No. PCT/US2020/016150, filed Jan. 31, 2020, which claims the priority to and the benefit of U.S. Provisional Application No. 62/799,636, entitled "VORTEX MIXERS AND ASSOCIATED METHODS, SYSTEMS, AND APPARATUSES THEREOF" and filed on Jan. 31, 2019 and U.S. Provisional Application No. 62/886,592, entitled "VORTEX MIXERS AND ASSOCIATED METHODS, SYSTEMS, AND APPARATUSES THEREOF" and filed on Aug. 14, 2019, the disclosures of which are hereby incorporated by reference in their entireties.

INCORPORATION BY REFERENCE OF SEQUENCE LISTING

The contents of the text file named "MRNA-064_N01US_SeqList.txt", which was created on Jul. 12, 2021 and is 736 bytes in size, are hereby incorporated by reference in their entirety.

FIELD OF THE DISCLOSURE

The present disclosure relates to vortex mixers and associated methods, systems, and apparatuses thereof.

BACKGROUND

A vortex mixer rapidly spins fluid in order to cause a change in the fluids. A vortex mixer may receive multiple fluids and may be used to mix the multiple fluids together. In a vortex mixer having multiple inlets, a vortex mixer may receive more than one fluid and may be used to mix fluids together.

SUMMARY OF SOME OF THE EMBODIMENTS

Some embodiments of this disclosure present vortex mixers and associated methods, systems, and apparatuses thereof.

In some embodiments, a vortex mixer may have a vortex mixing chamber having a first wall, a second wall, and a side wall connecting the first wall and the second wall. At least two inlet ports may be configured along the side wall, and each inlet port may have an inlet channel connected thereto. The at least two inlet ports may be approximately equally spaced around the vortex mixing chamber and may be configured tangentially to the vortex mixing chamber. An exit port that has an exit channel connected thereto may be configured at a radial center of the second wall. The exit channel may extend from the exit port and away from the vortex mixing chamber.

In some embodiments, the vortex mixing chamber may be round and the side wall may extend around the circumference of the first wall and the second wall.

Each inlet channel may receive fluid from a single source, or each inlet channel may receive fluid from a different source.

In some implementations, the vortex mixer may have four inlet ports. A first two of the four inlet ports may receive fluid from a first source, while the second two of the four inlet ports receive fluid from a second source. The first two inlet ports may be configured opposite each other, and the second two inlet ports may be configured opposite each other, such that the first two inlet ports are about 180 degrees apart and the second two inlet ports are about 180 degrees apart, while each of the first two inlet ports is about 90 degrees from each of the second two inlet ports. Alternatively, each of the four inlet ports may receive fluid from a separate source. A first two of the four inlet ports may receive a first fluid and a second two of the four inlet ports may receive a second fluid. The first two inlet ports are configured opposite each other and the second two inlet ports are configured opposite each other, such that the first two inlet ports are about 180 degrees apart and the second two inlet ports are about 180 degrees apart, and each of the first two inlet ports is about 90 degrees from each of the second two inlet ports.

The exit port and the exit channel may be at an about 90-degree angle from the second wall.

In some embodiments, the height of the side wall may be the same as the height of the at least two inlet ports. In other implementations, the height of the side wall may be greater than the height of the at least two inlet ports.

In some embodiments, the exit port may have a diameter of x, the first wall and the second wall may have a diameter of 5*x, the side wall may have a height of 1.75*x, and the at least two inlet ports may have a height of 0.75*x. In various implementations, the value of x may be 1 mm, 2 mm, 4 mm, 5 mm, or 0.5 mm.

A mixing system may have an initial vortex mixer and a subsequent vortex mixer. The initial vortex mixer may have a vortex mixing chamber with a first wall, a second wall, and a side wall connecting the first wall and the second wall. At least two inlet ports may be configured along the side wall with each inlet port having an inlet channel connected thereto. The at least two inlet ports may be equally spaced around the vortex mixing chamber and configured tangentially to the vortex mixing chamber. An exit port that has an exit channel connected thereto may be configured at a radial center of the second wall. The channel may extend from the exit port and away from the vortex mixing chamber.

The subsequent vortex mixer may have a vortex mixing chamber with a first wall, a second wall, and a side wall that connects the first wall and the second wall. At least two inlet ports may be configured along the side wall, and each inlet port may have an inlet channel connected thereto. The at least two inlet ports may be approximately equally spaced around the vortex mixing chamber and configured tangentially to the vortex mixing chamber. The subsequent vortex mixer may also have an additional inlet port, and an exit port that has an exit channel connected thereto. The exit port may be configured at the center of the second wall, and the channel may extend from the exit port and away from the vortex mixing chamber.

In some embodiments, the additional inlet port may be configured at a radial center of the first wall of the subsequent vortex mixer. The additional inlet port may be connected to the channel extending from the initial vortex mixer exit port.

A splitter may be configured at an end of the exit channel extending from the initial vortex mixer exit port, and the splitter may have a first outlet and a second outlet. The first outlet may be connected to a first of the at least two inlet ports and the second outlet may be connected to a second of the at least two inlet ports. The additional inlet port may be connected to an additional inlet channel.

In some embodiments, the subsequent vortex mixer may comprise a second additional inlet port. The additional inlet port and the second additional inlet port may be configured along the side wall and may be approximately equally spaced around the vortex mixing chamber and configured tangentially to the vortex mixing chamber. In some embodiments, the subsequent vortex mixer has two inlet ports, the additional inlet port, and the second additional inlet port, each of which are spaced around the vortex mixing chamber such that the inlet ports are each about 90 degrees apart. Some implementations also include a second splitter, wherein the second splitter has a first outlet connected to the additional inlet port and a second outlet connected to the second additional inlet port.

The initial vortex mixer exit port may have a diameter of x, the initial vortex first wall and the initial vortex second wall may have a diameter of 5*x, the initial vortex side wall may have a height of 1.75*x, and the at least two initial vortex inlet ports each have a height of 0.75*x. The subsequent vortex mixer exit port may have a diameter of y, wherein the subsequent vortex mixer first wall and the subsequent vortex mixer second wall may have a diameter of 5*y, the subsequent vortex mixer side wall may have a height of 1.75*y, and the at least two subsequent vortex mixer inlet ports may each have a height of 0.75*y. In some embodiments x and y may be exactly or approximately equal; in other embodiments, x may be greater than y.

The initial vortex mixer and the subsequent vortex mixer may be made from at least one of stainless steel, PEEK, LFEM, acrylic, 3-D printed media, and additive manufacturing material. The initial vortex mixer and the subsequent vortex mixer may be made from the same material.

The initial vortex mixer exit port and the initial vortex exit channel may be at an approximately 90 degree angle from the initial vortex second wall, and the subsequent vortex mixer exit port and the subsequent vortex exit channel may be at an approximately 90 degree angle from the subsequent vortex second wall.

A mixing method may include receiving a first fluid at a first vortex mixing chamber from at least two inlet ports, and receiving a second fluid at the first vortex mixing chamber from at least two inlet ports. The first fluid and second fluid may be mixed in the first vortex mixing chamber to form a first outflow fluid, and the first outflow fluid may flow into a first exit channel. The first outflow fluid may be split into at least two channels by a splitter. The first outflow fluid may be received at a second vortex mixing chamber from at least two inlet ports connected to the at least two channels. A third fluid may be received at the second vortex mixing chamber, and the outflow fluid and the third fluid may be mixed in the second vortex mixing chamber to form a second outflow fluid. The second outflow fluid may flow into a second exit channel.

In some implementations, the first fluid may comprise a buffer and the second fluid may comprise a lipid mixture, and the first outflow fluid comprises empty nanoparticles. The third fluid may comprise nucleic acid (e.g., RNA), and the second outflow fluid may comprise nucleic acid-holding nanoparticles. The nucleic acid may integrate into the nanoparticles by hydrophobic interaction and/or charged interaction. Formation of empty nanoparticles in the initial vortex mixing chamber prior to the nucleic acid being received in the second vortex mixing chamber may prevent direct exposure of the nucleic acid to the buffer before the buffer is mixed with the lipid mixture. Preventing direct exposure of the nucleic acid to the buffer may prevent acidification and/or degradation of the nucleic acid.

BRIEF DESCRIPTION OF SOME OF THE EMBODIMENTS

FIGS. 11A-D show a system of vortex mixers according to some embodiments.

Figure 12:
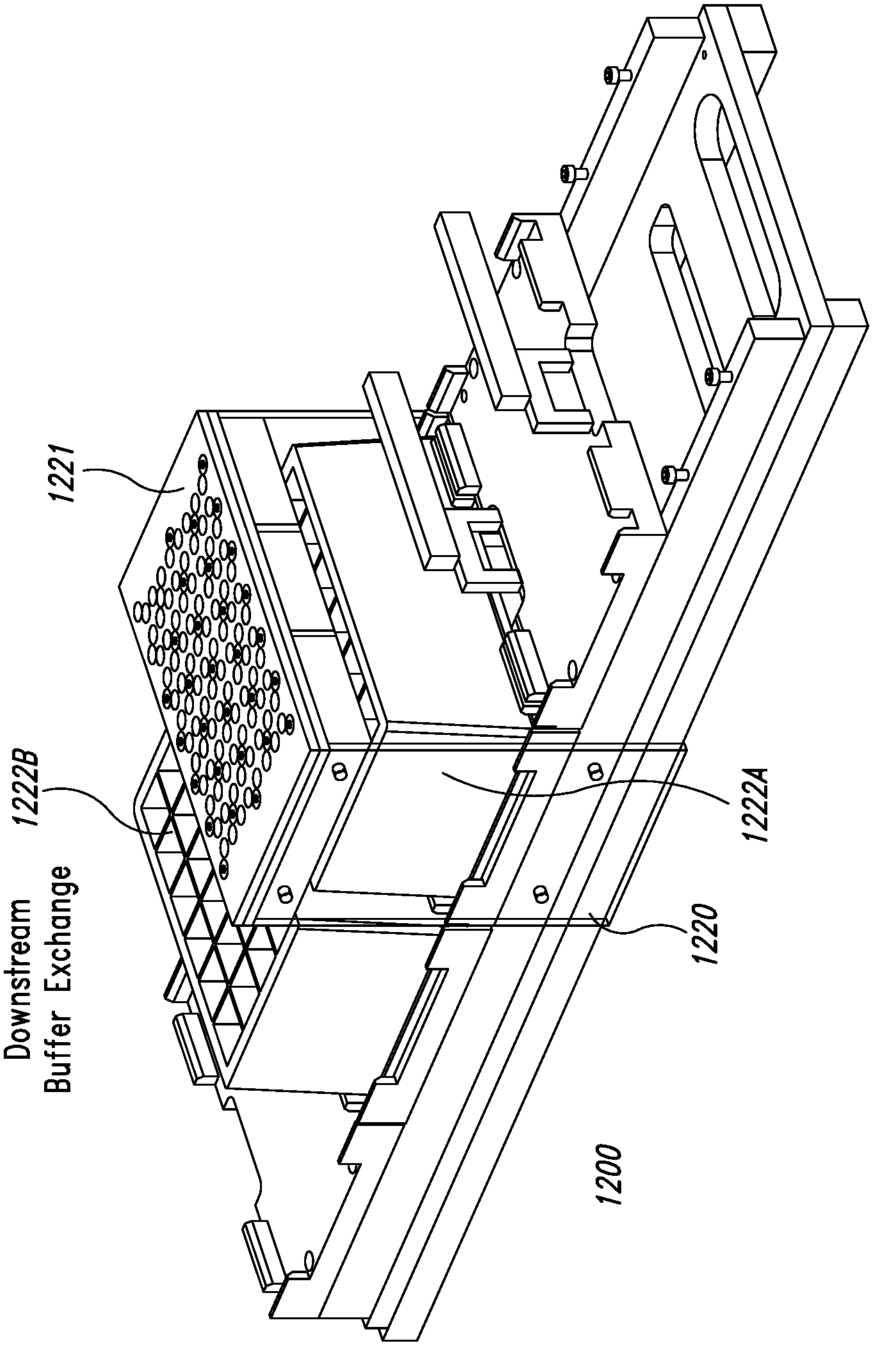

FIG. 12 shows a system of vortex mixers according to some embodiments.

Figure 13B:
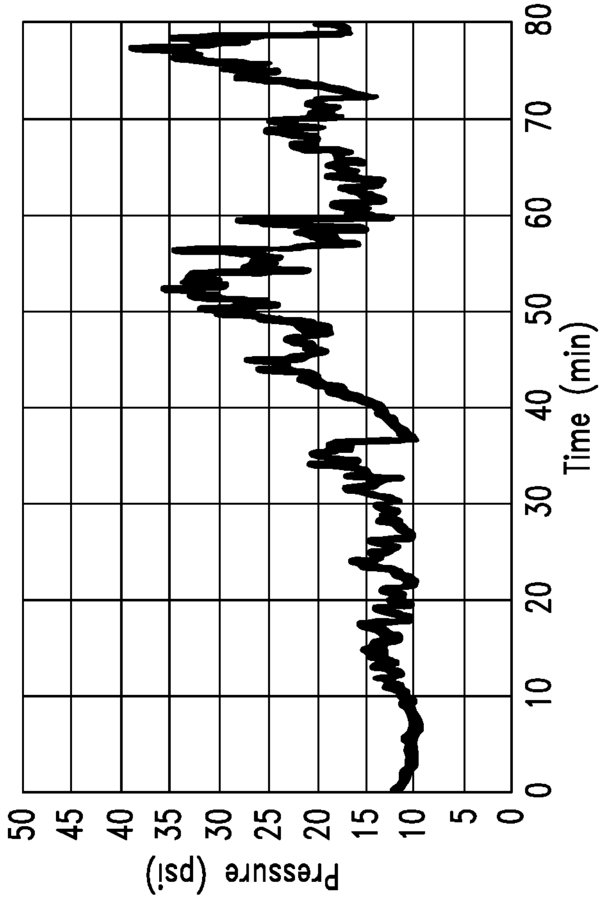
Figure 13A:
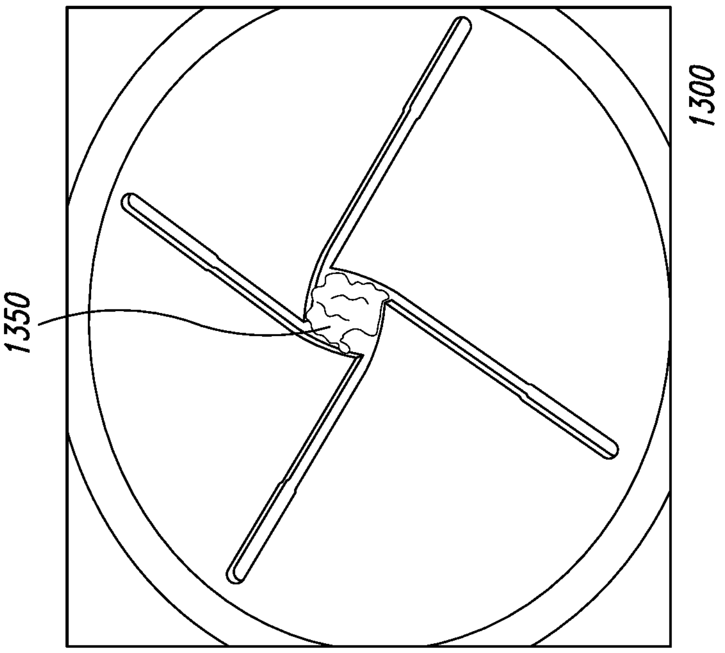

FIG. 13A shows a vortex mixer according to some embodiments.

FIG. 13B shows a time vs. pressure plot according to some embodiments.

Figure 13C:
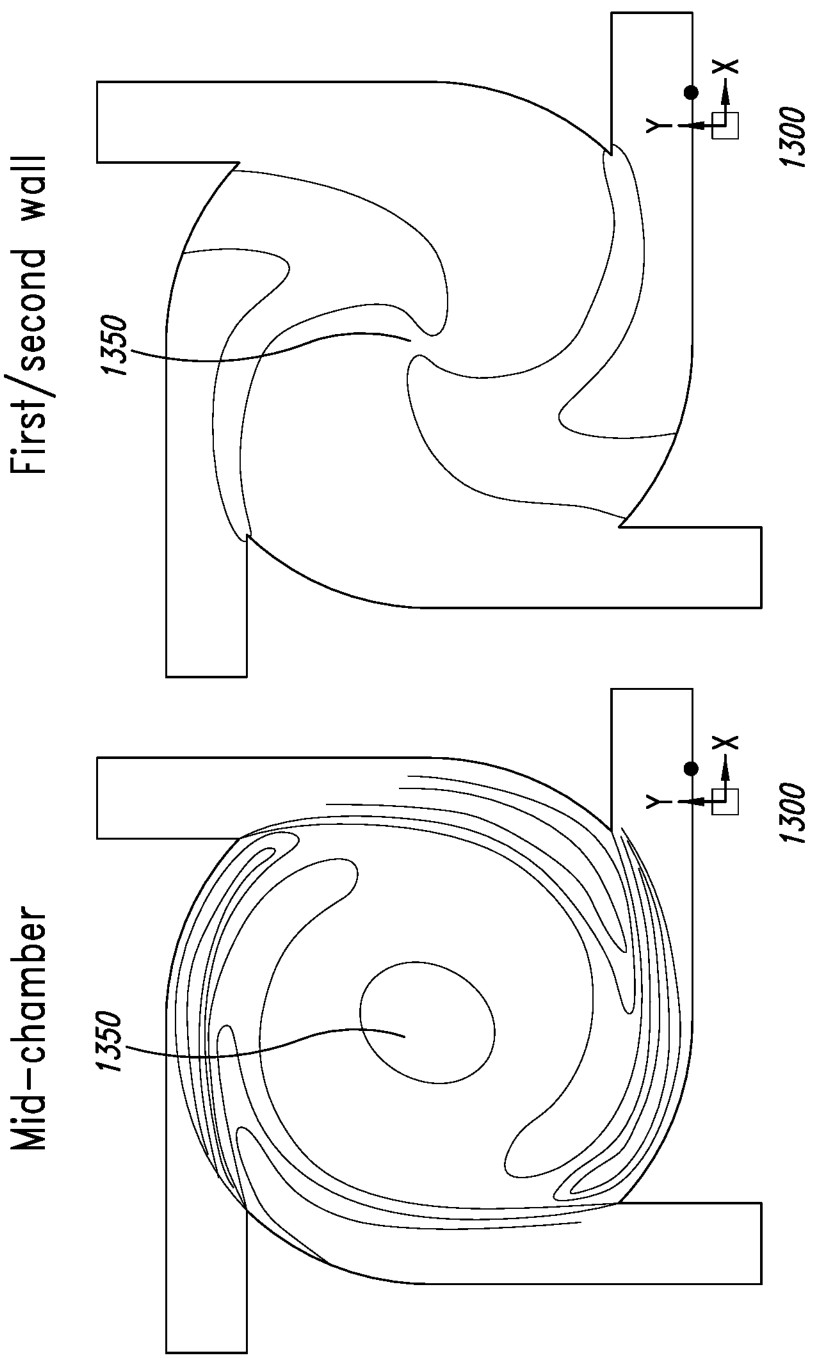

FIG. 13C shows a mass fraction at mid-chamber and at the first and second wall of a vortex mixer, according to some embodiments.

Figure 14B:
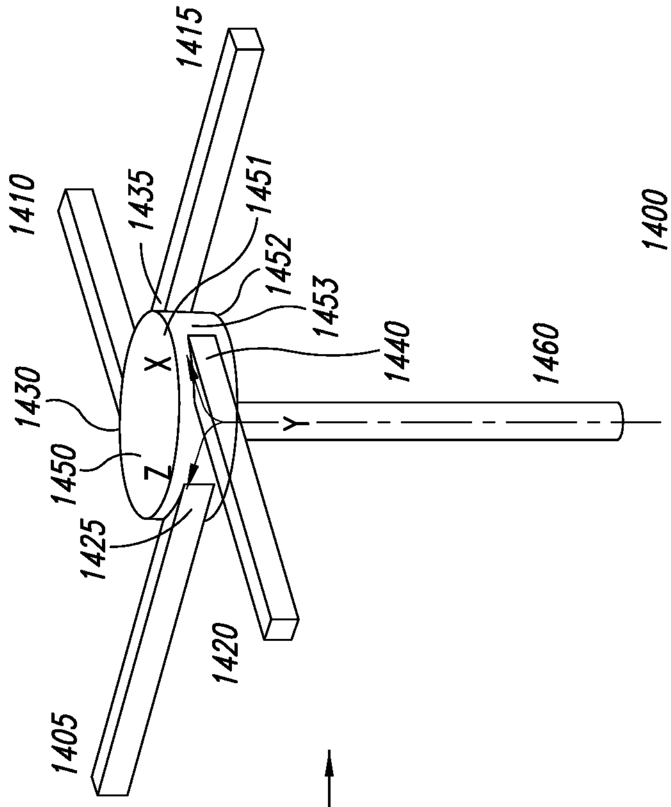
Figure 14A:
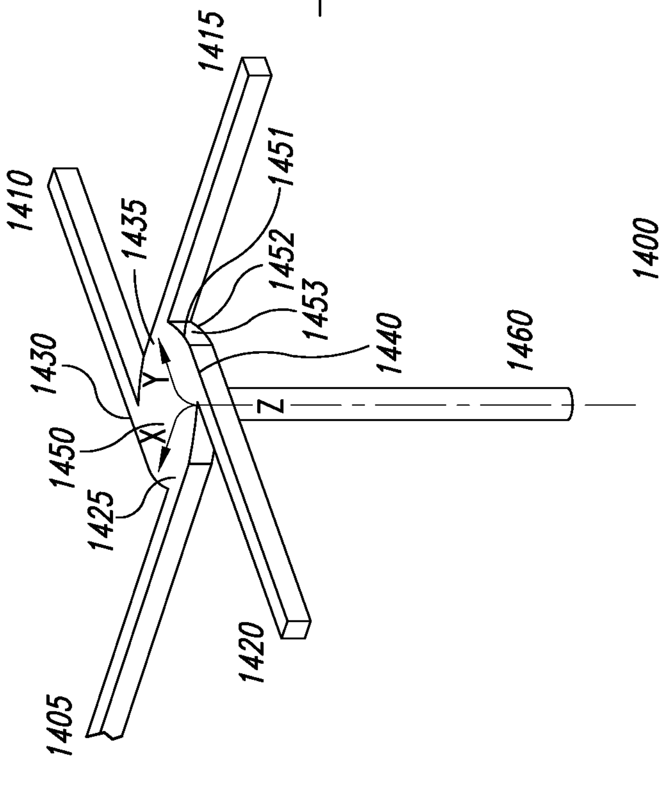

FIGS. 14A-14B show vortex mixers according to some embodiments.

Figure 14C:
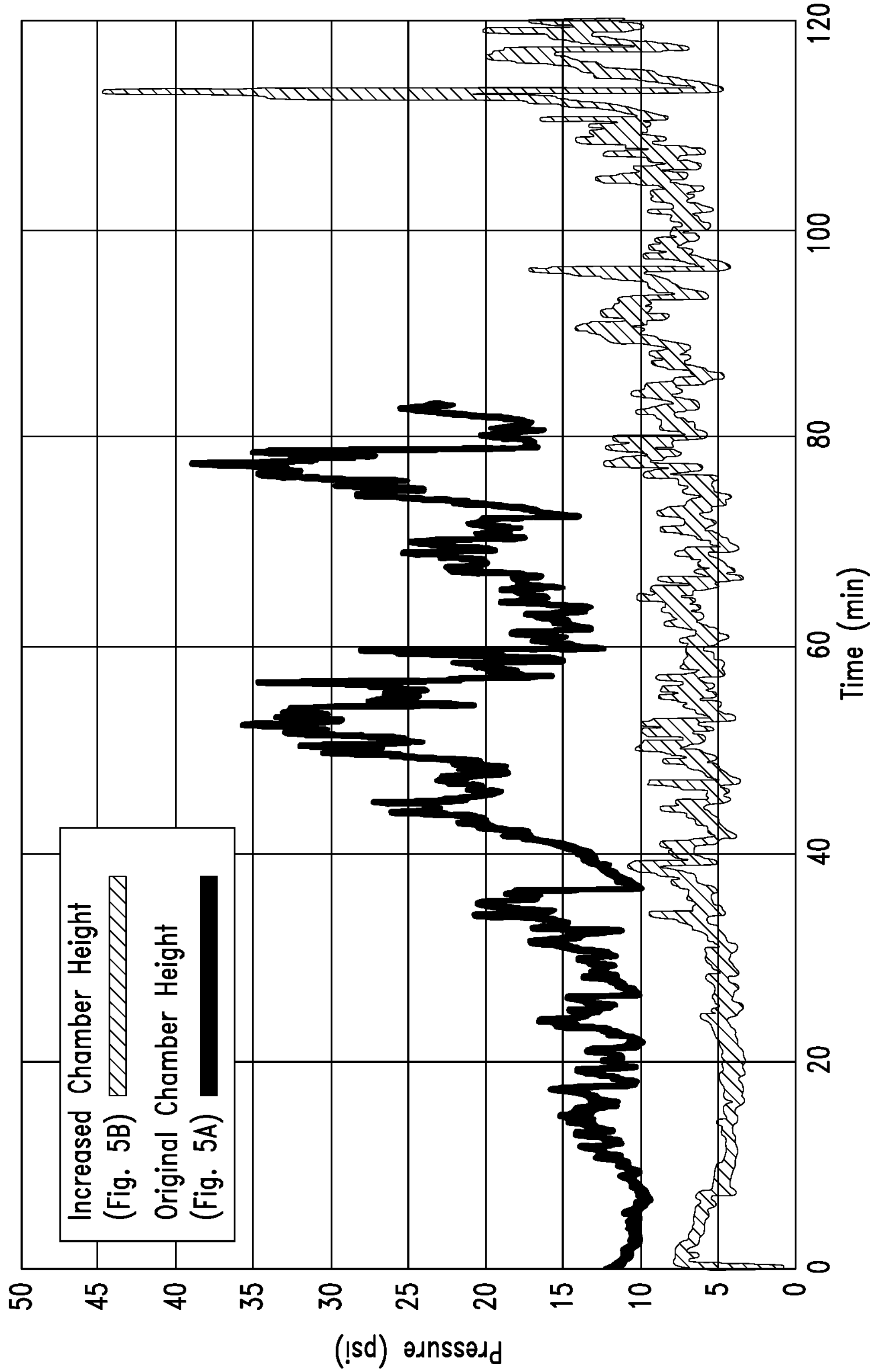

FIG. 14C shows a time vs. pressure plot of the vortex mixers of FIGS. 13A-13B.

Figure 14F:
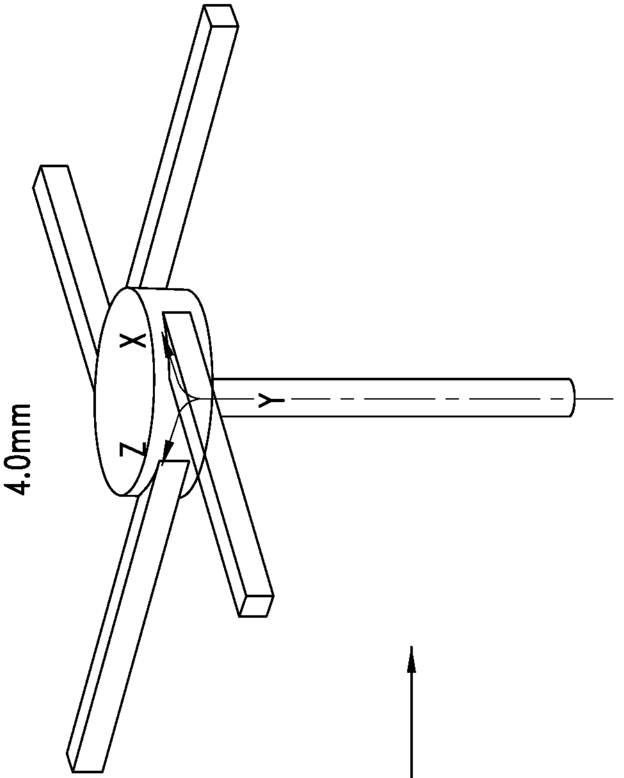
Figure 14E:
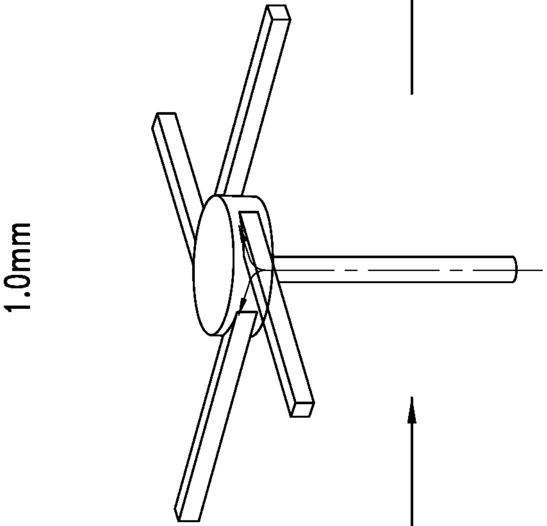
Figure 14D:
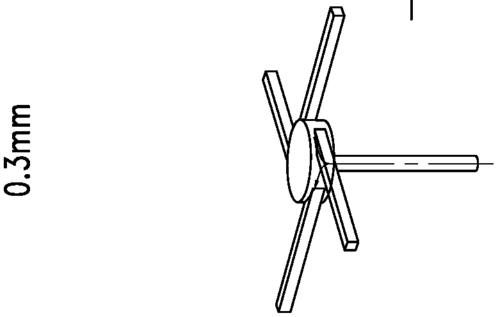

FIGS. 14D-F show vortex mixers according to some embodiments.

Figure 15A:
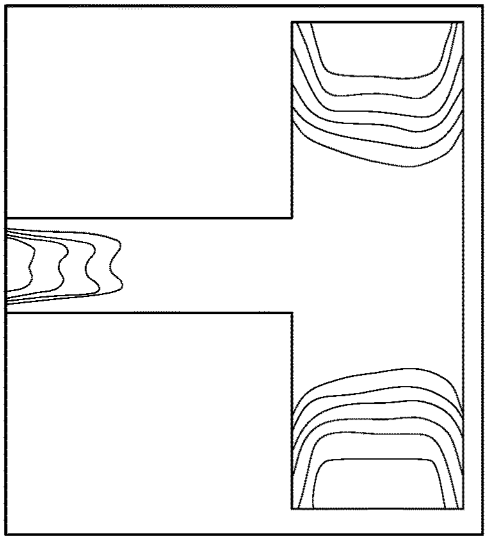
Figure 15B:
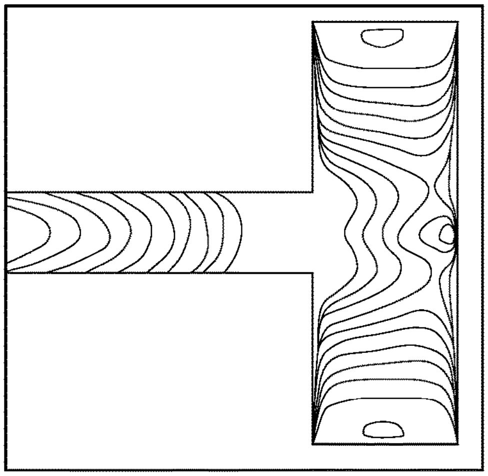
Figure 15C:
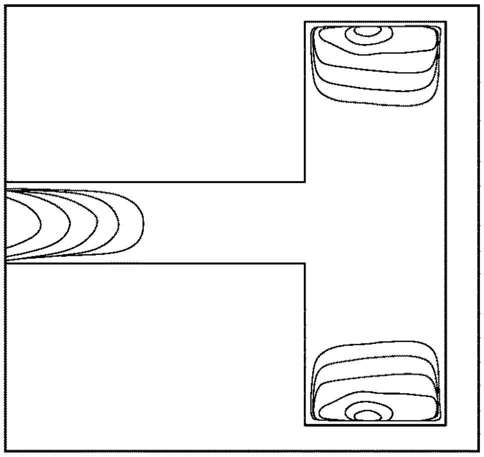

FIGS. 15A-15C show mixing within the vortex mixing chamber at various scales, according to some embodiments.

Figure 15D:
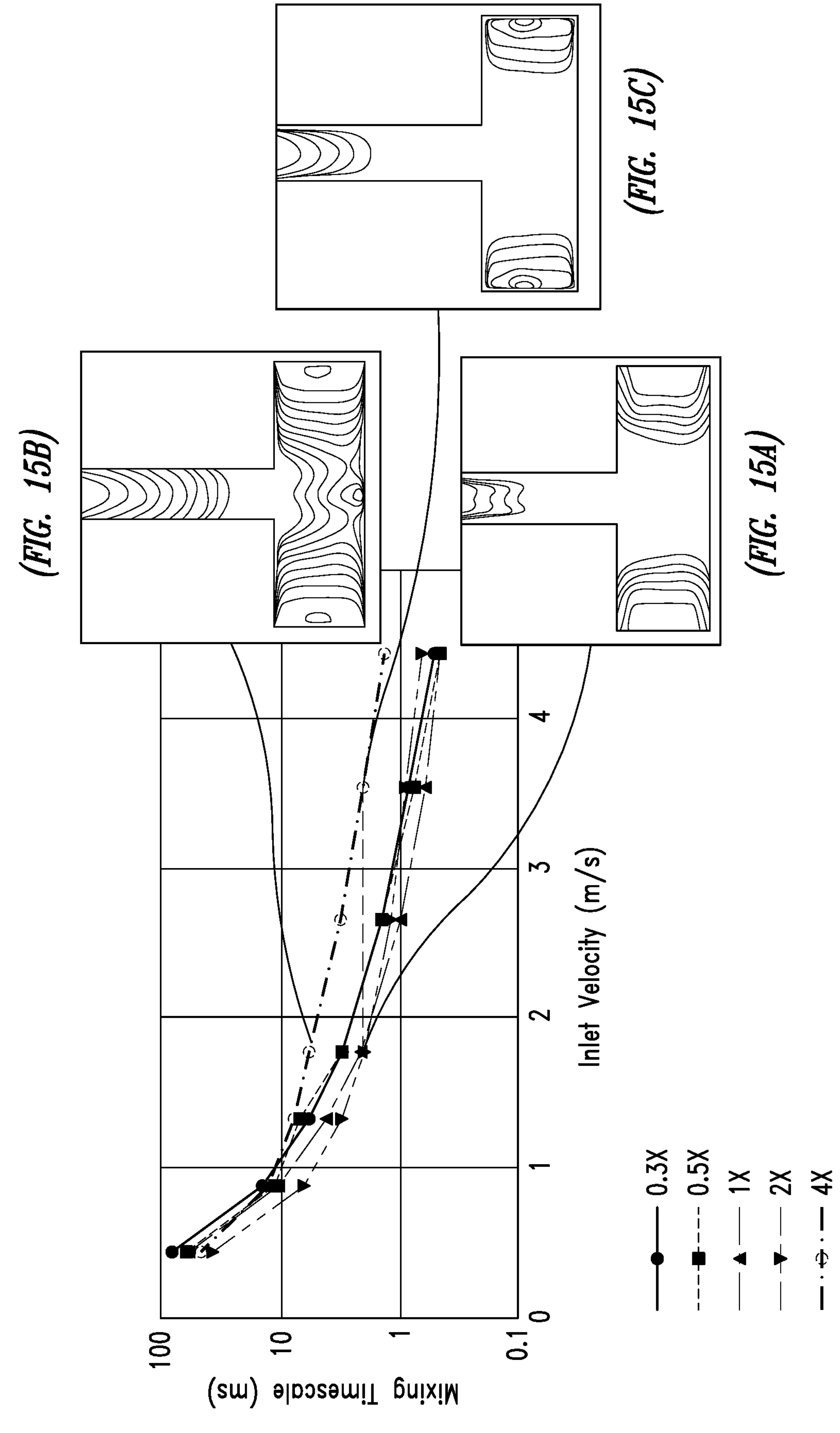

FIG. 15D shows a graph of mixing timescales as a function of inlet velocity and the mixing that results as shown in FIGS. 15A-15C, according to some embodiments.

Figure 15E:
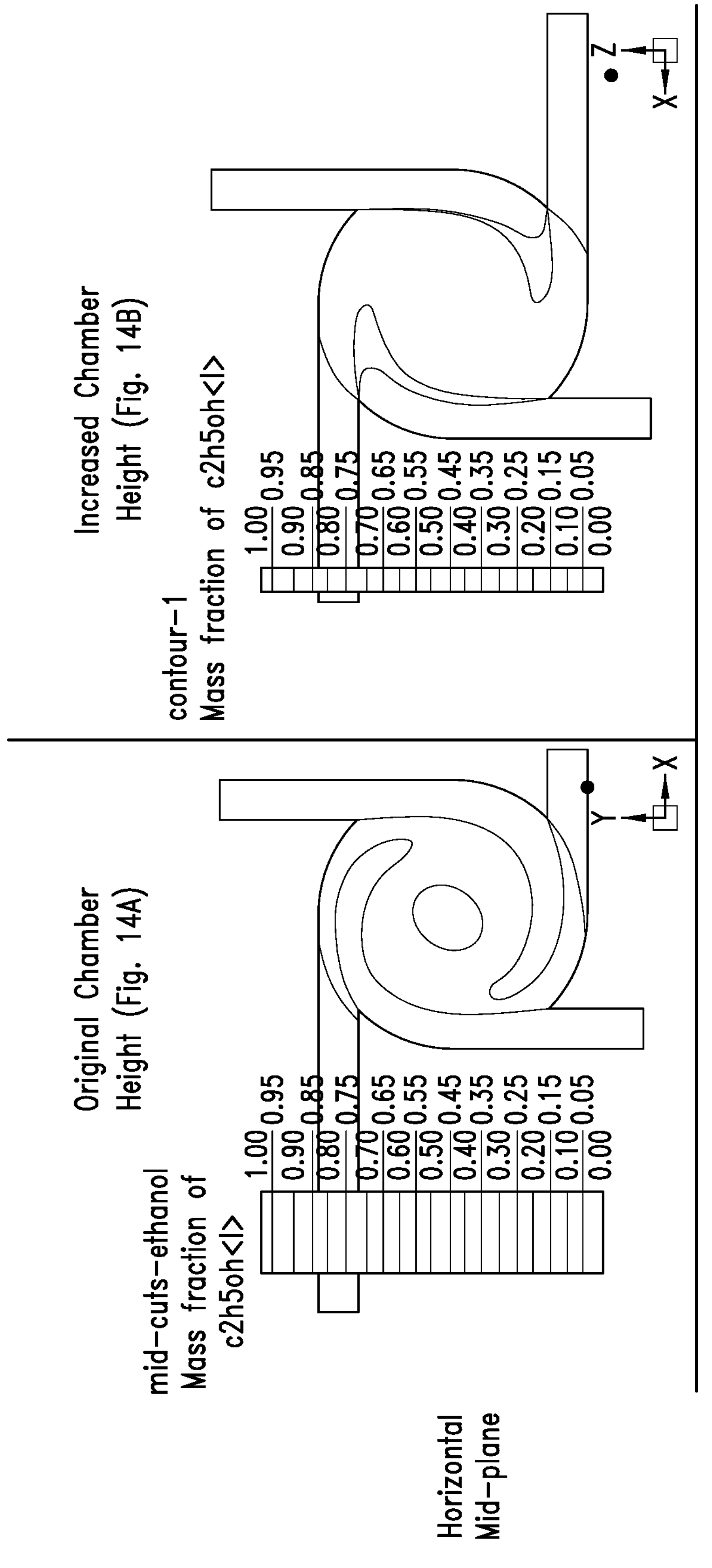
Figure 15E:
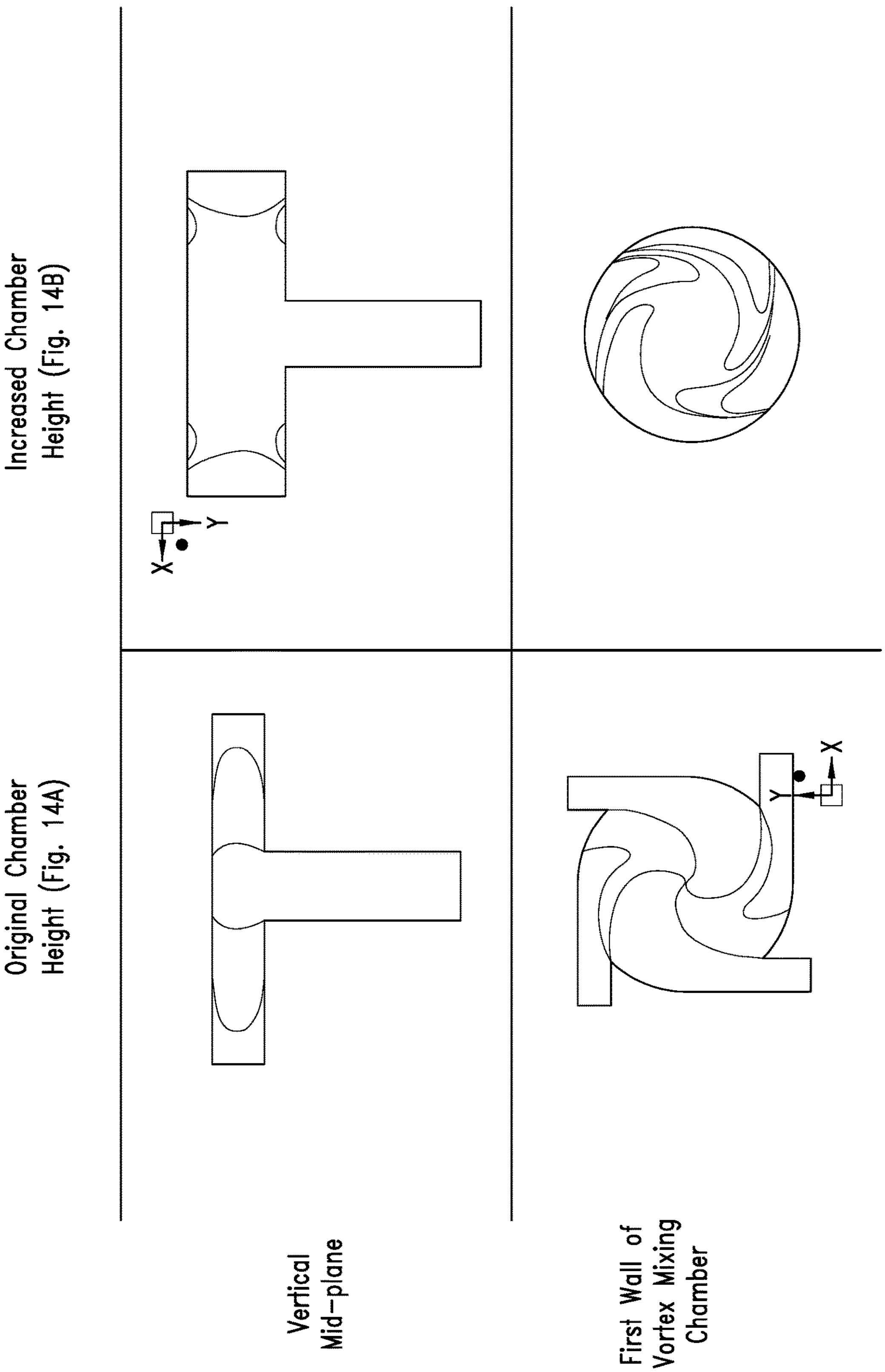

FIG. 15E shows a mass fraction of the vortex mixers of FIGS. 14A-14B.

Figure 16B:
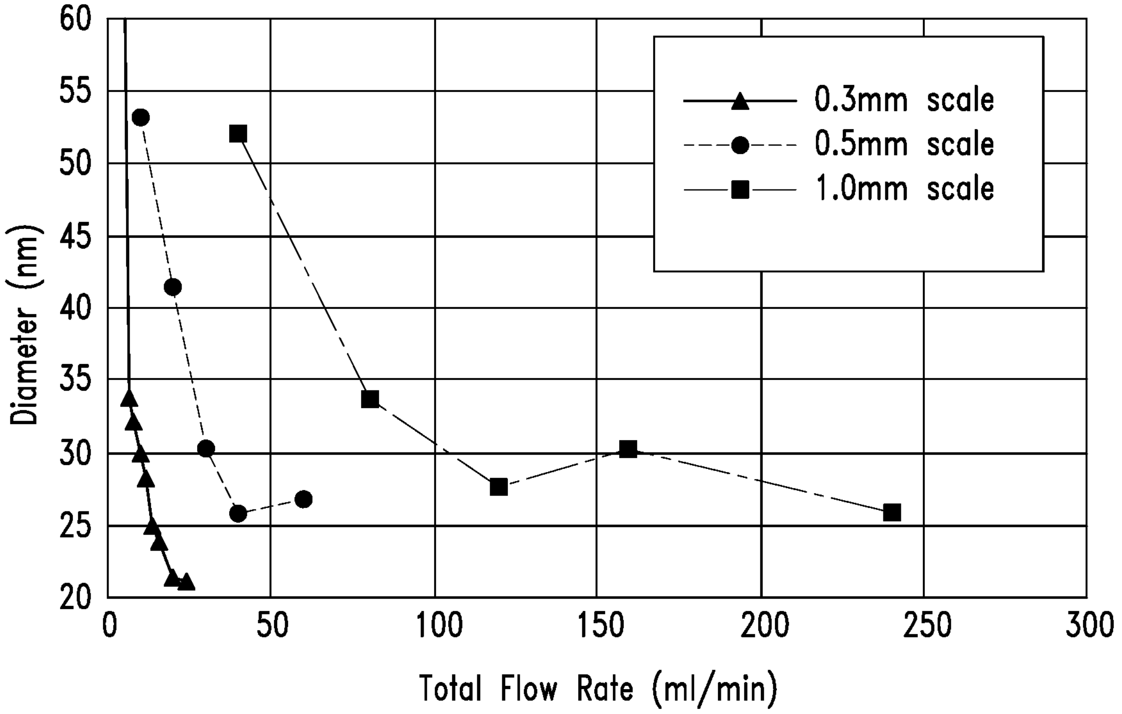
Figure 16C:
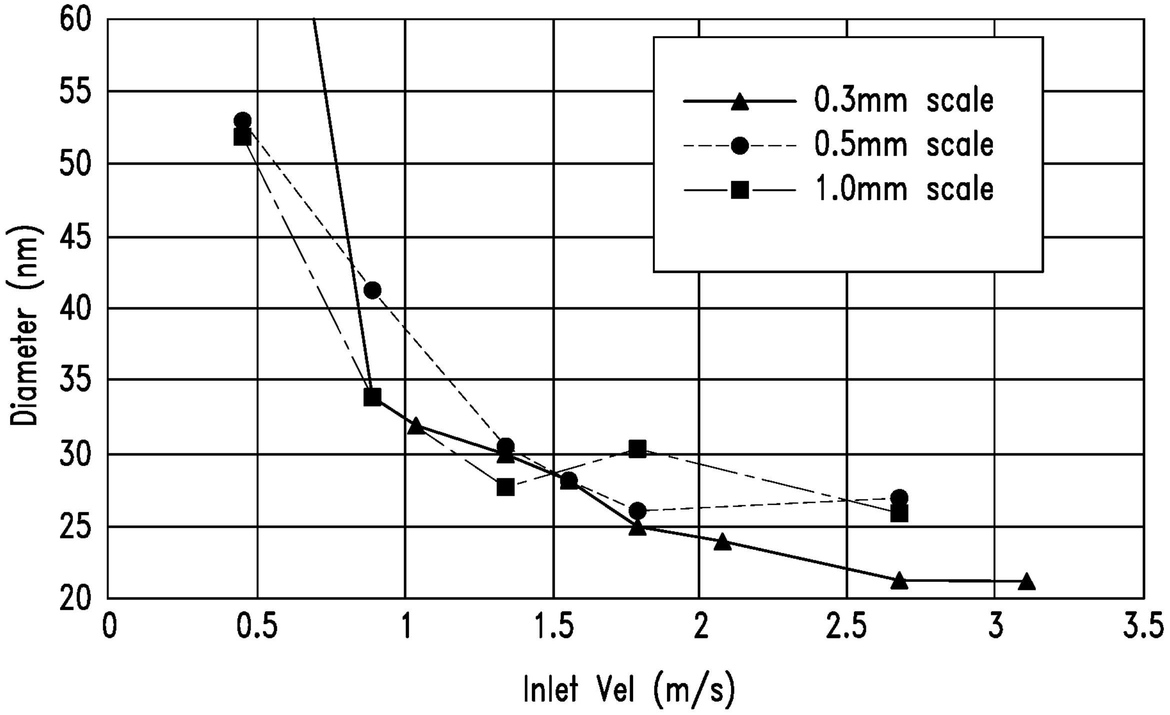
Figures 16D, 16E:
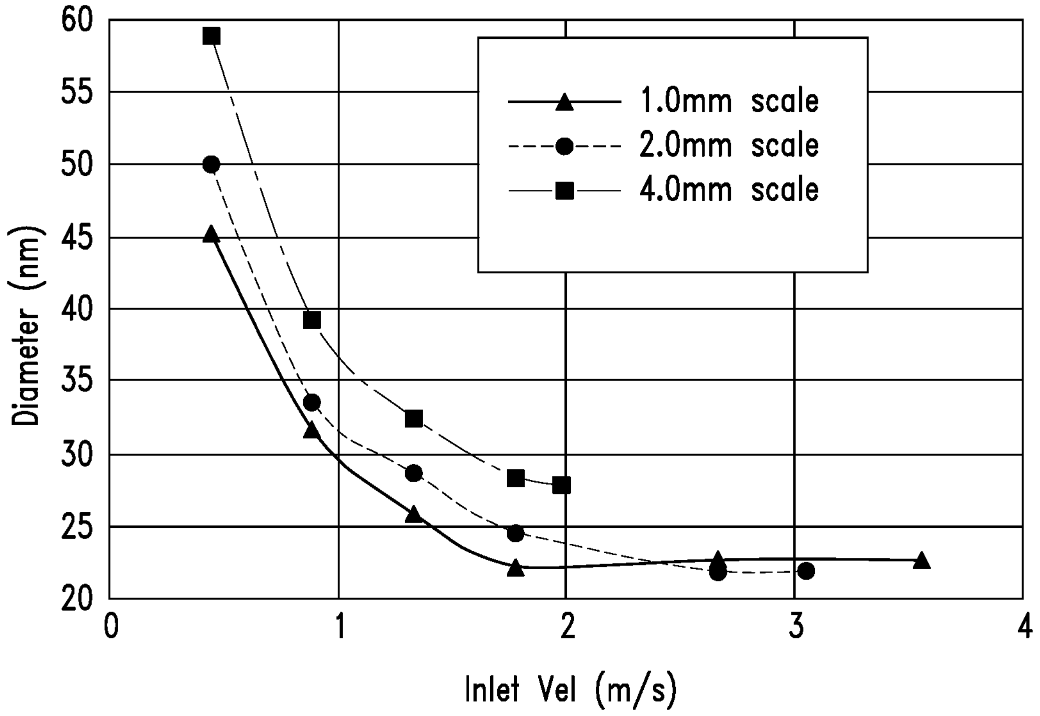
Figure 16F:
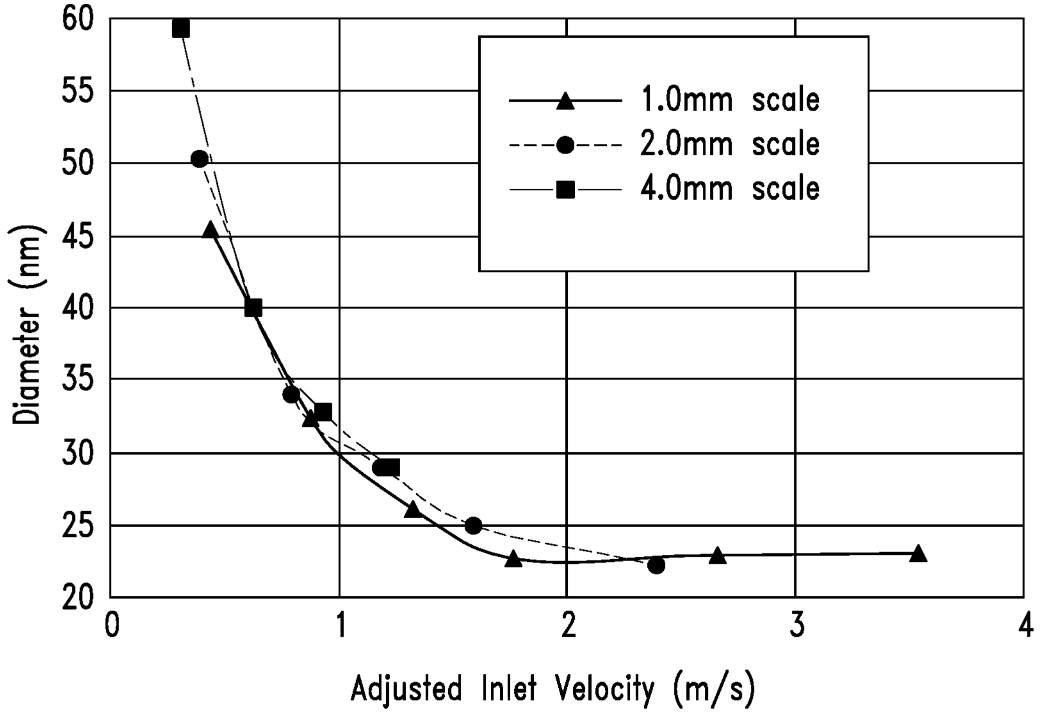
Figure 16G:
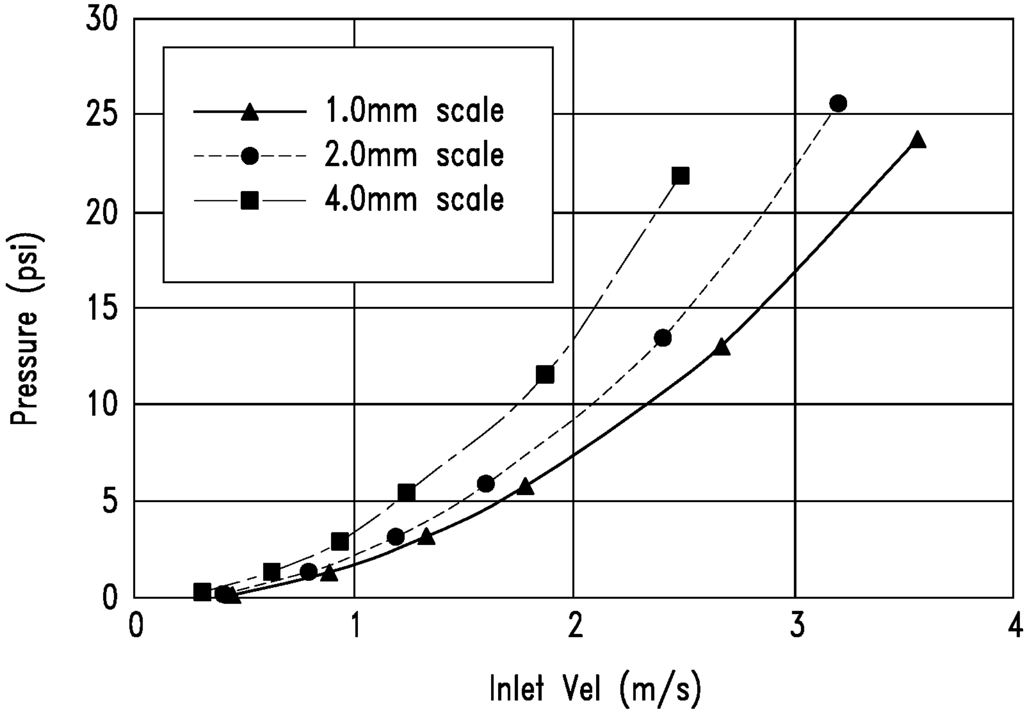
Figure 16H:
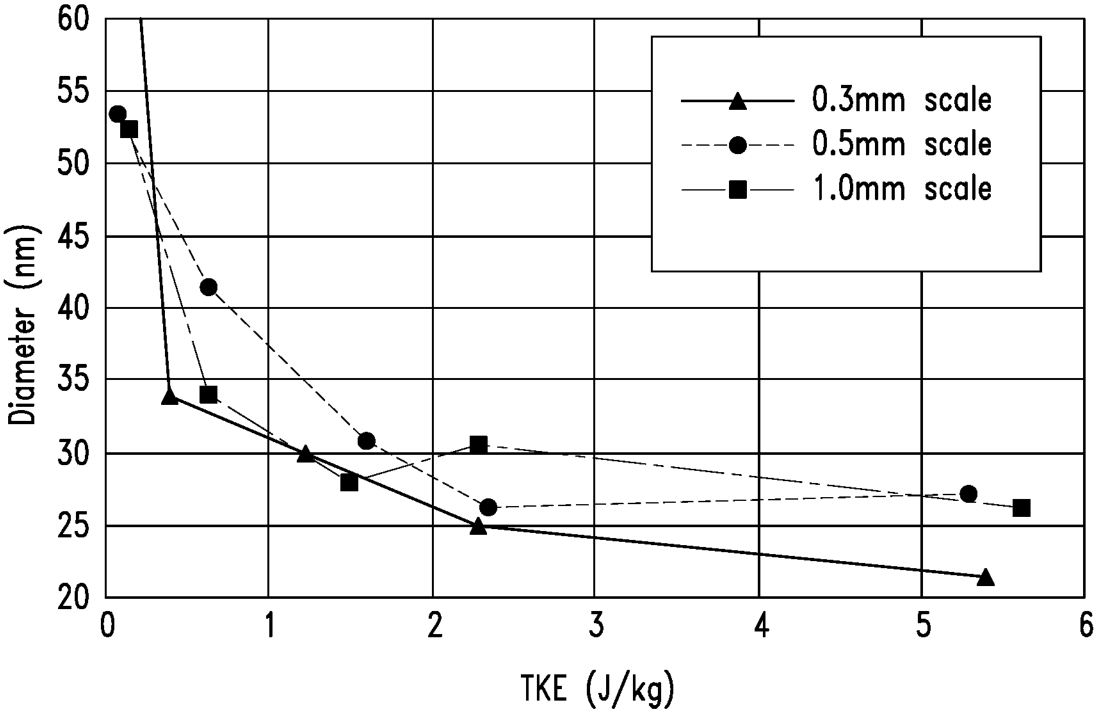
Figure 16I:
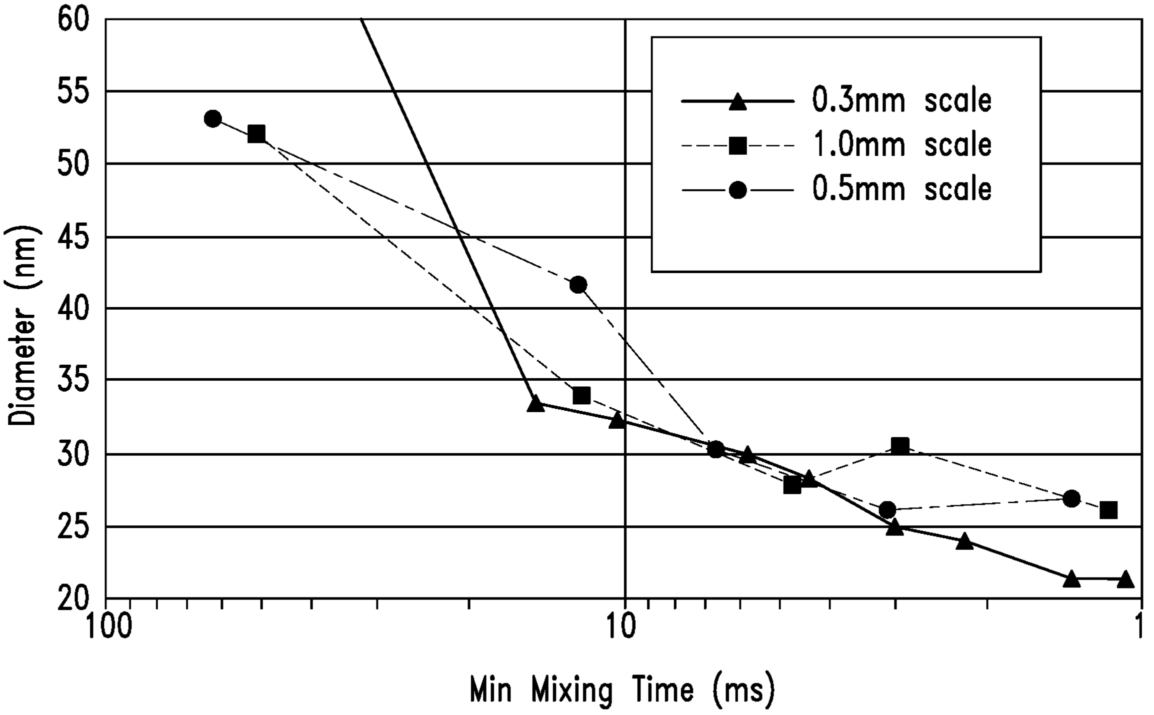
Figure 16J:
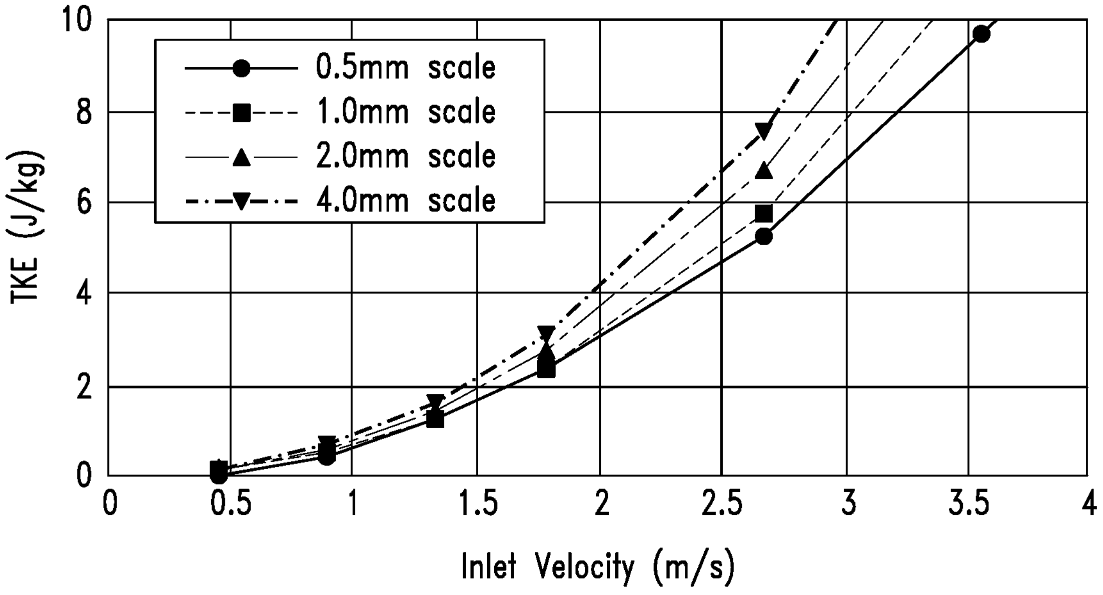
Figure 16K:
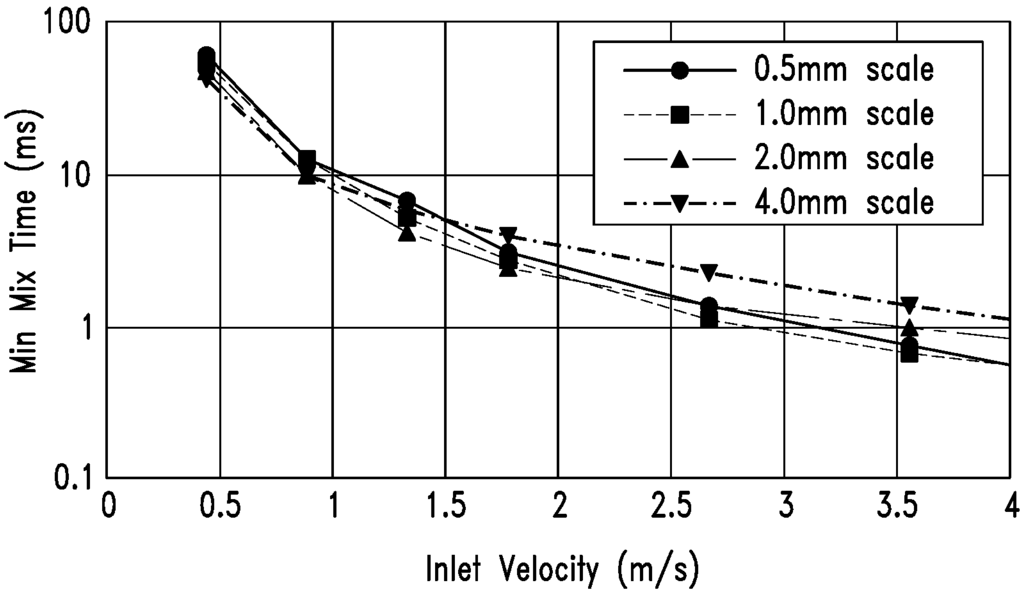
Figures 16L, 16M:
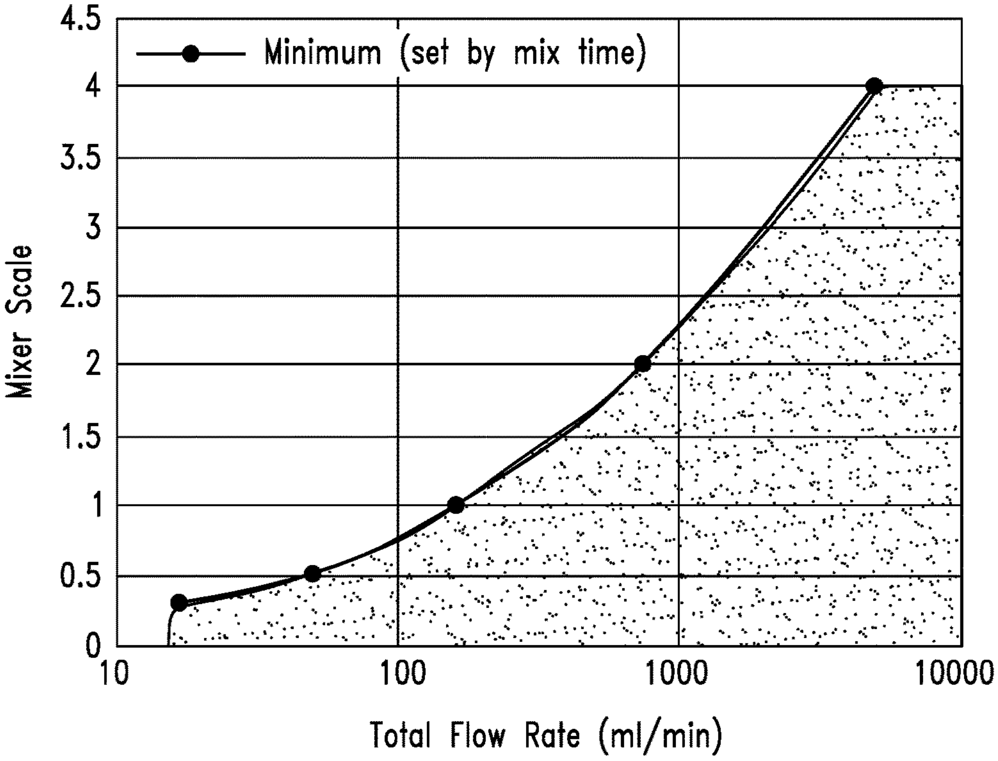
Figure 16N:
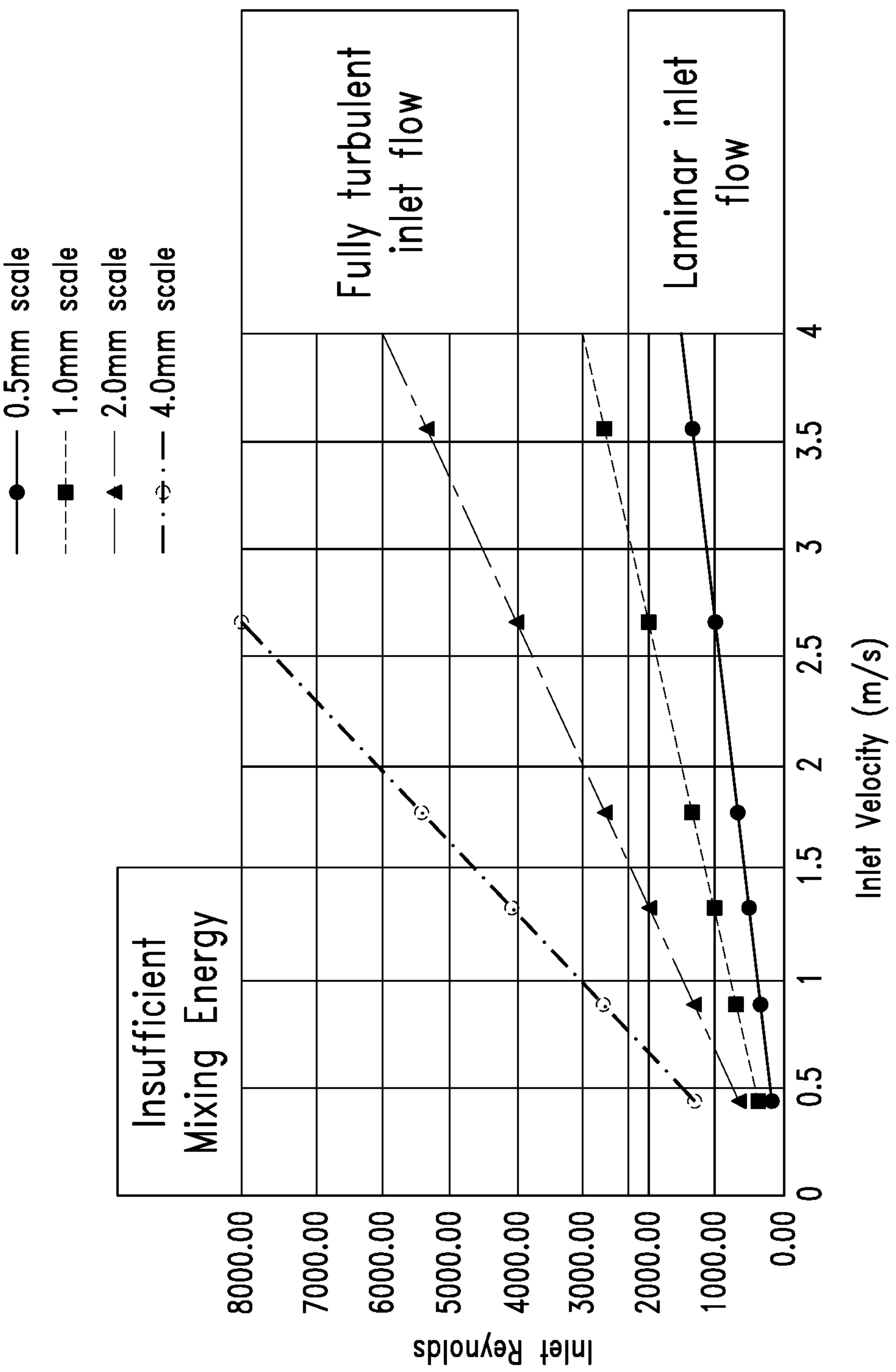

FIGS. 16A-16N show various tables and graphs according to some embodiments.

FIGS. 17A-17D show performance characteristics of some embodiments of a dual stage mixer.

Figure 18A:
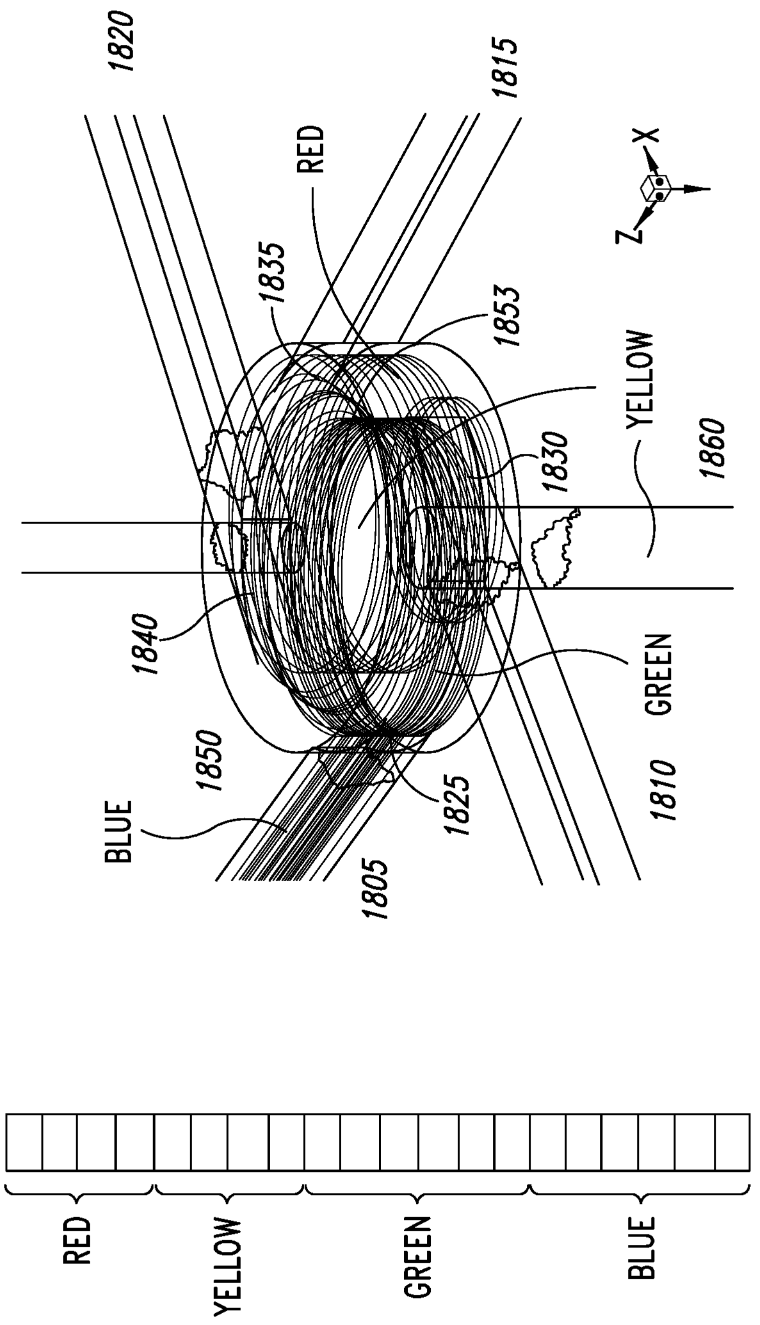
Figure 18B:
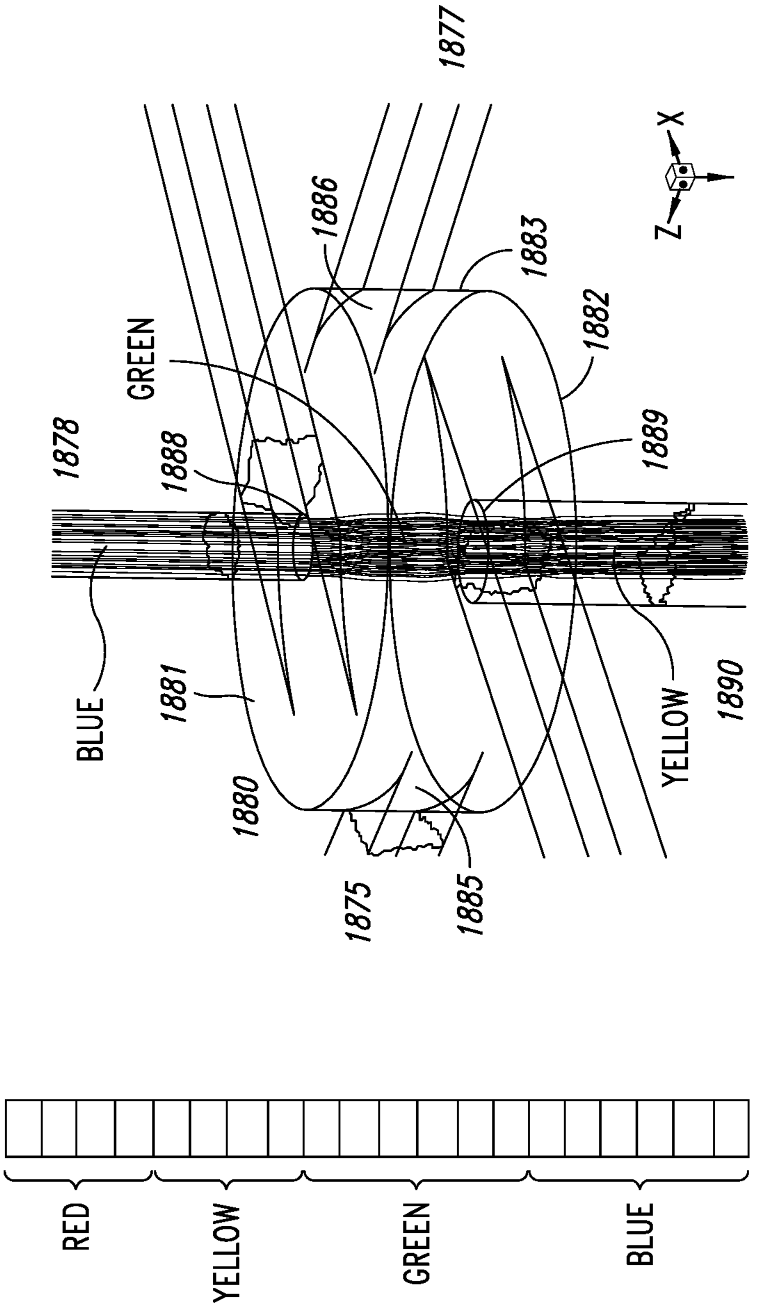

FIGS. 18A-18B show exemplary fluid flow paths in vortex mixers.

Figure 19A:
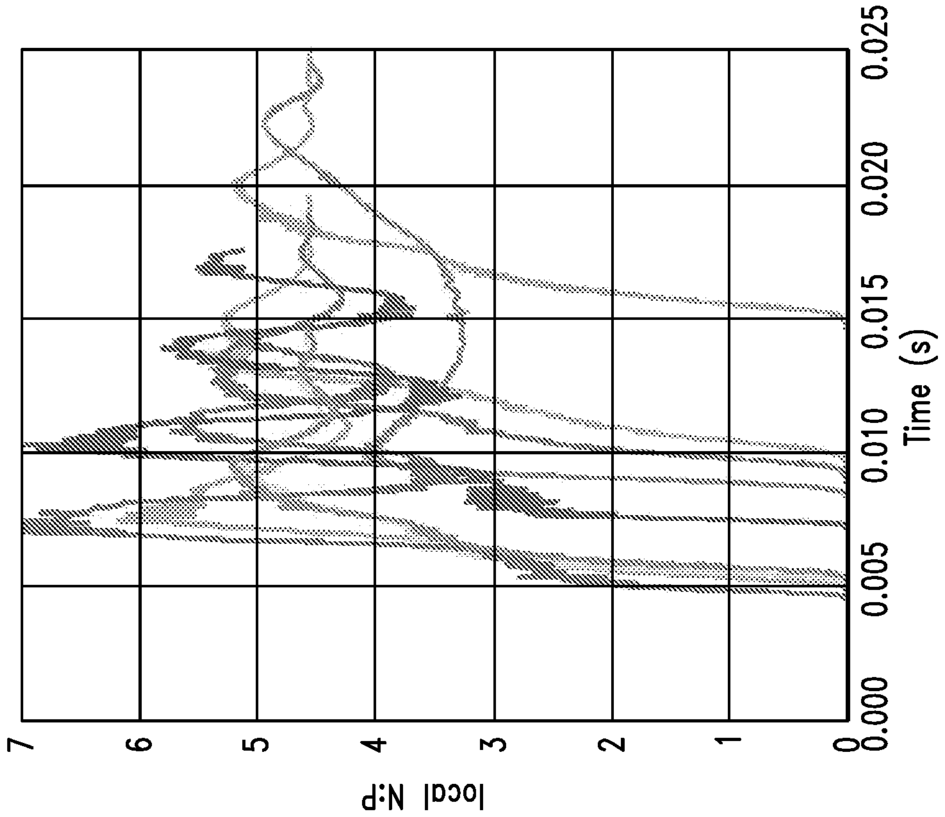
Figure 19B:
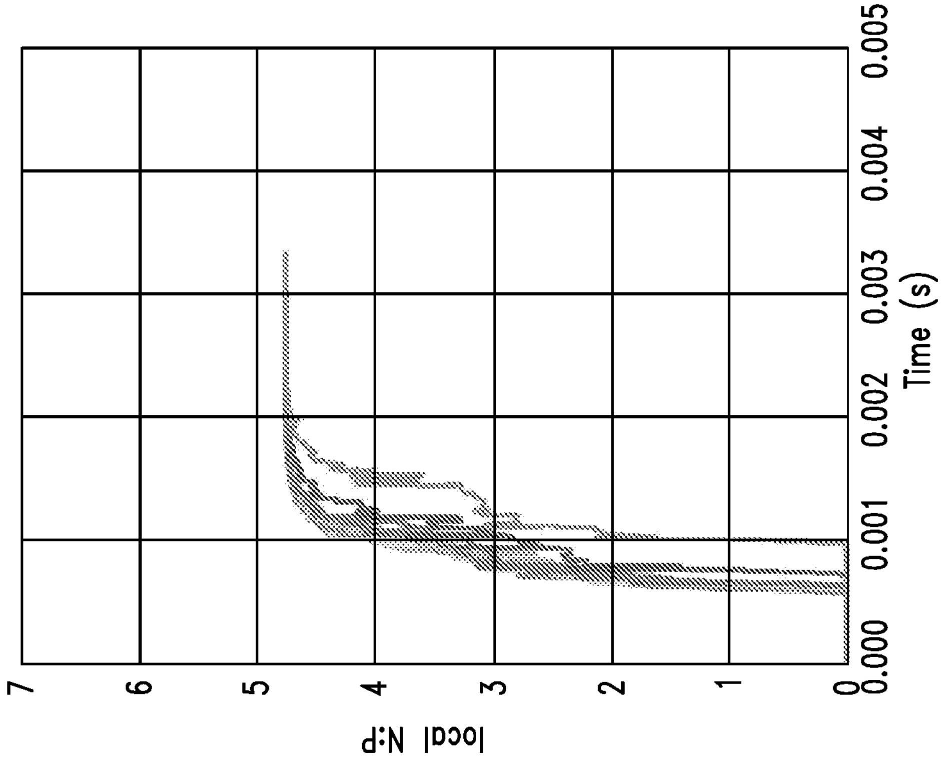

FIGS. 19A-19B show a mixing ratio as a function of time.

DETAILED DESCRIPTION OF SOME OF THE EMBODIMENTS

Figure 1A:
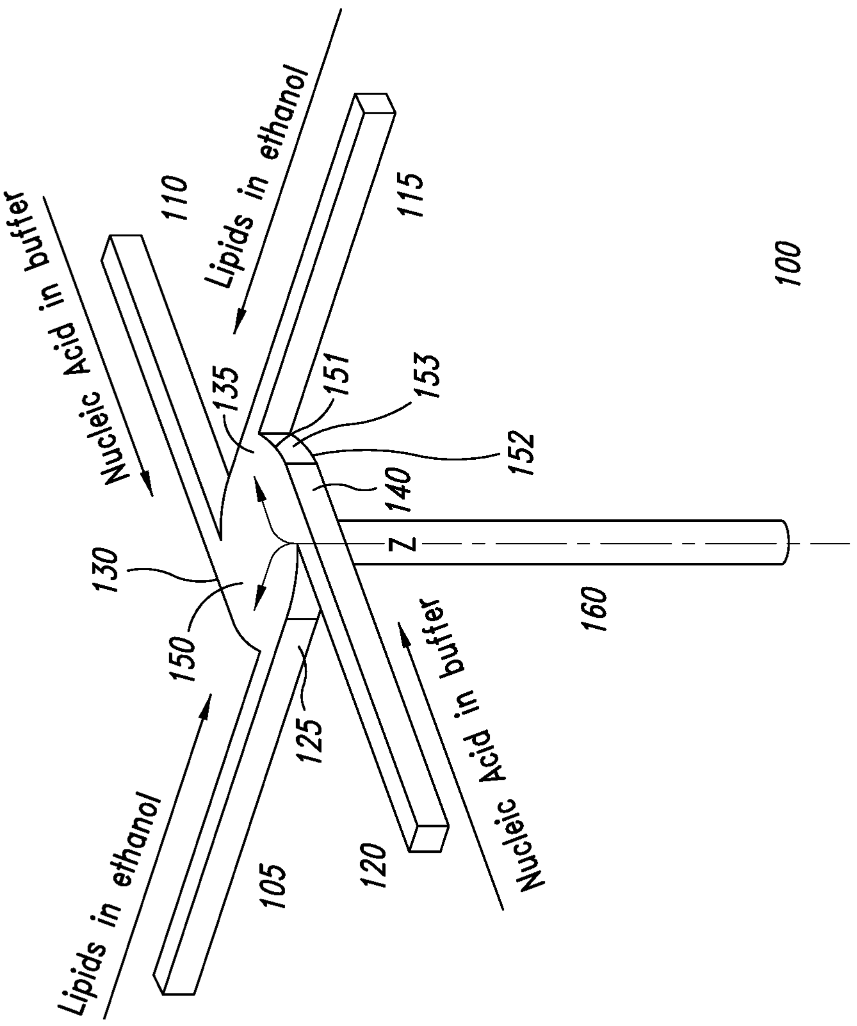
FIGS. 1A-1E shows a vortex mixer according to some embodiments.

FIG. 1A shows an exemplary embodiment of a vortex mixer 100. The vortex mixer 100 may have a vortex mixing chamber 150 that has a first wall 151, a second wall 152, and a side wall 153 connecting the first wall 151 and the second wall 152. In some embodiments, the vortex mixing chamber 150 is round; the first wall 151 and the second wall 152 are circular, and the side wall 153 extends around the circumference of the circle and connects the outside edge of the first wall 151 and second wall 152. The vortex mixer 100 of FIG.

1A has four inlet channels 105, 110, 115, 120. In other implementations, the vortex mixer 100 may have more inlet channels or fewer inlet channels. The inlet channels 105, 110, 115, 120 connect to the side wall 152 of vortex mixing chamber 150 via inlet ports 125, 130, 135, 140. The inlet ports 125, 130, 135, 140 may be exactly or approximately equally spaced around the vortex mixing chamber 150 such that fluid flowing through the inlet channels 105, 110, 115, 120 enters the vortex mixing chamber 150 tangentially. In other embodiments, the inlet ports 125, 130, 135, 140 and inlet channels 105, 110, 115, 120 may be configured non-tangentially. The inlet ports 125, 130, 135, 140 and inlet channels 105, 110, 115, 120 may be configured tangentially to the vortex mixing chamber 150, normally to the vortex mixing chamber 150, or at any angle in between. An exit port (not shown) having an exit channel 160 connected thereto is connected to the second wall 152 of the vortex mixing chamber 150. The exit port may be configured at the center of the second wall 152, such as the radial center. Fluid flows from the vortex mixing chamber 150 through the exit port and exits via the exit channel 160. The exit channel 160 may be configured to be at a right angle—i.e., about 90 degrees—from the plane of the second wall 152. In some embodiments, inlet port 125 can receive a first fluid, inlet port 130 can receive a second fluid, inlet port 135 can receive a third fluid, and inlet port 140 can receive a fourth fluid. In some embodiments, the first fluid is the same or substantially similar to the third fluid. In some embodiments, the second fluid is the same or substantially similar to the fourth fluid.

In some embodiments, the inlet channels 105, 110, 115, 120 may receive fluid from a single source. In other embodiments, the inlet channels 105, 110, 115, 120 may receive fluid from different sources. For example, the inlet channels 105, 110, 115, 120 may each receive fluid from a different source, or some inlet channels may receive fluid from the same source while other inlet channels receive fluid from a different source. Thus, in some embodiments, two of the inlet channels may receive fluid from a first source and the other two inlet channels may receive fluid from a second source. Alternatively, three of the inlet channels may receive fluid from a first source and the fourth inlet channel may receive fluid from a second source, or two inlet channels can receive fluid from a first source, a third inlet channel can receive fluid from a second source, and the fourth inlet channel can receive fluid from a third source.

In an exemplary embodiment, two channels receive fluid from a first source and two channels receive fluid from a second source. In such an embodiment, the two channels receiving fluid from the first source may be next to each other or across from each other. Correspondingly, the two channels receiving fluid from the second source may be next to each other or across from each other.

In the embodiment shown in FIG. 1A, a first of the inlet channels 105 and a third of the inlet channels 115 are configured across from each other. The first 105 and third 115 inlet channels are each about 90 degrees from a second of the inlet channels 110 and a fourth of the inlet channels 120. The first inlet channel 105 and the third inlet channel 115 carry a first fluid towards the vortex mixing chamber 150 and the second inlet channel 110 and the fourth inlet channel 120 carry a second fluid towards the vortex mixing chamber 150. The first 105 and third 115 inlet channels may receive the first fluid from a common first fluid source or from a different source of the first fluid. Similarly, the second 110 and fourth 120 inlet channels may receive the second fluid from a common second fluid source or from a different source of the second fluid.

The first fluid and the second fluid are received into the vortex mixing chamber 150. In some embodiments, at least in part because the fluid enters the vortex mixing chamber tangentially 150 via the inlet ports 125, 130, 135, 140, the first fluid and second fluid spin within the vortex mixing chamber 150. Once the first fluid and second fluid mix within the vortex mixing chamber 150, the mixed fluid flows through the exit port and into the exit channel 160.

Figure 1C:
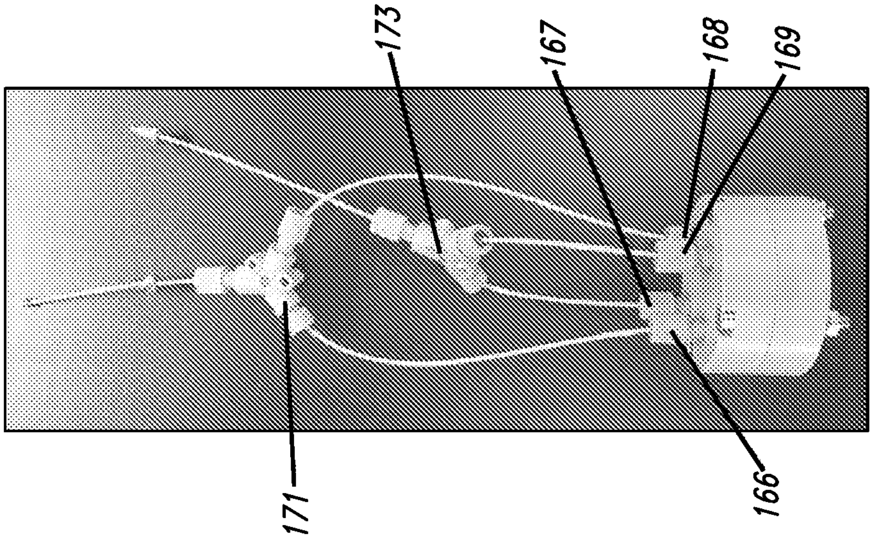
Figure 1B:
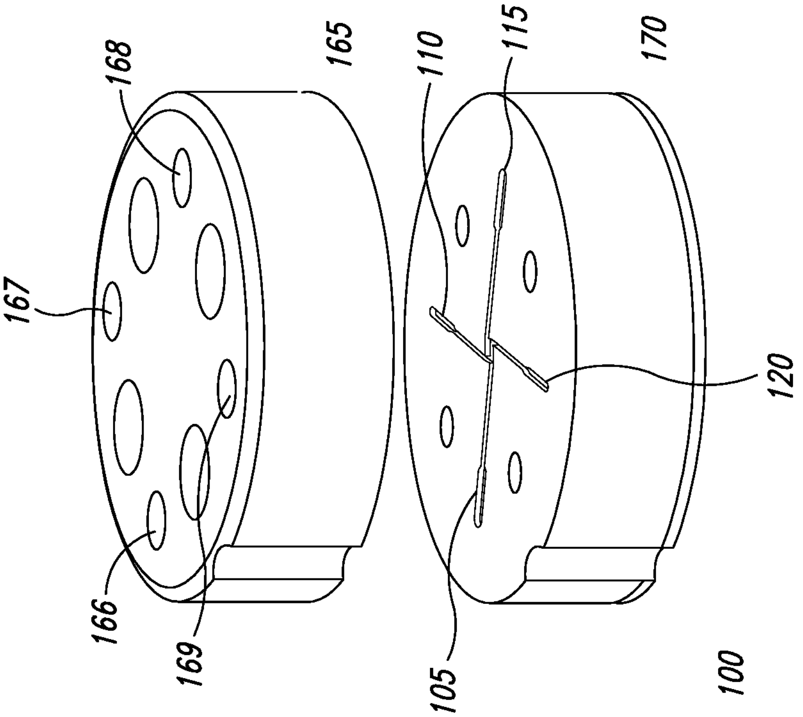

FIG. 1B shows an exploded view of an embodiment of a vortex mixer 100. As shown in FIG. 1B, the vortex mixer 100 is comprised of two pieces: cover 165 and mixer component 170. Cover 165 has intake ports 166, 167, 168, 169 corresponding to inlet channels 105, 110, 115, 120. The intake ports 166, 167, 168, 169 are configured to receive fluid from a fluid source in any configuration as described above with respect to FIG. 1A.

FIG. 1C shows an exemplary configuration wherein intake ports 166 and 168 receive fluid from a first source and intake ports 167 and 169 receive fluid from a second source. The fluid from the first source passes through a first fluid splitter 171 and into intake ports 166, 168 while fluid from the second source passes through a second fluid splitter 173 and into intake ports 167, 169.

Figure 1D:
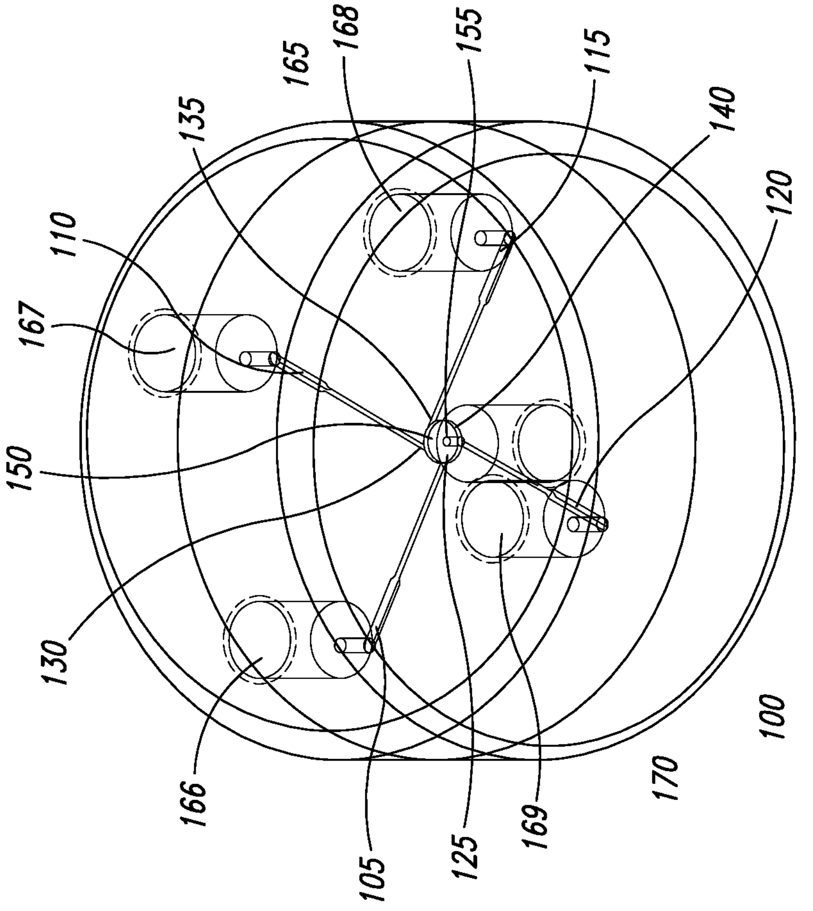
Figure 1E:
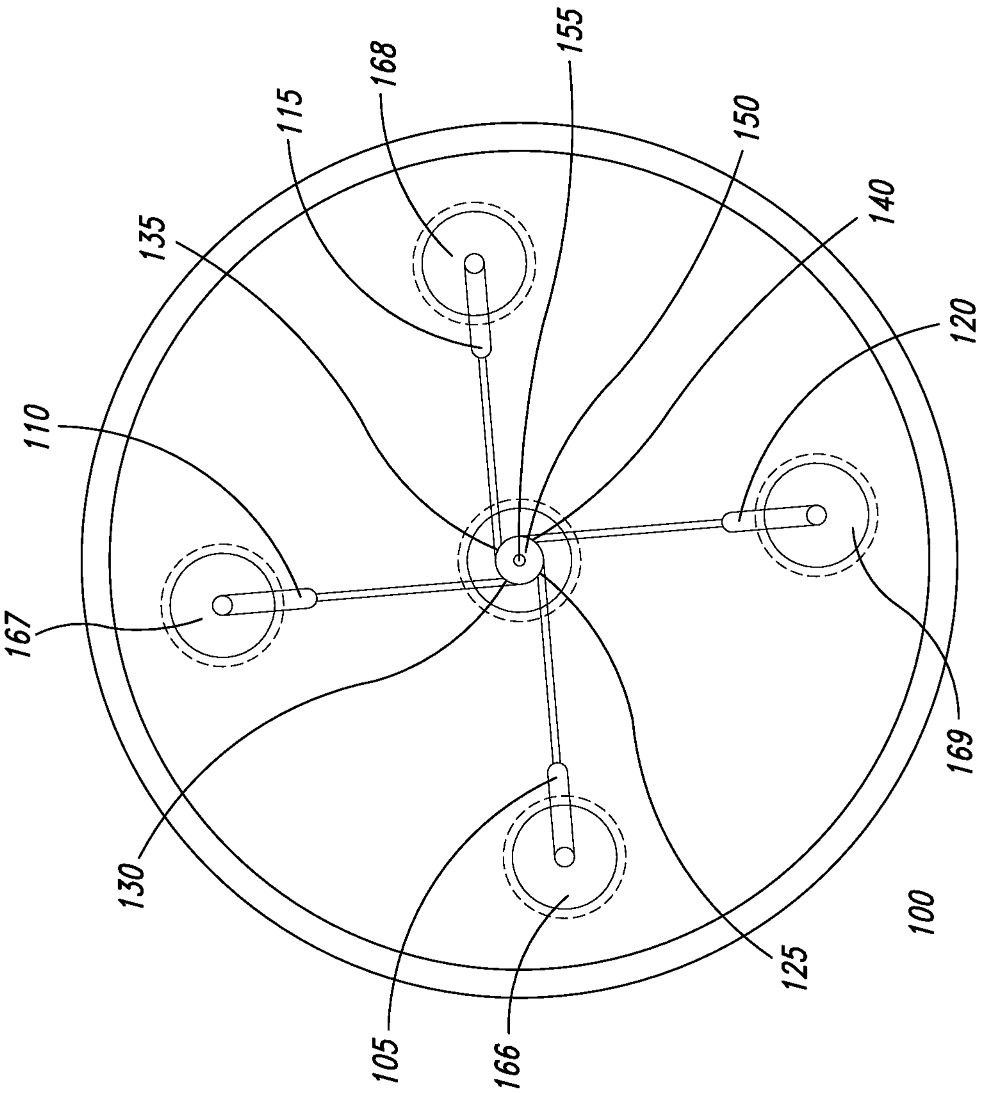

The fluid passes from the intake ports 166, 167, 168, 169 and into the inlet channels 105, 110, 115, 120, after which it travels through the inlet channels 105, 110, 115, 120, through inlet ports 125, 130, 135, 140 and into vortex mixing chamber 150. An assembled configuration of FIG. 1B is shown as FIG. 1D. FIG. 1D also shows exit port 155 within the vortex mixing chamber 150. FIG. 1E shows atop view of FIG. 1D.

Figure 2:
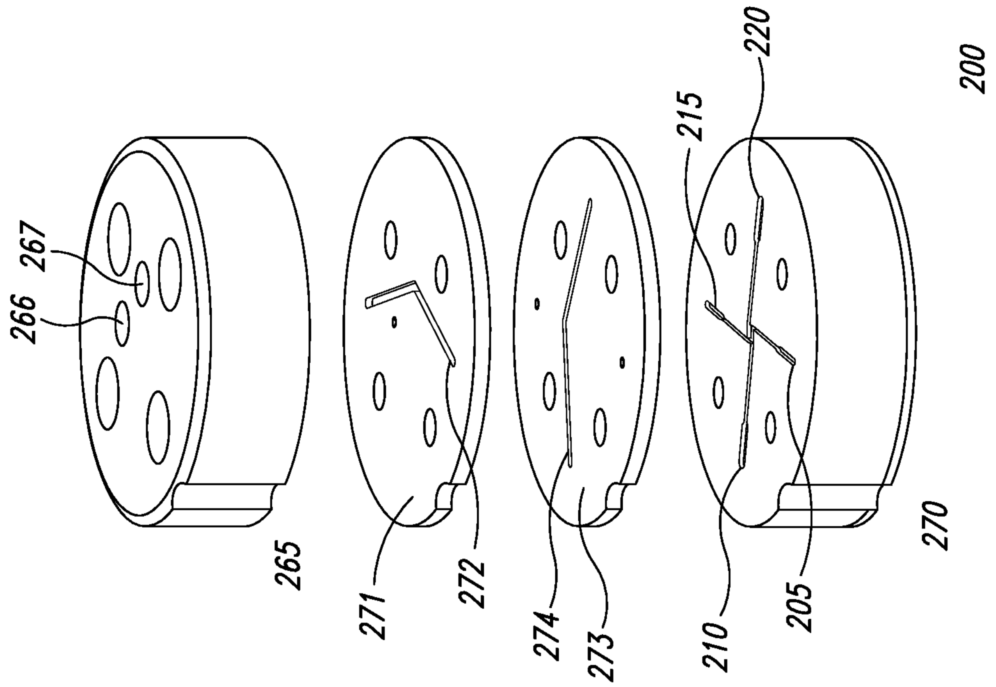
FIG. 2 shows a vortex mixer according to some embodiments.

FIG. 2 shows an alternative embodiment of a vortex mixer 200. In this embodiment, the vortex mixer 200 contains internal splitters 271, 273. The internal splitters 271, 273 may be used instead of the external splitters shown in FIG. 1C. In this embodiment, cover 265 has two intake ports 266, 267. A first fluid from intake port 266 enters splitter channel 272 of internal splitter 271. Splitter channel 272 divides the first fluid and sends the first fluid to inlet channels 205, 215. Meanwhile, a second fluid from intake port 267 enters splitter channel 274 of internal splitter 273. Splitter channel 274 divides the second fluid and sends the second fluid to inlet channels 210, 220. Once the first fluid and second fluid enter the inlet channels 205, 210, 215, 220 of mixer component 270, the vortex mixer 200 operates as discussed above with respect to FIGS. 1A-1E.

Figure 3B:
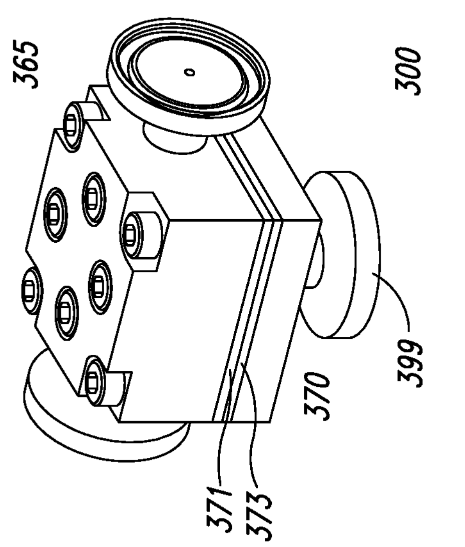
FIGS. 3A-3B show a vortex mixer according to some embodiments.
Figure 3A:
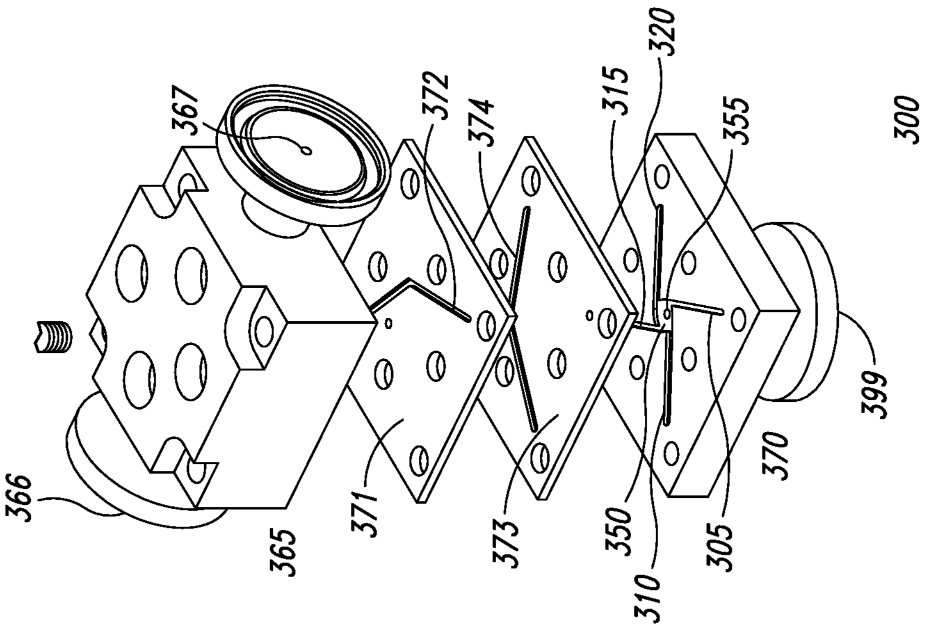

FIG. 3A shows an exploded view of an alternative embodiment of FIG. 2. In the embodiment of FIG. 3A, the internal splitters 371, 373 and mixer component 370 operate similarly to the embodiment of FIG. 2. The cover 365, however, receives fluid at intake ports 366, 367. A first fluid enters intake port 366 and is transported via internal fluid channels to internal splitter 371; similarly, a second fluid enters intake port 367 and is transported via internal fluid channels to internal splitter 373. Once the fluid enters the internal splitters 371 and 373, via splitter channels 372 and 374, respectively, the fluid is divided and enters inlet channels 305, 310, 315, 320 as discussed above. The vortex mixing chamber 350 and exit port 355 are also shown and are fluidically coupled to external exit port 399. FIG. 3B shows the embodiment of FIG. 3A with the cover 365, internal splitters 371, 373, and mixer component 370 assembled.

Figure 4A:
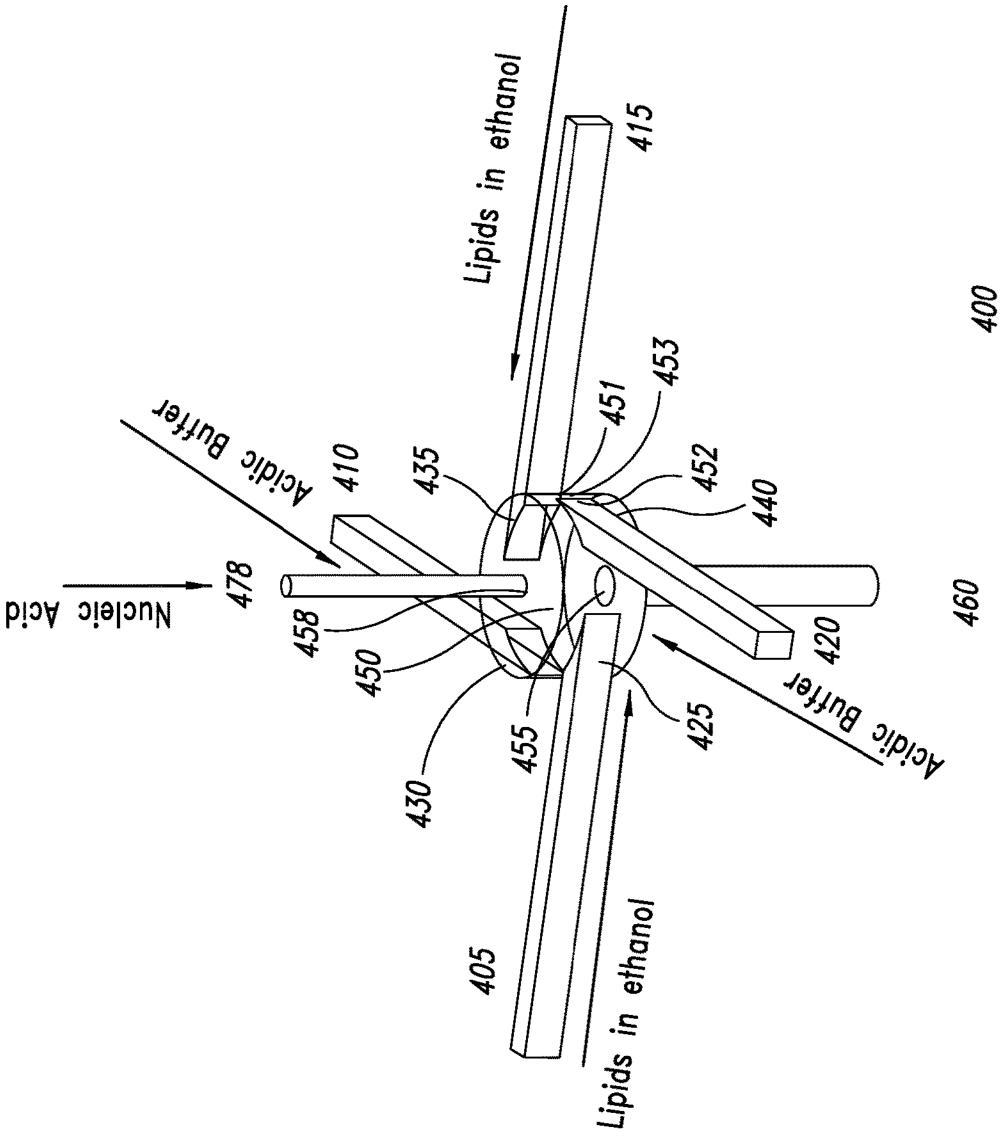
FIGS. 4A-4C show a vortex mixer according to some embodiments.

FIG. 4A shows an exemplary embodiment of a vortex mixer 400. The vortex mixer 400 may have a vortex mixing chamber 450 that has a first wall 451, a second wall 452, and a side wall 453 connecting the first wall 451 and the second wall 452. In some embodiments, the vortex mixing chamber 450 is round; the first wall 451 and the second wall 452 are circular, and the side wall 453 extends around the circumference of the circle and connects the outside edge of the first wall 451 and second wall 452. The vortex mixer 400 of FIG. 4A has four inlet channels 405, 410, 415, 420. In other implementations, the vortex mixer 400 may have more inlet channels or fewer inlet channels. The inlet channels 405, 410, 415, 420 connect to the side wall 452 of vortex mixing chamber 450 via inlet ports 425, 430, 435, 440. The inlet ports 425, 430, 435, 440 may be exactly or approximately equally spaced around the vortex mixing chamber 450 such that fluid flowing through the inlet channels 405, 410, 415, 420 enters the vortex mixing chamber 450 tangentially. In other embodiments, the inlet ports 425, 430, 435, 440 and inlet channels 405, 410, 415, 420 may be configured non-tangentially. The inlet ports 425, 430, 435, 440 and inlet channels 405, 410, 415, 420 may be configured tangentially to the vortex mixing chamber 450, normally to the vortex mixing chamber 450, or at any angle in between. An exit port (not shown) having an exit channel 460 connected thereto is connected to the second wall 452 of the vortex mixing chamber 450. The exit port may be configured at the center of the second wall 452, such as the radial center. Fluid flows from the vortex mixing chamber 450 through the exit port and exits via the exit channel 460. The exit channel 460 may be configured to be at a right angle—i.e., about 90 degrees—from the plane of the second wall 452.

A fifth inlet channel 478 may be configured to receive a fifth fluid. The third inlet channel 478 may be fluidically connected to vortex mixing chamber 450 via a fifth inlet port 458. The fifth inlet port 458 may be configured in the first wall 451 of the vortex mixing chamber 450. In some embodiments, the fifth inlet port 458 may be configured in the center of the first wall 451, such as the radial center of the first wall 451. The third inlet port 458 may be configured in a second wall 452 of the vortex mixing chamber 450. In some embodiments, the fifth inlet port 458 may be configured in the center of the second wall 452, such as the radial center of the second wall 452. The first wall 451 and second wall 452 are connected by the side wall 453. In some embodiments, the fifth inlet chamber 478 can have a diameter of about 0.1×the diameter of the vortex mixer 400. In some embodiments, the exit port 455 can have a diameter of about 0.2×the diameter of the vortex mixer 400.

Figure 4C:
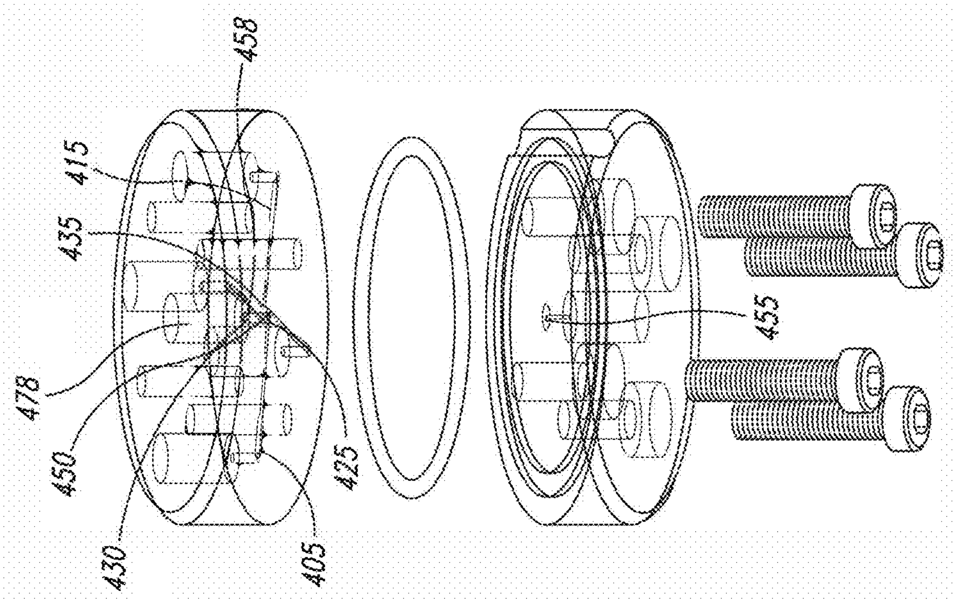
Figure 4B:
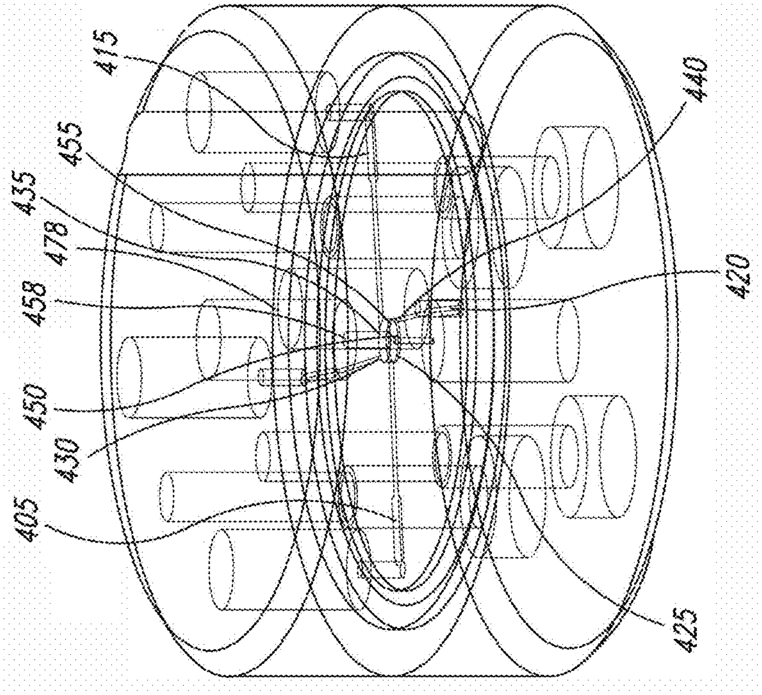

FIGS. 4B and 4C show an embodiment of a vortex mixer 400 and an exploded view of a vortex mixer, respectively. The vortex mixer 400 may have a vortex mixing chamber 450 that has a first wall 451, a second wall 452, and a side wall 453 connecting the first wall 451 and the second wall 452. In some embodiments, the vortex mixing chamber 450 is round; the first wall 451 and the second wall 452 are circular, and the side wall 453 extends around the circumference of the circle and connects the outside edge of the first wall 451 and second wall 452. The vortex mixer 400 of FIG. 4A has four inlet channels 405, 410, 415, 420. In other implementations, the vortex mixer 400 may have more inlet channels or fewer inlet channels. The inlet channels 405, 410, 415, 420 connect to the side wall 452 of vortex mixing chamber 450 via inlet ports 425, 430, 435, 440. The inlet ports 425, 430, 435, 440 may be exactly or approximately equally spaced around the vortex mixing chamber 450 such that fluid flowing through the inlet channels 405, 410, 415, 420 enters the vortex mixing chamber 450 tangentially. In other embodiments, the inlet ports 425, 430, 435, 440 and inlet channels 405, 410, 415, 420 may be configured non-tangentially. The inlet ports 425, 430, 435, 440 and inlet channels 405, 410, 415, 420 may be configured tangentially to the vortex mixing chamber 450, normally to the vortex mixing chamber 450, or at any angle in between. An exit port 455 having an exit channel 460 connected thereto is connected to the second wall 452 of the vortex mixing chamber 450. The exit port 455 may be configured at the center of the second wall 452, such as the radial center. Fluid flows from the vortex mixing chamber 450 through the exit port 455 and exits via the exit channel 460. The exit channel 460 may be configured to be at a right angle—i.e., about 90 degrees—from the plane of the second wall 452.

A fifth inlet channel 478 may be configured to receive a fifth fluid. The third inlet channel 478 may be fluidically connected to vortex mixing chamber 450 via a fifth inlet port 458. The fifth inlet port 458 may be configured in the first wall 451 of the vortex mixing chamber 450. In some embodiments, the fifth inlet port 458 may be configured in the center of the first wall 451, such as the radial center of the first wall 451. The fifth inlet port 458 may be configured in a second wall 452 of the vortex mixing chamber 450. In some embodiments, the fifth inlet port 458 may be configured in the center of the second wall 452, such as the radial center of the second wall 452. The first wall 451 and second wall 452 are connected by the side wall 453. In some embodiments, the fifth inlet chamber 478 can have a diameter of about 0.1×the diameter of the vortex mixer 400. In some embodiments, the exit port 455 can have a diameter of about 0.2×the diameter of the vortex mixer 400. In some embodiments, inlet port 425 can receive a first fluid, inlet port 430 can receive a second fluid, inlet port 435 can receive a third fluid, inlet port 440 can receive a fourth fluid, and inlet port 458 can receive a fifth fluid. In some embodiments, the first fluid is the same or substantially similar to the third fluid. In some embodiments, the second fluid is the same or substantially similar to the fourth fluid. In some embodiments, the first fluid and the third fluid can include lipids. In some embodiments, the first fluid and the third fluid can include ethanol. In some embodiments, the first and the third fluids can include lipids. In some embodiments, the second and fourth fluids can include nucleic acid. (e.g., RNA). In some embodiments, the second and fourth fluids can include ethanol. In some embodiments, the second and the fourth fluids can include lipids. In some embodiments, the fifth fluid can include nucleic acid.

Figure 5:
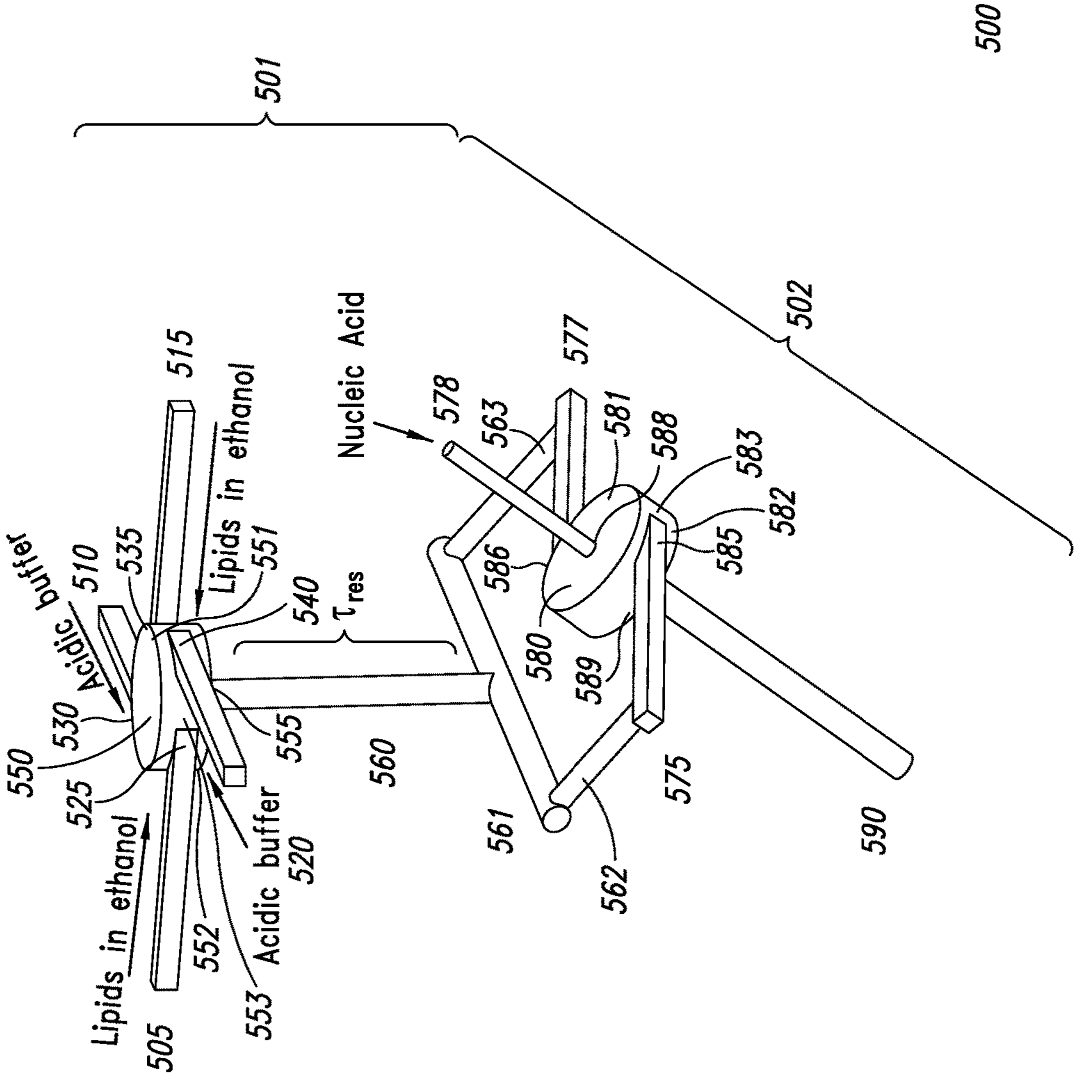
FIG. 5 shows a two stage vortex mixer according to some embodiments.

FIG. 5 shows an exemplary embodiment of a two stage mixer 500. The first stage mixer 501 may be configured similar to any of the vortex mixers discussed above. As shown, first stage mixer 501 has a vortex mixing chamber 550 having a first wall 551 and a second wall 552 and a side wall 553 that connects the first wall 551 and the second wall 552. The vortex mixing chamber 550 may have four inlet ports 525, 530, 535, 540 configured along the side wall 553. Each of the four inlet ports 525, 530, 535, 540 may receive fluid from a corresponding inlet channel 505, 510, 515, 520. The first inlet channel 505 and the third inlet channel 515 may receive a first fluid and the second inlet channel 510 and fourth inlet channel 520 may receive a second fluid. In some embodiments, each inlet channel 505, 510, 515, 520 may receive fluid from a separate fluid source. In other implementations, the first inlet channel 505 and third inlet channel 515 may receive a first fluid from a first fluid source; the first fluid may pass through a first fluid splitter that directs the first fluid towards the first inlet channel 505 and the third inlet channel 515. Correspondingly, the second inlet channel 510 and fourth inlet channel 520 may receive a second fluid from a second fluid source; the second fluid may pass through a second fluid splitter that directs the second fluid towards the second inlet channel 510 and the fourth inlet channel 520. The first fluid splitter and the second fluid splitter may be an internal splitter or an external splitter, as discussed above.

The first fluid flows through the first inlet channel 505 and into the vortex mixing chamber 550 via first inlet port 525 and flows through the third inlet channel 515 and into the vortex mixing chamber 550 via third inlet port 535. The first inlet port 525 and third inlet port 535 may be exactly or approximately 180 degrees from each other, and may direct the first fluid such that the first fluid enters the vortex mixing chamber 550 tangentially. In other embodiments, the first inlet port 525 and third inlet port 535 may direct the first fluid such that the first fluid enters the vortex mixing chamber 550 normally or at an angle between the tangent and the normal. Similarly, the second fluid flows through the second inlet channel 510 and into the vortex mixing chamber 550 via second inlet port 530 and flows through the fourth inlet channel 520 and into the vortex mixing chamber 550 via fourth inlet port 540. The second inlet port 530 and fourth inlet port 540 may be exactly or approximately 180 degrees from each other and may be exactly or approximately 90 degrees from the first inlet port 525 and third inlet port 535. The second inlet port 530 and fourth inlet port 540 direct the second fluid such that the second fluid enters the vortex mixing chamber 550 tangentially, normally, or at any angle in between. In some embodiments, inlet port 525 can receive a first fluid, inlet port 530 can receive a second fluid, inlet port 535 can receive a third fluid, and inlet port 540 can receive a fourth fluid. In some embodiments, the first fluid is the same or substantially similar to the third fluid. In some embodiments, the second fluid is the same or substantially similar to the fourth fluid. In some embodiments, the first fluid and the third fluid can include lipids. In some embodiments, the first fluid and the third fluid can include ethanol. In some embodiments, the second and fourth fluids can include lipids. In some embodiments, the second and fourth fluids can include acidic buffers. In some embodiments, the second and fourth fluids can include nucleic acid. (e.g., RNA). In some embodiments, the second and fourth fluids can include ethanol.

The vortex mixing chamber 550 may have an exit port 555 having an exit channel 560 connected thereto. The exit port may be configured on the second wall 552 of the vortex mixing chamber 550. The exit port may be configured at the center of the second wall 552, such as the radial center. Outflow fluid from the first stage mixer 501 flows from the vortex mixing chamber 550 through the exit port 555 and exits via the exit channel 560.

The first stage mixer outflow fluid flows out of the first stage vortex mixing chamber 550 through exit channel 560 and into a splitter 561. The splitter 561 divides the first stage mixer outflow fluid and directs the first stage mixer outflow fluid into a first inlet channel 575 via intake port 562 and a second inlet channel 577 via intake port 563 of the second stage mixer 502. The first inlet channel 575 and the second inlet channel 577 are each connected to second stage vortex mixing chamber 580 via a first inlet port 585 and a second inlet port 586 respectively. The first inlet port 585 and second inlet port 586 may be configured exactly or approximately 180 degrees apart and may be configured such that the first stage mixer outflow fluid enters the vortex mixing chamber 580 tangentially from each port 585, 586. In some embodiments, the first inlet port 585 and the second inlet port 586 may be configured such that the first stage mixer outflow fluid enters the vortex mixing chamber 580 at a normal angle to the vortex mixing chamber 580, or at any angle between a normal angle and tangentially to the vortex mixing chamber 580. A third inlet channel 578 may be configured to receive a second stage inflow fluid. The third inlet channel 578 may be fluidically connected to the second stage vortex mixing chamber 580 via a third inlet port 588. The third inlet port 588 may be configured in a first wall 581 of the vortex mixing chamber 580. In some embodiments, the third inlet port 588 may be configured in the center of the first wall 581, such as the radial center of the first wall 581. The third inlet port 588 may be configured in a second wall 582 of the vortex mixing chamber 580. In some embodiments, the third inlet port 588 may be configured in the center of the second wall 582, such as the radial center of the second wall 582. The first wall 581 and second wall 582 are connected by a side wall 583. In some embodiments, the third inlet port 588 can receive a fifth fluid. In some embodiments, the fifth fluid can include nucleic acid.

The vortex mixing chamber 580 may have a second stage mixer exit port 589 having a second stage mixer exit channel 590 connected thereto. The second stage mixer exit port may be configured at the center of the second wall 582, such as the radial center. Outflow fluid from the second stage mixer 502 flows from the vortex mixing chamber 580 through the second stage mixer exit port 589 and exits via the second stage mixer exit channel 590.

In some embodiments, the second stage mixer 502 can have the same or substantially similar geometry to the embodiment described in FIG. 4A with four inlet channels. In other words, the second stage mixer 502 can have first inlet port 585, second inlet port 586, a third inlet port (not shown) and a fourth inlet port (not shown). In some embodiments, the third inlet port can be fluidically coupled to a third inlet channel (not shown) and the fourth inlet port can be fluidically coupled to a fourth inlet channel (not shown). In some embodiments, the third and fourth inlet channels can include intake ports, where fluid can be added in the second stage mixer. In some embodiments, the third and fourth inlet channels can be fluidically coupled to the splitter 561, in which case the splitter 561 would be a four-way splitter.

Figure 6B:
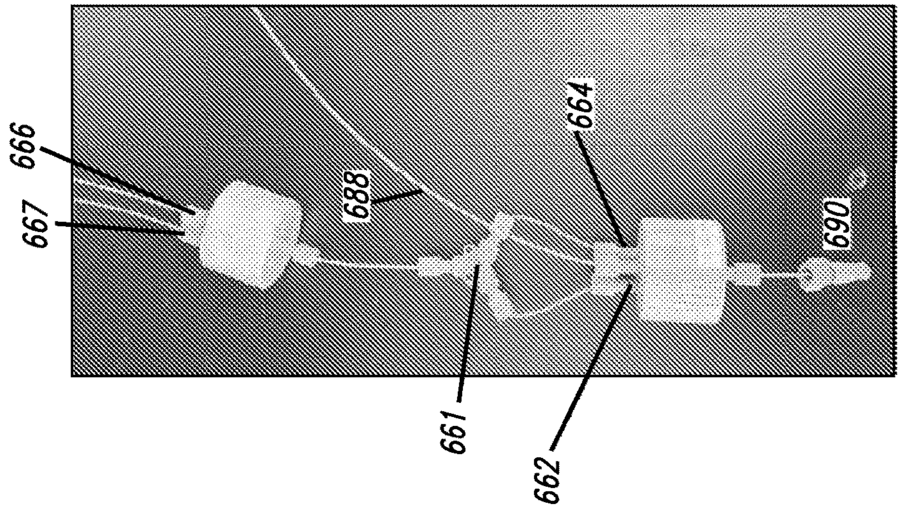
FIGS. 6A-6B show a two stage vortex mixer according to some embodiments.
Figure 6A:
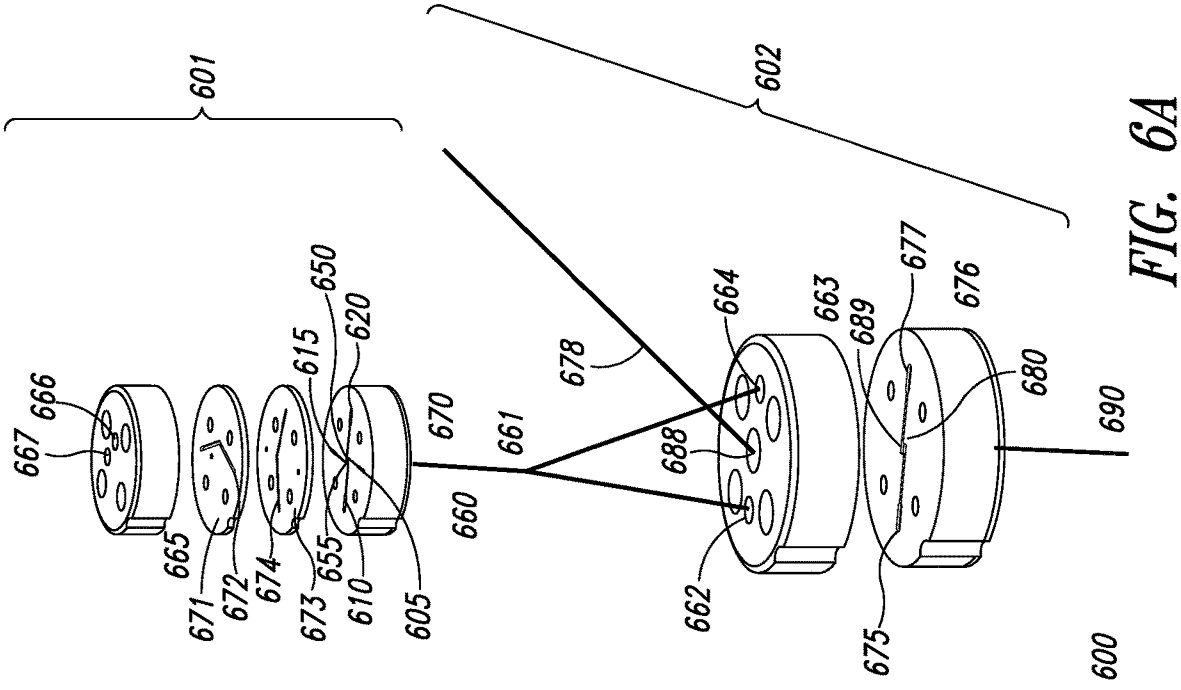

FIG. 6A and FIG. 6B show an embodiment of a two-stage vortex mixing system 600. In this embodiment, a first vortex mixer 601 can operate similarly to the vortex mixer 300 of FIGS. 3A-3B. This first vortex mixer 601 contains internal splitters 671, 673. The internal splitters 671, 673 may be used instead of the external splitters shown in FIG. 6B. In this embodiment, cover 665 has two intake ports 666, 667. A first fluid from intake port 666 enters splitter channel 672 of internal splitter 671. Splitter channel 672 divides the first fluid and sends the first fluid to inlet channels 605, 615. Meanwhile, a second fluid from intake port 667 enters splitter channel 674 of internal splitter 673. Splitter channel 674 divides the second fluid and sends the second fluid to inlet channels 610, 620. Once the first fluid and second fluid enter the inlet channels 605, 610, 615, 620 of mixer component 670, the first vortex mixer 601 operates as discussed above with respect to FIGS. 1A-2. After mixing occurs within an initial vortex mixing chamber 650, the mixed fluid exits the initial vortex mixing chamber 650 through the initial vortex mixer exit port 655 and then through the initial vortex mixer exit channel 660. The first stage mixer outflow fluid then enters a splitter 661. The splitter 661 divides the first stage mixer outflow fluid and directs the first stage mixer outflow fluid to second vortex mixer 602 through two intake ports 662 and 664 on cover 663. The intake ports 662 and 664 each feed the mixed fluid to second stage fluid inlet channels 675 and 677, respectively, located on mixer component 676. The second stage fluid inlet channels 675 and 677 feed fluid to the second stage vortex mixing chamber 680. A third inlet channel 678 may be configured to receive a second stage inflow fluid. The third inlet channel 678 may be fluidically connected to the second stage vortex mixing chamber 680 via a third inlet port 688. After mixing occurs within the second stage vortex mixing chamber 680, product fluid can exit the second stage vortex mixing chamber 680 through a second stage mixer exit channel 690 via a second stage mixer exit port 689. In some embodiments, intake port 666 can receive a first fluid, intake port 667 can receive a second fluid, and inlet port 688 can receive a third fluid.

Figure 7B:
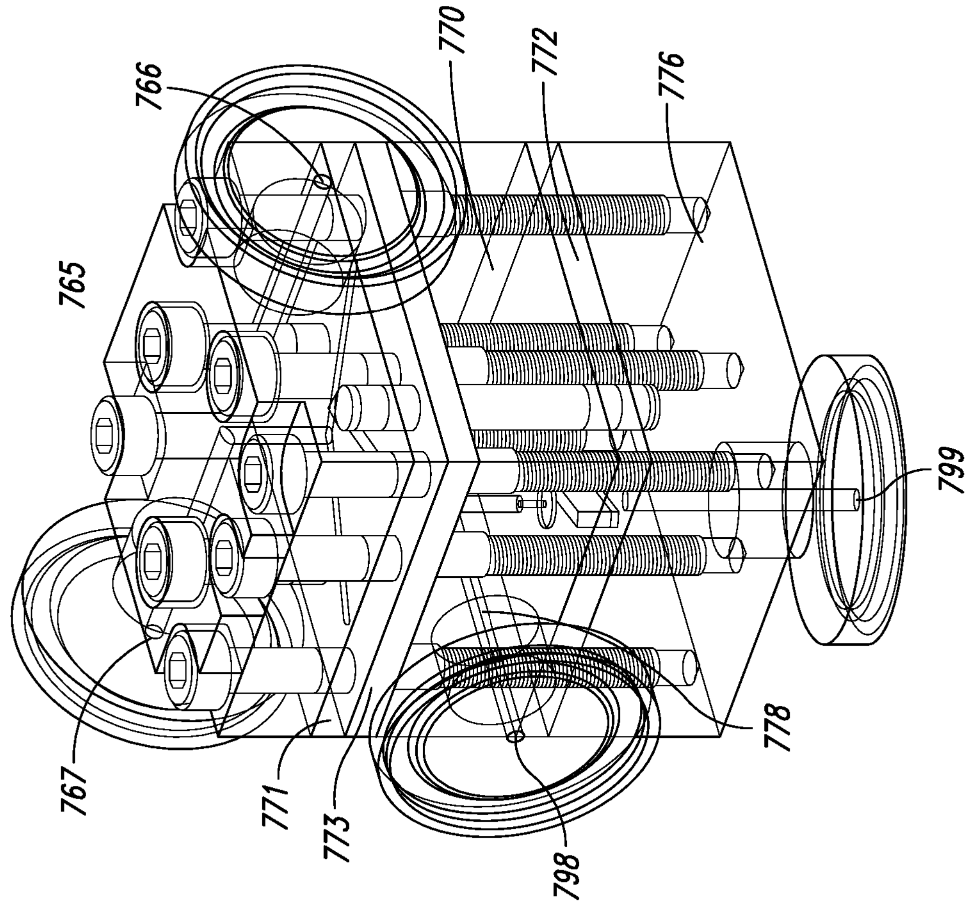
FIGS. 7A-7B show a two stage vortex mixer according to some embodiments.
Figure 7A:
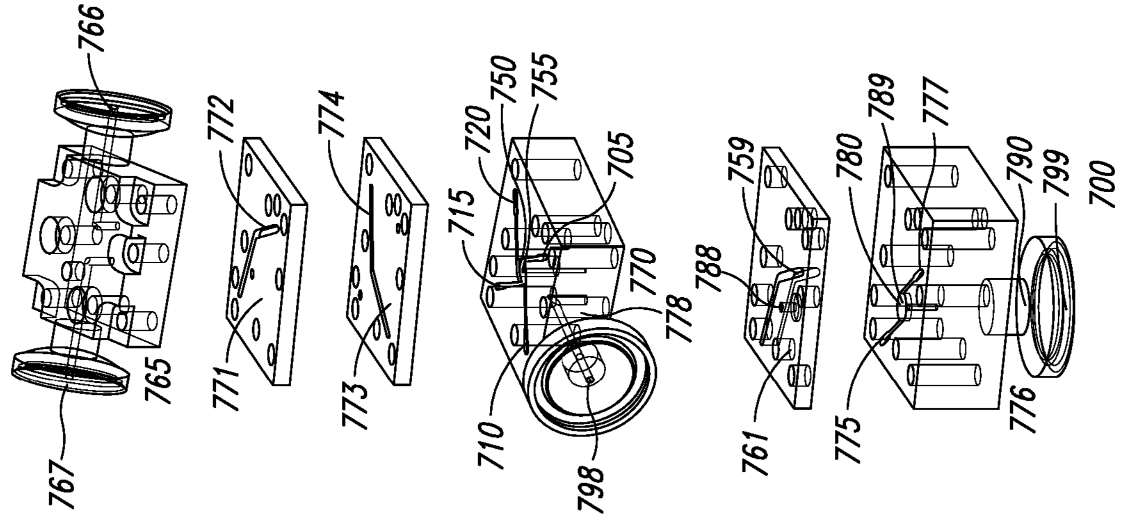

FIG. 7A shows an exploded view of a mixing system 700, which is an alternative embodiment of FIG. 6A. In the embodiment of FIG. 7A, the internal splitters 771, 773 and mixer component 770 operate similarly to the embodiment of FIG. 6. The cover 765, however, receives fluid at intake ports 766, 767. A first fluid enters intake port 766 and is transported via internal fluid channels to internal splitter 771; similarly, a second fluid enters intake port 767 and is transported via internal fluid channels to internal splitter 773. Once the fluid enters the internal splitters 771 and 773 via splitter channels 772 and 774, respectively, the fluid is divided and enters inlet channels 705, 710, 715, 720 as discussed above in reference to FIG. 6A. An initial vortex mixing chamber 750 and exit port 755 are also shown. The first stage mixer outflow fluid then enters a splitter 761 via splitter channel 759. The splitter 761 divides the first stage mixer outflow fluid and directs the first stage mixer outflow fluid to second stage fluid inlet channels 775 and 777 located on mixer component 776. The second stage fluid inlet channels 775 and 777 feed to the second stage vortex mixing chamber 780. A third inlet channel 778 may be configured to receive a second stage inflow fluid. The third inlet channel 778 may be fluidically connected to the second stage vortex mixing chamber 780 via a third inlet port 788. The third inlet channel 778 is fluidically coupled to a third intake port 798. The third intake port 798 can be coupled to mixer component 770. The second stage vortex mixing chamber 780 has a second stage vortex mixing chamber exit port 789, which is coupled to a second stage vortex mixing chamber exit channel 790. The second stage vortex mixing chamber exit channel 790 is fluidically coupled to external exit port 799. FIG. 7B shows the embodiment of FIG. 7A with the cover 765, internal splitters 771, 773, 761 and mixer component 770, 776 assembled.

In each of these embodiments, the size of the vortex mixer may be varied. In some embodiments, all dimensions of the vortex mixer may scale linearly and/or proportionally.

Additionally, in each of these embodiments, the various layers (including but not limited to the cover, splitter(s), mixer component(s), etc.) may be connected by screwing the layers together, by soft bonding (e.g., using materials that can be fused together using pressure), or by any other connection means. Alternatively, the various layers of each of the embodiments may be formed by additive manufacturing, such as 3-D printing, and therefore may be formed as layers and/or as a single part.

In an exemplary embodiment, the first fluid may be lipids in ethanol (also referred to herein as lipid mastermix) and the second fluid may be nucleic acid in buffer. The lipid mastermix and the nucleic acid in buffer may enter the vortex mixing chamber via alternating inlet ports. Thus, in an embodiment having four inlet channels/inlet ports, the lipid mastermix may flow through the first inlet channel to the vortex mixing chamber via a first inlet port; the nucleic acid in buffer may flow through the second inlet channel to the vortex mixing chamber via a second inlet port; the lipid mastermix may flow through the third inlet channel to the vortex mixing chamber via a third inlet port; and the nucleic acid in buffer may flow through the fourth inlet channel to the vortex mixing chamber via a fourth inlet port. The first inlet port may enter the vortex mixing chamber at exactly or approximately 0 degrees; the second inlet port may be at exactly or approximately about 90 degrees; the third inlet port may be at exactly or approximately 180 degrees; and the fourth inlet port may be at exactly or approximately 270 degrees. By mixing these two fluids in the vortex mixing chamber, lipid nanoparticles form that have nucleic acid contained therein.

Figure 8:
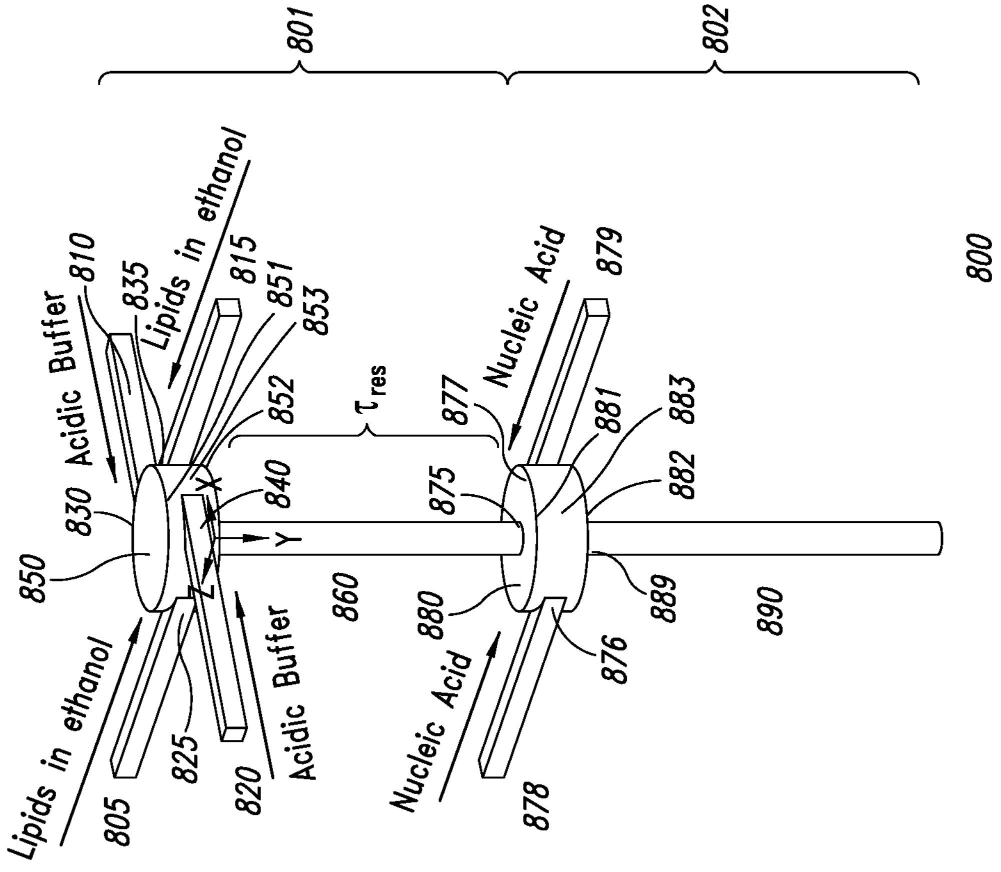
FIG. 8 shows a two stage mixer according to some embodiments.

FIG. 8 shows an embodiment of a two stage mixer 800. The first stage mixer 801 may be configured similar to any of the vortex mixers discussed above. As shown, first stage mixer 801 has a vortex mixing chamber 850 having a first wall 851 and a second wall 852 and a side wall 853 that connects the first wall 851 and the second wall 852. The vortex mixing chamber 850 may have four inlet ports 825, 830, 835, 840 configured along the side wall 853. Each of the four inlet ports 825, 830, 835, 840 may receive fluid from a corresponding inlet channel 805, 810, 815, 820. The first inlet channel 805 and the third inlet channel 815 may receive a first fluid and the second inlet channel 810 and fourth inlet channel 820 may receive a second fluid. In some embodiments, each inlet channel 805, 810, 815, 820 may receive fluid from a separate fluid source. In other implementations, the first inlet channel 805 and third inlet channel 815 may receive a first fluid from a first fluid source; the first fluid may pass through a first fluid splitter that directs the first fluid towards the first inlet channel 805 and the third inlet channel 815. Correspondingly, the second inlet channel 810 and fourth inlet channel 820 may receive a second fluid from a second fluid source; the second fluid may pass through a second fluid splitter that directs the second fluid towards the second inlet channel 810 and the fourth inlet channel 820. The first fluid splitter and the second fluid splitter may be an internal splitter or an external splitter, as discussed above.

The first fluid flows through the first inlet channel 805 and into the vortex mixing chamber 850 via first inlet port 825 and flows through the third inlet channel 815 and into the vortex mixing chamber 850 via third inlet port 835. The first inlet port 825 and third inlet port 835 may be exactly or approximately 180 degrees from each other, and may direct the first fluid such that the first fluid enters the vortex mixing chamber 850 tangentially. In other embodiments, the first inlet port 825 and third inlet port 835 may direct the first fluid such that the first fluid enters the vortex mixing chamber 850 normally or at an angle between the tangent and the normal. Similarly, the second fluid flows through the second inlet channel 810 and into the vortex mixing chamber 850 via second inlet port 830 and flows through the fourth inlet channel 820 and into the vortex mixing chamber 850 via fourth inlet port 840. The second inlet port 830 and fourth inlet port 840 may be exactly or approximately 180 degrees from each other and may be exactly or approximately about 90 degrees from the first inlet port 825 and third inlet port 835. The second inlet port 830 and fourth inlet port 840 direct the second fluid such that the second fluid enters the vortex mixing chamber 850 tangentially, normally, or at any angle in between.

The vortex mixing chamber 850 may have an exit port (not shown) having an exit channel 860 connected thereto.

The exit port may be configured on the second wall 852 of the vortex mixing chamber 850. The exit port may be configured at the center of the second wall 852, such as the radial center. Outflow fluid from the first stage mixer 801 flows from the vortex mixing chamber 850 through the exit port and exits via the exit channel 860.

The first stage mixer outflow fluid flows through the exit channel 860 and into a second stage mixer 802. In the embodiment shown in FIG. 8, the second stage mixer 802 has a vortex mixing chamber 880. The vortex mixing chamber 880 has a first wall 881, a second wall 882, and a side wall 883 that connects the first wall 881 and the second wall 882. The first stage mixer outflow fluid flows from the exit channel 860 and into the vortex mixing chamber 880 via a second stage mixer inlet port 875. The second stage mixer inlet port 875 may be configured in the first wall 881 of the vortex mixing chamber 880. In some embodiments, the second stage mixer inlet port 875 may be configured in the center of the first wall 881, such as the radial center of the first wall 881.

The vortex mixing chamber 880 may have additional inlet ports. In the embodiment shown in FIG. 8, the vortex mixing chamber 880 has two additional inlet ports 876, 877. The two additional inlet ports 876, 877 may be configured to receive a second stage inflow fluid from two inlet channels 878, 879. The two additional inlet ports 876, 877 may be configured exactly or approximately 180 degrees from each other, and may be configured to direct the fluid to enter the vortex mixing chamber 880 tangentially. In other embodiments, the two additional inlet ports 876, 877 may be configured to direct the fluid to enter the vortex mixing chamber 880 non-tangentially, such as at a normal angle or at any angle between the normal and the tangential. The second stage inflow fluid may be received from two separate fluid sources or may be received from a single fluid source and split via an internal or external splitter, as discussed above. In some embodiments, inlet port 825 can receive a first fluid, inlet port 830 can receive a second fluid, inlet port 835 can receive a third fluid, and inlet port 840 can receive a fourth fluid. In some embodiments, the first fluid is the same or substantially similar to the third fluid. In some embodiments, the second fluid is the same or substantially similar to the fourth fluid. In some embodiments, the first fluid and the third fluid can include lipids. In some embodiments, the first fluid and the third fluid can include ethanol. In some embodiments, the second and fourth fluids can include nucleic acid. In some embodiments, the second and fourth fluids can include ethanol. In some embodiments, inlet port 876 can receive a fifth fluid and inlet port 877 can receive a sixth fluid. In some embodiments, the fifth fluid can be the same or substantially similar to the sixth fluid. In some embodiments, the fifth fluid and the sixth fluid can include nucleic acid.

The vortex mixing chamber 880 may have a second stage mixer exit port 889 having a second stage mixer exit channel 890 connected thereto. The second stage mixer exit port may be configured at the center of the second wall 882, such as the radial center. Outflow fluid from the second stage mixer 802 flows from the vortex mixing chamber 880 through the exit port and exits via the second stage mixer exit channel 890.

Figure 9B:
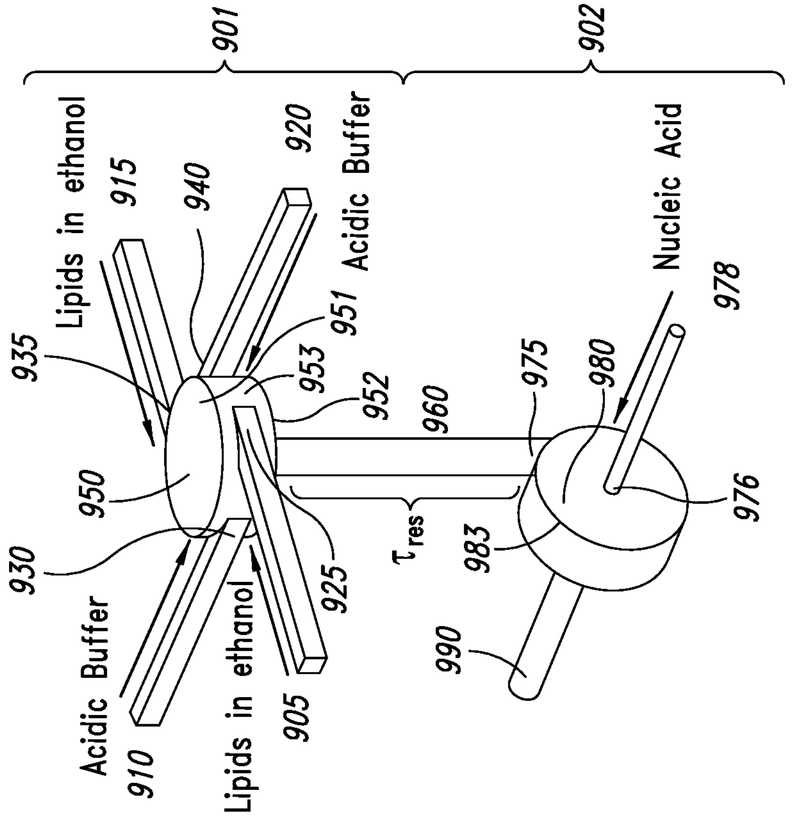
FIGS. 9A-9B shows a two stage vortex mixer according to some embodiments.
Figure 9A:
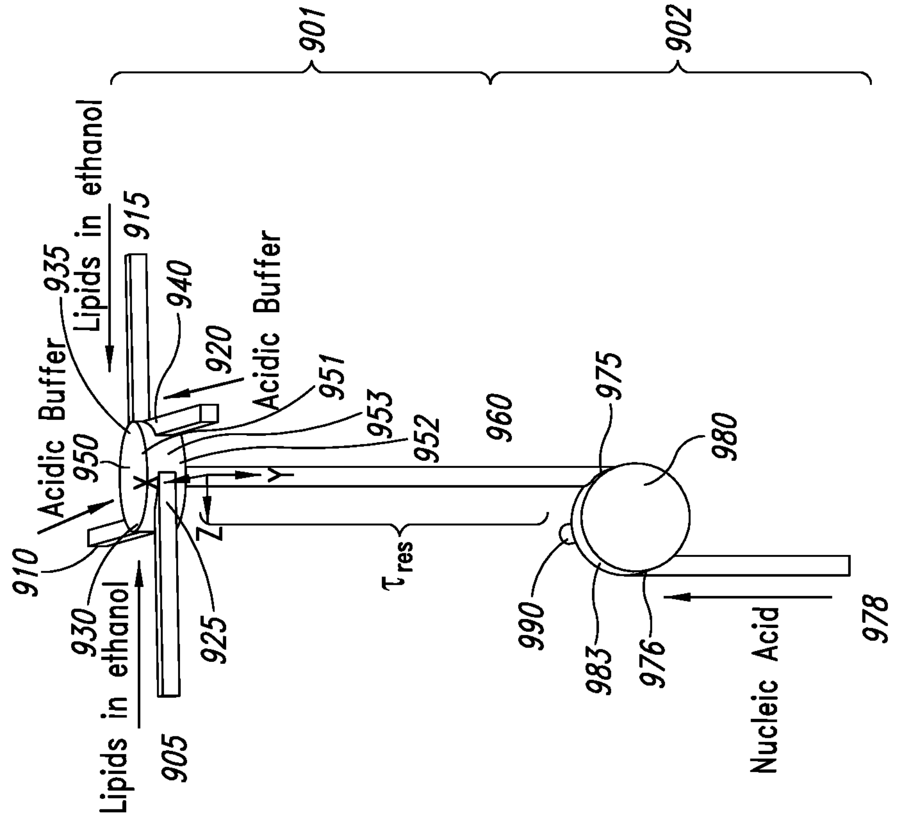

FIGS. 9A-9B show alternative embodiments of a two stage mixer 900. The first stage mixer 901 is configured like the first stage mixer 801 of FIG. 8. As shown, first stage mixer 901 has a vortex mixing chamber 950 having a first wall 951 and a second wall 952 and a side wall 953 that connects the first wall 951 and the second wall 952. The vortex mixing chamber 950 may have four inlet ports 925, 930, 935, 940 configured along the side wall 953. Each of the four inlet ports 925, 930, 935, 940 may receive fluid from a corresponding inlet channel 905, 910, 915, 920. The first inlet channel 905 and the third inlet channel 915 may receive a first fluid and the second inlet channel 910 and fourth inlet channel 920 may receive a second fluid. In some embodiments, each inlet channel 905, 910, 915, 920 may receive fluid from a separate fluid source. In other implementations, the first inlet channel 905 and third inlet channel 915 may receive a first fluid from a first fluid source; the first fluid may pass through a first fluid splitter that directs the first fluid towards the first inlet channel 905 and the third inlet channel 915. Correspondingly, the second inlet channel 910 and fourth inlet channel 920 may receive a second fluid from a second fluid source; the second fluid may pass through a second fluid splitter that directs the second fluid towards the second inlet channel 910 and the fourth inlet channel 920. The first fluid splitter and the second fluid splitter may be an internal splitter or an external splitter, as discussed above. In the embodiments of FIGS. 9A-9B, however, the second stage mixer 902 is turned on its side such that the exit channel 960 from the first stage mixer 901 is configured to enter the second stage vortex mixing chamber 980 via a second stage mixer inlet port 975 configured along a side wall 983 of the vortex mixing chamber 980. The second stage mixer inlet port 975 is configured such that the first stage mixer outflow fluid enters the second stage vortex mixing chamber 980 tangentially. In other embodiments, the second stage mixer inlet port 975 may be configured such that the first stage mixer outflow fluid enters the second stage vortex mixing chamber 980 non-tangentially, such as normally to the vortex mixing chamber 980 or at any angle in between the normal and the tangential. In FIG. 9A, the second stage mixing chamber 980 also has a second inlet port 976 configured along the side wall 983 of the mixing chamber 980. The second inlet port 976 has an inlet channel 978 connected thereto. The second inlet channel 978 receives second stage inlet fluid. The second stage inlet fluid flows from the inlet channel 978 and into the mixing chamber 980 via the second inlet port 976. The second inlet port 976 is configured such that fluid flows into the mixing chamber 980 tangentially. In the embodiment of FIG. 9B, the second inlet port 976 is configured normally to the mixing chamber 980, with the second inlet channel 978 connected to the second inlet port 976. In other embodiments, the second inlet port 976 may be configured such that fluid flows into the mixing chamber 980 at any angle between the normal and the tangential angle. The second inlet port 976 may be configured exactly or approximately 180 degrees from the inlet port 975. The second stage mixer 902 may have a second stage exit port (not shown) which directs the second stage outflow fluid to the second stage exit channel 990. In some embodiments, inlet port 925 can receive a first fluid, inlet port 930 can receive a second fluid, inlet port 935 can receive a third fluid, and inlet port 940 can receive a fourth fluid. In some embodiments, the first fluid is the same or substantially similar to the third fluid. In some embodiments, the second fluid is the same or substantially similar to the fourth fluid. In some embodiments, the first fluid and the third fluid can include lipids. In some embodiments, the first fluid and the third fluid can include ethanol. In some embodiments, the second and fourth fluids can include nucleic acid.

In some embodiments, the second and fourth fluids can include ethanol.

Figure 10:
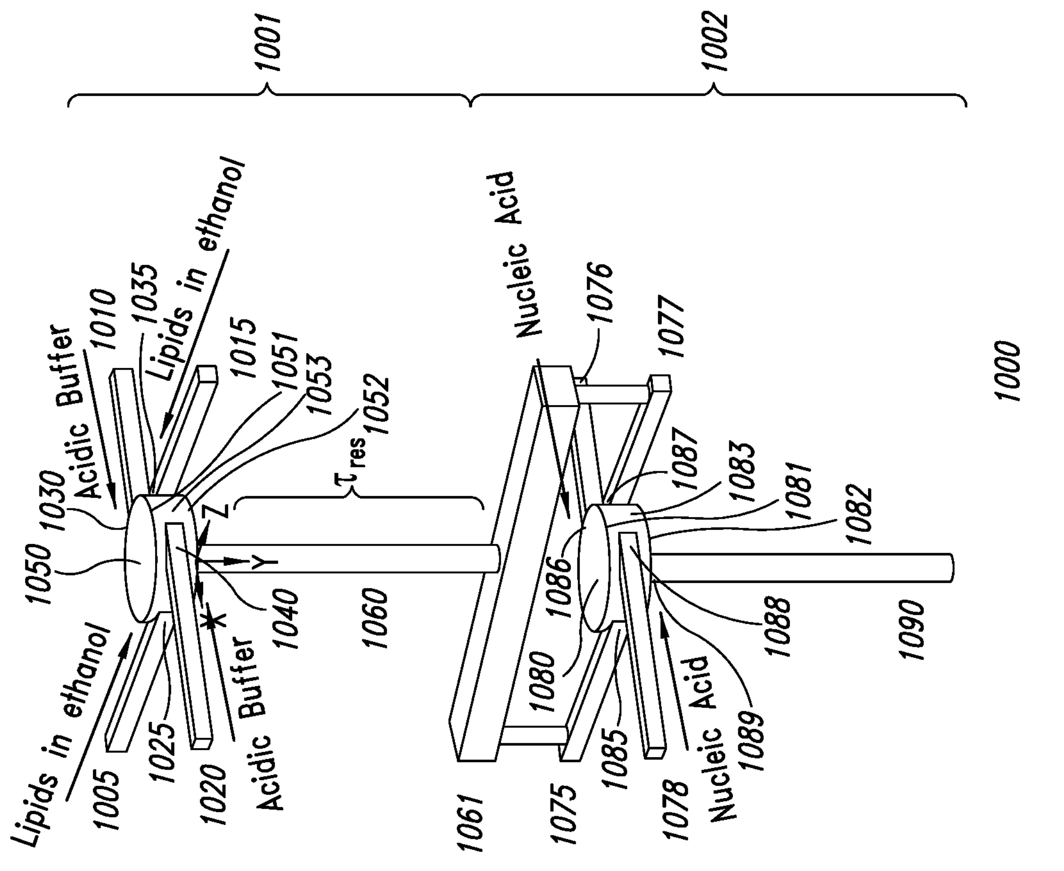
FIG. 10 shows a two stage vortex mixer according to some embodiments.
Figure 11C:
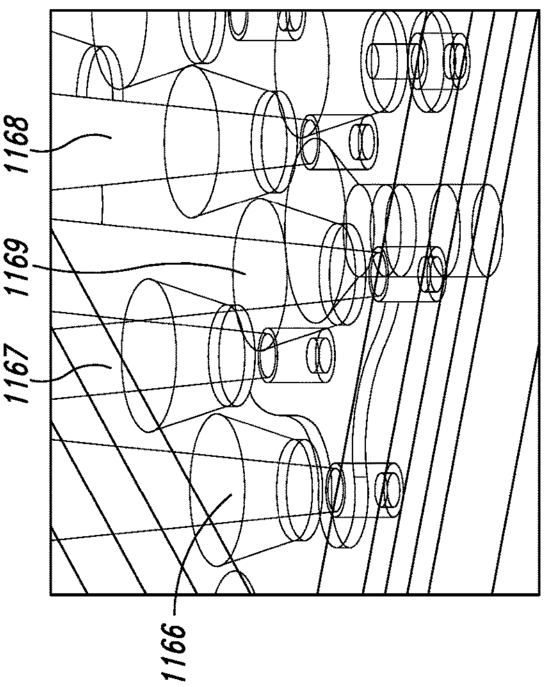
Figure 11D:
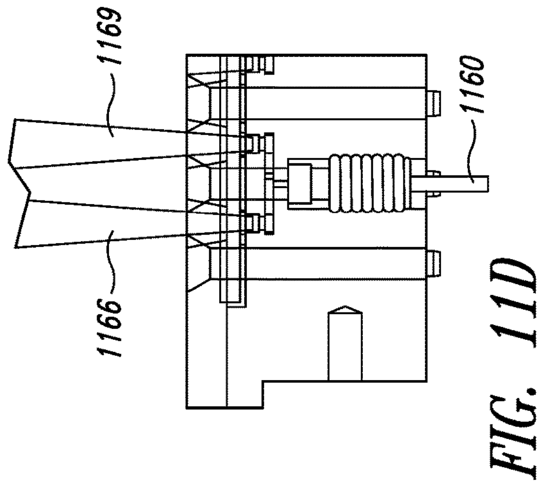
Figure 11A:
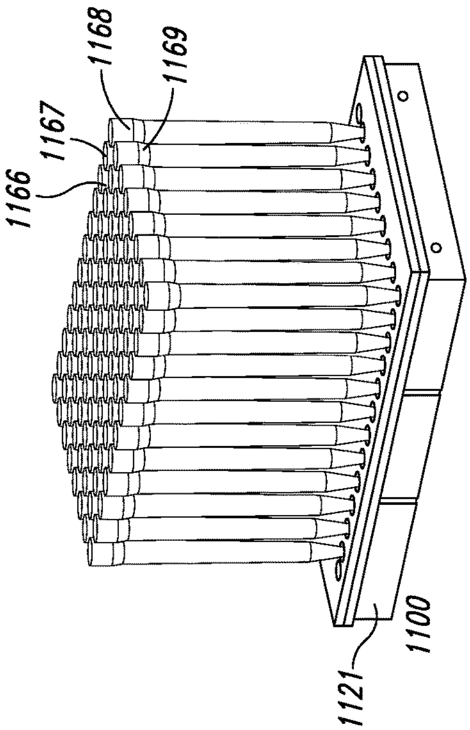
Figure 11B:
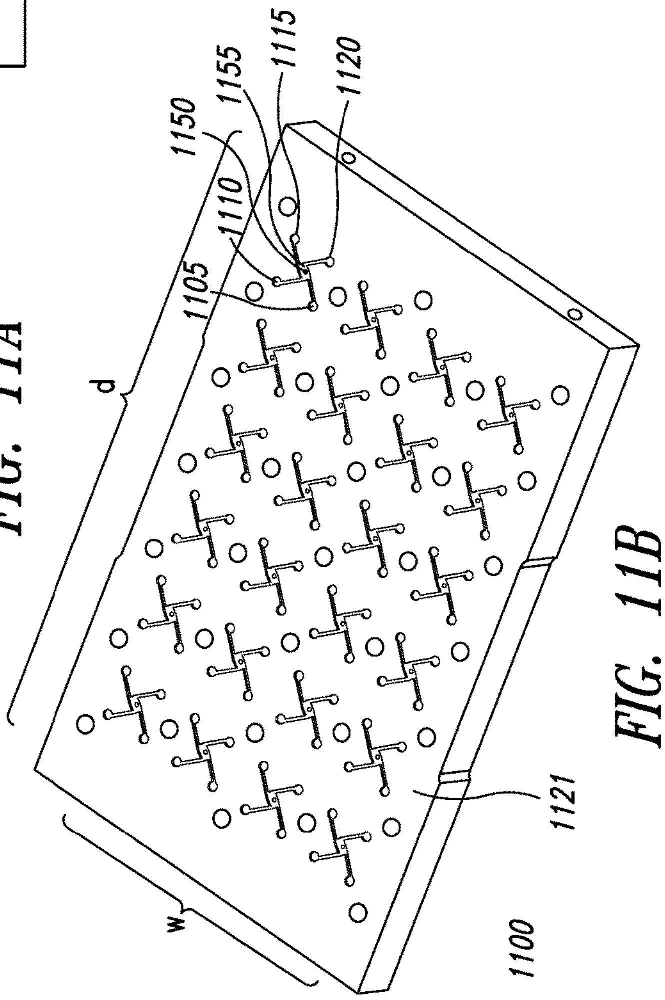

FIG. 10 shows another alternative embodiment of a two stage mixer 1000. The first stage mixer 1001 and the second stage mixer 1002 are each configured like the first stage mixer 801 of FIG. 8. As shown, first stage mixer 1001 has a vortex mixing chamber 1050 having a first wall 1051 and a second wall 1052 and a side wall 1053 that connects the first wall 1051 and the second wall 1052. The vortex mixing chamber 1050 may have four inlet ports 1025, 1030, 1035, 1040 configured along the side wall 1053. Each of the four inlet ports 1025, 1030, 1035, 1040 may receive fluid from a corresponding inlet channel 1005, 1010, 1015, 1020. The first inlet channel 1005 and the third inlet channel 1015 may receive a first fluid and the second inlet channel 1010 and fourth inlet channel 1020 may receive a second fluid. In some embodiments, each inlet channel 1005, 1010, 1015, 1020 may receive fluid from a separate fluid source. In other implementations, the first inlet channel 1005 and third inlet channel 1015 may receive a first fluid from a first fluid source; the first fluid may pass through a first fluid splitter that directs the first fluid towards the first inlet channel 1005 and the third inlet channel 1015. Correspondingly, the second inlet channel 1010 and fourth inlet channel 1020 may receive a second fluid from a second fluid source; the second fluid may pass through a second fluid splitter that directs the second fluid towards the second inlet channel 1010 and the fourth inlet channel 1020. The first fluid splitter and the second fluid splitter may be an internal splitter or an external splitter, as discussed above. Here, the first stage mixer outflow fluid flows out of the first stage vortex mixing chamber 1050 through exit channel 1060 and into a splitter 1061. The splitter 1061 divides the first stage mixer outflow fluid and directs the first stage mixer outflow fluid into a first inlet channel 1075 and a third inlet channel 1077 of the second stage mixer 1002. A second stage inflow fluid flows into a second inlet channel 1076 and a fourth inlet channel 1078. The second stage inflow fluid may be received from two separate fluid sources or may be received from a single fluid source and split via an internal or external splitter, as discussed above.

The first inlet channel 1075, second inlet channel 1076, third inlet channel 1077, and fourth inlet channel 1078 may be fluidically connected to the second stage vortex mixing chamber 1080 via a first inlet port 1085, a second inlet port 1086, a third inlet port 1087, and a fourth inlet port 1088 respectively. The first inlet channel 1075 may be configured in a side wall 1081 of the vortex mixing chamber 1080 The first, second, third, and fourth inlet ports 1085, 1086, 1087, 1088 may each be about 90 degrees apart from one another around the circumference of the side wall 1083. The first inlet port 1085 and third inlet port 1087 may be across from each other, i.e., approximately or exactly 180 degrees apart, and the second inlet port 1086 and fourth inlet port 1088 may be across from each other, i.e., approximately or exactly 180 degrees apart. The first inlet port 1085, second inlet port 1086, third inlet port 1087, and fourth inlet port 1088 may each be configured to direct fluid tangentially with respect to the side wall 1083 of the vortex mixing chamber 1080. In an alternative embodiment, the inlet ports 1085, 1086, 1087, 1088 may be configured to direct fluid at a normal angle with respect to the side wall 1083, or the inlet ports 1085, 1086, 1087, 1088 may be configured to direct fluid at any angle between a normal angle and tangentially to the side wall 1083. The second stage vortex mixing chamber 1080 may have a second stage mixer exit port 1089 having a second stage mixer exit channel 1090 connected thereto. The second stage mixer exit port may be configured at the center of the second wall 1082, such as the radial center. Outflow fluid from the second stage mixer 1002 flows from the vortex mixing chamber 1080 through the exit port and exits via the second stage mixer exit channel 1090. In some embodiments, inlet port 1025 can receive a first fluid, inlet port 1030 can receive a second fluid, inlet port 1035 can receive a third fluid, and inlet port 1040 can receive a fourth fluid. In some embodiments, the first fluid is the same or substantially similar to the third fluid. In some embodiments, the second fluid is the same or substantially similar to the fourth fluid. In some embodiments, the first fluid and the third fluid can include lipids. In some embodiments, the first fluid and the third fluid can include ethanol. In some embodiments, the second and fourth fluids can include nucleic acid. In some embodiments, the second and fourth fluids can include ethanol. In some embodiments, inlet port 1076 can receive a fifth fluid and inlet port 1077 can receive a sixth fluid. In some embodiments, the fifth fluid can be the same or substantially similar to the sixth fluid. In some embodiments, the fifth fluid and the sixth fluid can include nucleic acid.

As discussed above, in some implementations for each of the embodiments shown in FIGS. 5, 8, 9, and 10, the first stage mixer receives lipids in ethanol (lipid mastermix) and an acidic buffer. After mixing in the first stage vortex mixing chamber, the first stage mixer outflow fluid is empty lipid nanoparticles. The size of the empty lipid nanoparticles depends on multiple mixing parameters, such as turbulent kinetic energy and mixing time (tix). The fluid containing the empty lipid nanoparticles passes through the first stage mixer exit channel. As this occurs, time passes ($\tau_{res}$) before the first stage mixer outflow fluid enters the second stage mixer. The empty lipid nanoparticles enter the second stage mixer as discussed above for each of FIGS. 5, 8, 9, and 10; nucleic acid is also introduced into the second stage mixer as described for each of FIGS. 5, 8, 9, and 10. Thus, the empty lipid nanoparticles are mixed with nucleic acid in the second stage mixer. The nucleic acid integrates into the empty lipid nanoparticles, and nucleic acid-holding nanoparticles are formed. The fluid containing nucleic acid-holding nanoparticles then exits the second stage mixer via the second stage mixer exit port and into the second stage mixer exit channel. When the mixers are scaled up, the wall effects and inlet flow regime can change, but adjusting velocity can recover the desired mixing characteristics.

FIG. 11A, FIG. 11B, FIG. 11C, and FIG. 11D show a mixing system 1100, according to an embodiment. In some embodiments, the mixing system 1100 can have a plurality of single stage mixers or multiple stage mixing systems. In some embodiments, the mixers can have the same or substantially similar properties to the mixers described herein with reference to FIGS. 1A-1E, FIG. 2, FIGS. 3A-3B, and/or FIGS. 4A-4C. In some embodiments, the multiple stage mixing systems can have the same or substantially similar properties to the multiple stage mixing systems described herein with reference to FIG. 5, FIGS. 6A-6B, FIGS. 7A-7B, FIG. 8, FIGS. 9A-9B, and/or FIG. 10. In this embodiment, intake ports 1166, 1167, 1168, 1169 feed to inlet channels 1105, 1110, 1115, 1120, respectively. The inlet channels 1105, 1110, 1115, 1120 feed into vortex mixing chamber 1150 and exit through exit port 1155 and exit channel 1160. In this embodiment, the intake ports 1166, 1167, 1168, 1169 are pipettes, coupled to mixer plate 1121. Mixing plate 1121 includes n reactors, arranged side-by-side in the plane of mixer plate 1121 in a d×w configuration, wherein n, d, and w are integers. In the embodiment depicted in FIG. 11A and FIG. 11B, n=24, d=6, and w=4. In this embodiment, the number of pipettes used is 96, as there are 4 intake ports on each vortex mixer. In some embodiments, the mixing system 1100 can include all single stage mixers, as described above in FIGS. 1A-1E. In some embodiments, the mixing system 1100 can include all multiple stage mixing systems as described in FIG. 5. In some embodiments, d and/or w can be 1, 2, 3, 4, 5, 6, 7, 8, 9, 10, 11, 12, 13, 14, 15, 16, 17, 18, 19, 20, or more.

FIG. 12 shows a mixing system 1200 with a mixing plate 1221, according to an embodiment. In some embodiments, the mixing plate 1221 can be the same or substantially similar to the mixing plate 1121, as described in FIG. 11 and can be attached to a plurality of pipettes (not shown) to create a mixing system the same or substantially similar to the mixing system 1100 as described above with reference to FIG. 11. The mixing plate 1221 can be in a fixed position relative to a conveyor stand 1220. The mixing system 1200 can include a plurality of product vessels 1222. After mixed fluids have moved through the system of single stage or multiple stage vortex mixers within the mixing plate 1221, the mixed fluids can be deposited into the product vessels 1222. The product vessels 1222 can have a number of cavities corresponding to the number of single stage or multiple stage vortex mixers on the mixing plate 1221. The mixing plate 1221 can dispense product from each of its single stage or multiple stage vortex mixers into the product vessels 1222 one at a time. Once a single product vessel 1222A has received a desired amount of product fluid, the fluid flow into the single product vessel 1222A can stop momentarily, while the conveyor stand 1220 moves a subsequent product vessel 1222B into a position such that the subsequent product vessel 1222B can receive product. This process can continue for n product vessels 1222, wherein n is an integer. In some embodiments, n can be 2, 3, 4, 5, 6, 7, 8, 9, 10, 11, 12, 13, 14, 15, 16, 17, 18, 19, 20, 21, 22, 23, 24, 25, 26, 27, 28, 29, 30, or more. In some embodiments, the mixing system 1200 can be automated.

In some implementations, however, fouling occurs and foulant accumulates in the vortex mixing chamber. This can result in pressure elevation and spiking as the foulant buildup occludes the exit port. Foulant can also build up at or near the side wall. At long mixing times, the foulant buildup results in an increase in pressure differential indicators (PDI) and decreased mixing efficiency. This further results in decreased mixing quality at or near the side wall of the vortex mixing chamber. This is shown in FIGS. 13A-13C. FIG. 13A shows foulant accumulated in the vortex mixing chamber 1350 of the vortex mixer 1300. FIG. 13B is a chart showing pressure buildup as the fouling occurs over time. FIG. 13C shows the pressure buildup near the side wall of the vortex mixing chamber as a result of foulant accumulation at both mid-chamber and the first and/or second walls of the vortex mixing chamber 1350.

In some such embodiments, the height of the vortex mixing chamber may be the same as the height of the inlet ports and/or inlet channels. This scaling is shown in FIG. 14A. It was found, however, that increasing the height of the vortex mixing chamber decreases fouling and increases mixing quality. Accordingly, FIG. 14B shows an alternative embodiment in which the height of the vortex mixing chamber is increased while other relative dimensions of the vortex mixer 1400 remain the same. Thus, the height of the vortex mixing chamber is larger than the height of the inlet ports and/or inlet channels. In one such embodiment, as shown in FIG. 14B, the side wall 1453 of the vortex mixing chamber 1450 may extend above the top of the inlet ports 1425, 1430, 1435, 1440 and may extend below the bottom of the inlet ports 1425, 1430, 1435, 1440. Thus, the distance between the first wall 1451 and second wall 1452 of the vortex mixing chamber is larger than the height of the inlet ports 1425, 1430, 1435, 1440. In some embodiments, the inlet ports 1425, 1430, 1435, 1440 may be centered within the height of the side wall 1453. A comparison of the pressure over time in the embodiments of FIG. 14A and FIG. 14B is shown in the chart of FIG. 14C. The baseline pressure is reduced and operating time prior to pressure elevation is increased.

FIG. 14D-F show exemplary vortex mixers having varying scales: FIG. 14D shows an exemplary vortex mixer having an approximately 0.3 mm exit port/exit channel diameter; FIG. 14E shows an exemplary vortex mixer having an approximately 1.0 mm exit port/exit channel diameter; and FIG. 14F shows an exemplary vortex mixer having an approximately 4.0 mm exit port/exit channel diameter. All other dimensions scale accordingly.

For example, in an initial embodiment, exit port/exit channel diameter may be about 1.0 mm, and the dimensions may be as follows:

| VORTEX MIXER PART | 1 × SCALE DIMENSIONS |
|---|---|
| Vortex mixing chamber diameter | about 5.00 mm |
| Vortex mixing chamber height | about 1.75 mm |
| Inlet channel/inlet port height | about 0.75 mm |
| Inlet channel/inlet port width | about 0.75 mm |
| Inlet channel length | about 10.0 mm |
| Exit channel/exit port diameter | about 1.00 mm |
| Exit channel length | about 10.0 mm |

The size of the vortex mixer may be scaled up or scaled down. For example, the dimensions may be 0.25×, 0.5×, 0.75×, 1×, 2×, 2.5×, 3×, 4×, 5×, and/or any other scale. Exemplary dimensions are shown in the table below:

| VORTEX MIXER PART | 1 × SCALE DIMENSIONS | 0.5 × SCALE DIMENSIONS | 2 × SCALE DIMENSIONS | 4 × SCALE DIMENSIONS |
|---|---|---|---|---|
| Vortex mixing chamber diameter | about 5 mm | about 2.5 mm | about 10 mm | about 20 mm |
| Vortex mixing chamber height | about 1.75 mm | about 0.875 mm | about 3.5 mm | about 7 mm |
| Inlet channel/inlet port height | about 0.75 mm | about 0.375 mm | about 1.5 mm | about 3 mm |
| Inlet channel/inlet port width | about 0.75 mm | about 0.375 mm | about 1.5 mm | about 3 mm |
| Inlet channel length | about 10 mm | about 5 mm | about 20 mm | about 40 mm |
| Exit channel/exit port diameter | about 1 mm | about 0.5 mm | about 2 mm | about 4 mm |
| Exit channel length | about 10 mm | about 5 mm | about 20 mm | about 40 mm |

By changing the dimensions, the flow rate through the inlet channels/inlet ports and exit channel/exit port may vary proportionally. In an exemplary embodiment, a first fluid flows through a first inlet channel 1405 to a first inlet port 1425 and through a third inlet channel 1415 to a third inlet port 1435, and a second fluid flows through a second inlet channel 1410 to a second inlet port 1430 and through a fourth inlet channel 1420 to a fourth inlet port 1440. The first fluid and second fluid may be directed to each corresponding inlet channel by separate fluid entry lines (not shown) or via splitters as discussed above. The first and third inlet ports 1425, 1435 may allow the first fluid to enter the vortex mixing chamber 1450 directly or approximately across from each other. Similarly, the second and fourth inlet ports 1430, 1440 may allow the second fluid to enter the vortex mixing chamber 1450 directly or approximately across from each other. Each of the first, second, third, and fourth inlet ports 1425, 1430, 1435, 1440 may each allow fluid to enter the vortex mixing chamber at exactly or approximately 90° from the other inlet ports. As discussed above, the inlet ports 1425, 1430, 1435, 1440 and inlet channels 1405, 1410, 1415, 1420 may be configured tangentially to the vortex mixing chamber 1450, normally to the vortex mixing chamber 1450, or at any angle in between.

In some implementations, when using the 1× scale discussed above, the flow rate of the first fluid may be 15 ml/min through each of the first and third inlet channels 1405, 1415 and the flow rate of the second fluid may be 45 ml/min through each of the second and fourth inlet channels 1410, 1420. The flow rate through the exit channel 1460 may be 120 ml/min. These rates may change when the vortex mixer is scaled up or down, as discussed above. So, for example, the flow rates may vary as follows:

| | 1 × SCALE FLOW RATES | 0.5 × SCALE FLOW RATES | 2 × SCALE FLOW RATES | 4 × SCALE FLOW RATES |
|---|---|---|---|---|
| First fluid (per arm) | about 20 ml/min | about 6.25 ml/min | about 94 ml/min | about 625 ml/min |
| Second fluid (per arm) | about 60 ml/min | about 18.75 ml/min | about 281 ml/min | about 1875 ml/min |
| Exit channel | about 160 ml/min | about 50 ml/min | about 750 ml/min | about 5000 ml/min |

By increasing the height of the vortex mixing chamber as discussed above with respect to FIGS. 14A-14B, an increase in flow rate may be required in order to maintain equivalent mixing energy. FIGS. 15A-15C show mixing in the chamber, where the dark blue is not mixed (or minimally mixed) and the green is fully mixed (or approximately fully mixed). FIG. 15A shows mixing in a 1× scale vortex mixer at a set inlet velocity, while FIG. 15B shows mixing in a 4× scale vortex mixer at the same set inlet velocity. The 1× scale vortex mixer of FIG. 15A results in significantly more mixing than the 4× scale vortex mixer of FIG. 15B at the same set inlet velocity. Thus, in order for the larger scale vortex mixer to result in more mixing, the inlet velocity is increased, as is shown in FIG. 15C. FIG. 15D is a graph showing the mixing timescale (in ms) as a function of inlet velocity (m/s), together with FIGS. 15A-15C.

Moreover, increasing the height of the vortex mixing chamber such that the vortex mixing chamber height is greater than the height of the inlet arms and inlet ports—e.g., from the embodiment shown in FIG. 14A to the embodiment shown in FIG. 14B—results in a reduction in the coefficient of variation while maintaining the central mixing pattern.

The coefficient of variation (CoV) may be the special distribution of phases at the exit port and/or exit channel, and may be:

$$CoV = \frac{\text{standard deviation}}{\text{mean}} * 100\%$$

In an exemplary embodiment, increasing the height of the vortex mixing chamber results in a reduction in the coefficient of variation from 61 to 35. Corresponding changes are shown in FIG. 15E at the horizontal mid-plane, vertical mid-plane, and the first wall of the vortex mixing chamber. The left hand column of FIG. 15E shows the mass fraction of a first fluid during mixing of the embodiment discussed above in FIG. 14A; the right hand column of FIG. 15E shows the mass fraction of a first fluid during mixing of the embodiment discussed above with respect to FIG. 14B. In the exemplary embodiment discussed above, FIG. 15E may show the mass fraction of ethanol in the vortex mixer.

FIG. 16A shows exemplary minimum flow rate and minimum and maximum batch sizes for various exit channel/exit port diameters. The other dimensions of the vortex mixer may scale accordingly and proportionally similar to the chart above. FIG. 16B is a chart showing the diameter (nm) of the nanoparticles that form as a function of total flow rate (ml/min) for a 0.3 mm exit channel/exit port diameter, 0.5 mm exit channel/exit port diameter, and 1.0 mm exit channel/exit port diameter. FIG. 16C shows the diameter (nm) of the nanoparticles that form as a function of inlet velocity (m/s) for a 0.3 mm exit channel/exit port diameter, a 0.5 mm exit channel/exit port diameter, and a 1.0 mm exit channel/exit port diameter. FIG. 16D shows the diameter (nm) of the particles that form as a function of inlet velocity (m/s) for a 1.0 mm exit channel/exit port diameter, a 2.0 mm exit channel/exit port diameter, and a 4.0 mm exit channel/exit port diameter.

Based on the data of FIG. 16D, a faster inlet velocity is needed in order to achieve the same particle diameter in the larger scale mixers. That is, to achieve the same particle diameter, the inlet velocity is faster in a mixer having a 4.0 mm exit channel/exit port diameter as compared to a mixer with a 2.0 mm exit channel/exit port diameter and a mixer with a 1.0 mm exit channel/exit port diameter, and the inlet velocity for the mixer with the 2.0 mm exit channel/exit port diameter is slower than the mixer with the 4.0 m/s exit port/exit diameter and faster than the mixer with the 1.0 m/s exit port/exit diameter. By comparing the velocities required to achieve a particle diameter, an effective velocity adjustment may be applied. Because of energy loss in the larger mixers, the 2.0 mm exit port/exit diameter mixer loses approximately or exactly 10% of energy compared to the 1.0 mm exit port/exit diameter mixer, and the 4.0 mm exit port/exit diameter mixer loses approximately or exactly 30% of energy compared to the 1.0 mm exit port/exit diameter mixer. To account for this energy loss, an effective velocity adjustment may be applied to the inlet velocities in order to determine an adjusted inlet velocity—so for a 1.0 mm exit port/exit diameter mixer, the effective velocity adjustment is 100%; for a 2.0 mm exit port/exit diameter mixer, the effective velocity adjustment is 90% (to account for the 10% energy loss); and for a 4.0 mm exit port/exit diameter mixer, the effective velocity adjustment is 70% (to account for the 30% energy loss). These values are shown in the table of FIG. 16E.

FIG. 16F shows the plot of FIG. 16D after applying the effective velocity adjustments in FIG. 16E. Thus, FIG. 16F shows the particle diameter (nm) as a function of the adjusted inlet velocity (m/s). FIG. 16G shows the pressure (psi) within the vortex mixer as a function of the adjusted inlet velocity (m/s). This shows that, while particle diameter (nm) can be adjusted by changing inlet velocity, an increased inlet velocity results in higher operating pressure.

FIG. 16H shows diameter (nm) of the nanoparticles that form as a function of turbulent kinetic energy (TKE) (J/kg) for a 0.3 mm exit channel/exit port diameter, a 0.5 mm exit channel/exit port diameter, and a 1.0 mm exit channel/exit port diameter. The TKE may be the mean kinetic energy per mass associated with turbulent eddies in flow. FIG. 16I shows diameter (nm) of the nanoparticles that form as a function of minimum mixing time (ms) for a 0.3 mm exit channel/exit port diameter, a 0.5 mm exit channel/exit port diameter, and a 1.0 mm exit channel/exit port diameter. As shown, diameter scales with both turbulent kinetic energy and minimum mixing time ($\tau_{mix}$). The time to reach a sufficiently mixed state is defined by:

$$\tau_{mix} = \left(\frac{\lambda_K^2}{4D}\right) \qquad \lambda_K = \left(\frac{v^3}{\epsilon}\right)^{1/4}$$

$\epsilon$ = Turbulent energy dissipation rate [J/kg/s]

$v$ = kinematic viscosity [$m^2/s$]; $v = \frac{\mu}{p}$ $D$ = Diffusion coefficient [$m^2/s$]

The time that the fluid remains in the vortex mixing chamber should be greater than the micromixing timescale. Otherwise, fluid is expelled from the mixer prior to becoming fully mixed. Thus, the average residence time that the fluid remains in the chamber should be:

$$\tau_{res,avg} = \frac{Q}{V}$$

$Q$ = volumetric flow rate [$m^3/s$]

$V$ = mixer volume [$m^3$]

Based on the data of the charts in FIGS. 16H-16I, it was found that when turbulent kinetic energy TKE>2 J/kg the mixing time $\tau_{mix}$<5 ms. When using larger geometries, as discussed above, at constant velocity, an increase in TKE and a decrease in $\tau_{mix}$ may be needed in order to achieve fully turbulent flow profiles in the vortex mixing chamber. The TKE (J/kg) as a function of inlet velocity (m/s) for a 0.5 mm exit channel/exit port diameter, a 1.0 mm exit channel/exit port diameter, a 2.0 mm exit channel/exit port diameter, and a 4.0 mm exit channel/exit port diameter is shown in FIG. 16J. The minimum mix time (ms) as a function of the inlet velocity (m/s) for these same geometries is shown in FIG. 16K.

FIG. 16L shows the minimum total flow rate (ml/min) to achieve sufficient mixing for various mixer scales (mm of the exit port/exit channel diameter). FIG. 16M is a table showing the minimum total flow rates for mixers having a 0.3 mm exit port/exit channel diameter, 0.5 mm exit port/exit channel diameter, 1.0 mm exit port/exit channel diameter, 2.0 mm exit port/exit channel diameter, and 4.0 mm exit port/exit channel diameter.

FIG. 16N shows inlet Reynolds as a function of inlet velocity (m/s) for a 0.5 mm exit channel/exit port diameter, a 1.0 mm exit channel/exit port diameter, a 2.0 mm exit channel/exit port diameter, and a 4.0 mm exit channel/exit port diameter.

In some implementations, it was found that nucleic acid mixed prematurely and that precipitation occurs when nucleic acid interacts with the ethanol. The premature mixing of the nucleic acid impacts the efficient assembly of lipid nanoparticles, and the precipitation results in fouling. Thus, instead of forming lipid nanoparticles with the nucleic acid contained therein in a single step, as discussed in the exemplary embodiment above, a two stage vortex mixer can be used. The two stage vortex mixer may have two mixers in series: a first stage vortex mixer and a second stage vortex mixer. The first stage vortex mixer can mix lipids in ethanol (i.e., lipid mastermix) and an acidic buffer to form empty nanoparticles, and the second stage vortex mixer can mix the empty nanoparticles formed in the first stage vortex mixer with nucleic acid to form nucleic acid-holding nanoparticles. This way, there is a temporal distinction between the formation of the empty nanoparticles and the addition of the nucleic acid to form the nucleic acid-holding nanoparticles. As such, the empty nanoparticles are fully formed before nucleic acid is introduced. The nucleic acid is not exposed to un-emulsified buffer, thereby avoiding degradation of the nucleic acid by exposure to an acidification buffer. Instead, the empty lipid nanoparticles are formed, the nucleic acid is introduced in the second stage vortex mixer, and the nucleic acid integrates into the empty lipid nanoparticles by hydrophobic interaction and/or charged interaction. This results in better encapsulation of nucleic acid in the lipid nanoparticles, which, in turn, results in more unified particles.

Figure 17A:
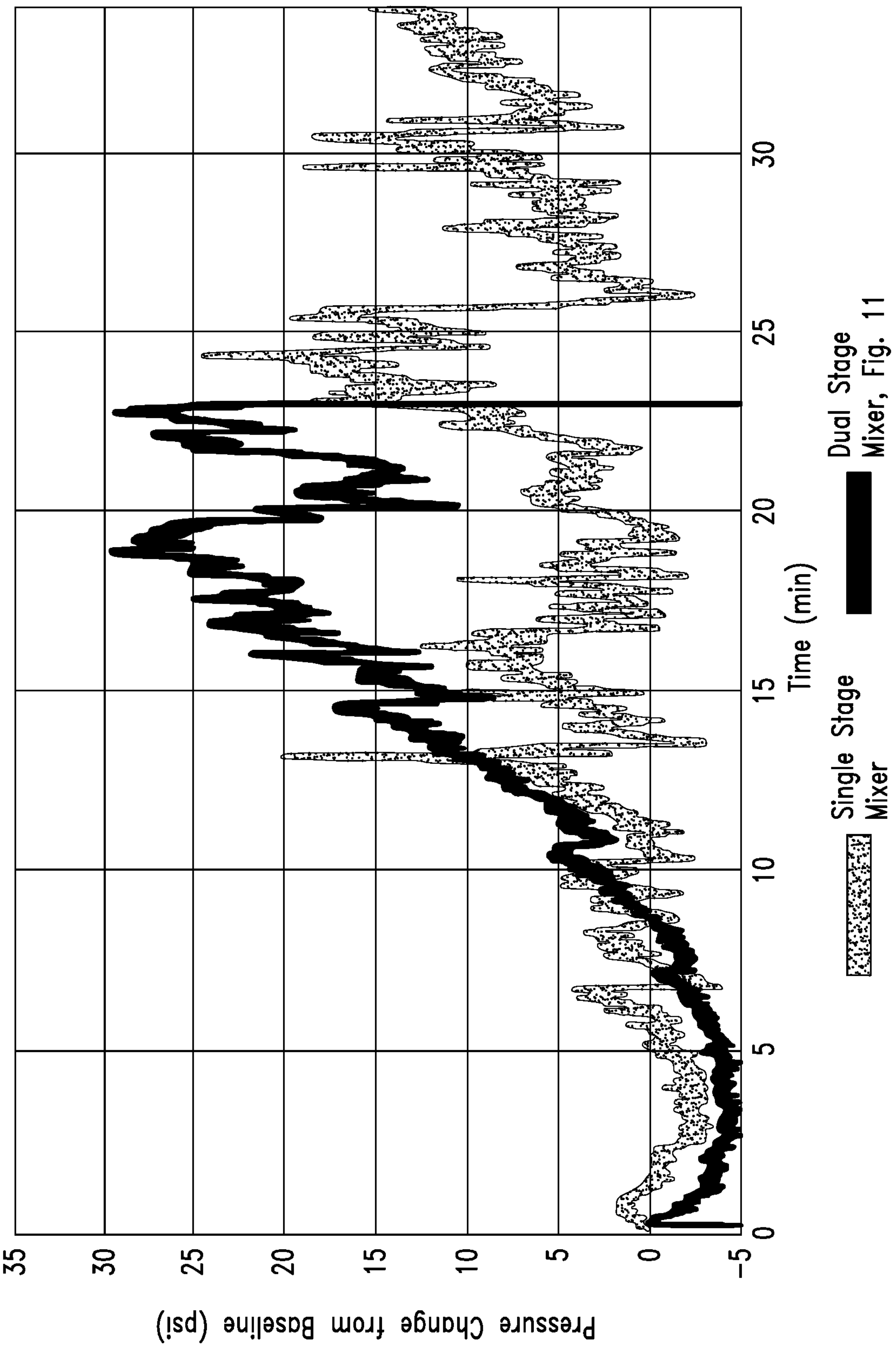
Figure 17B:
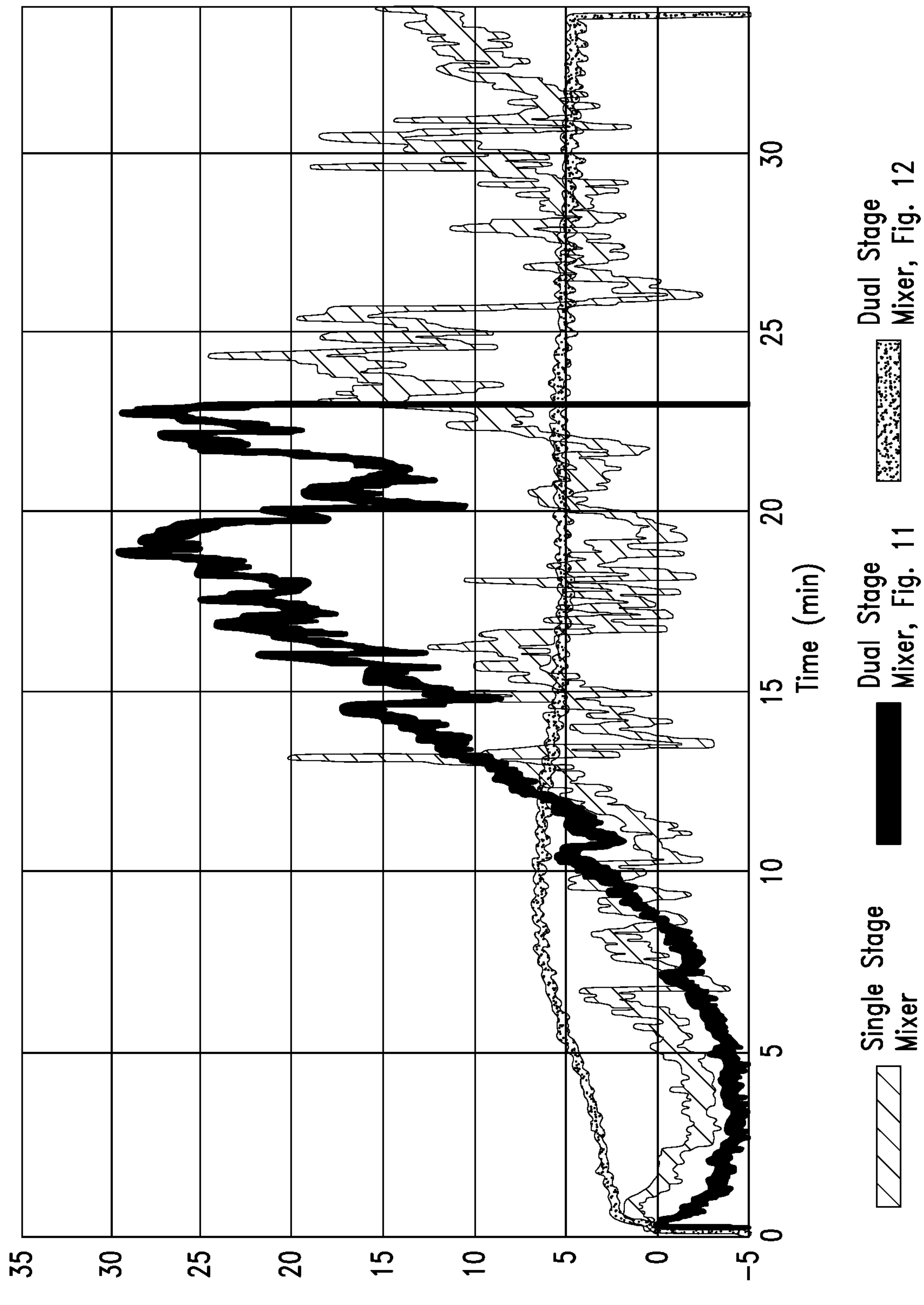

FIG. 17A shows a graph of pressure change from a baseline pressure (psi) over time (min). The green plot shows the pressure change in a single stage mixer, while the orange plot line shows the pressure change in the dual stage mixer shown in FIG. 10. FIG. 17B is a graph of pressure change from a baseline pressure (psi) over time (min). FIG. 17B shows the same plot as FIG. 17A, where the green plot line shows the pressure change in a single stage mixer and the orange line shows the pressure change in the dual stage mixer of FIG. 10, but here the pressure change in the dual stage mixer of FIG. 5 is shown in red. This shows that the pressure variation and the pressure spikes are vastly reduced in the embodiment of FIG. 5 as compared with the single stage mixer and the dual stage mixer of FIG. 10. This is, at least in part, because the embodiment of FIG. 5 results in much less fouling than the single stage mixer and the dual stage mixer of FIG. 10.

Figure 17D:
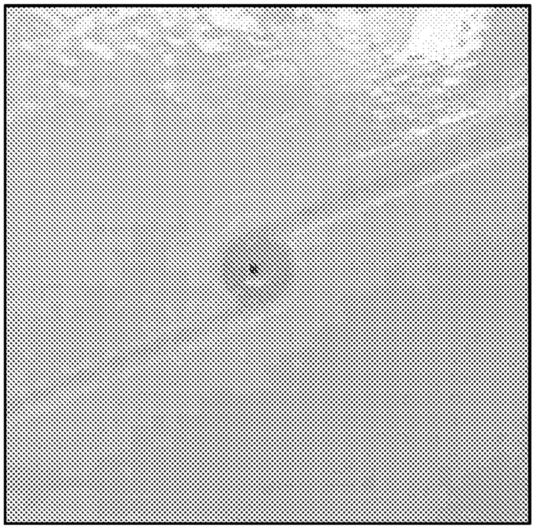
Figure 17C:
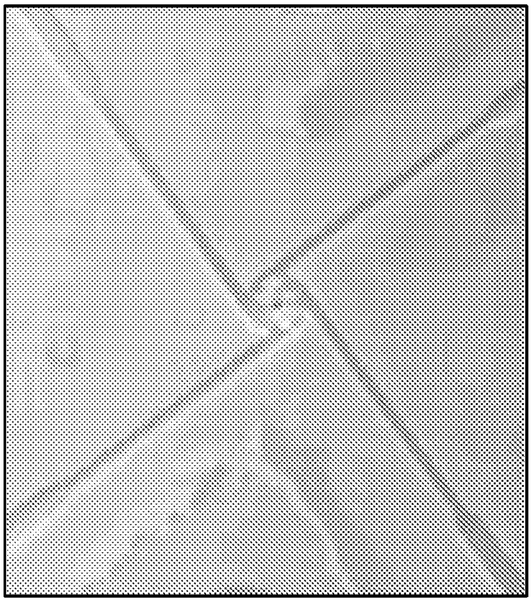

FIG. 17C shows the second stage mixer 1002 after a sample test run of the embodiment in FIG. 10. FIG. 17D shows the second stage mixer 502 after a sample test run of the embodiment in FIG. 5. FIG. 17D shows no or minimal precipitant, meaning that no or minimal fouling occurred, whereas FIG. 17C shows buildup of precipitant, meaning that fouling occurred and explaining the increased pressure and pressure spikes shown in the green and orange plot lines of FIGS. 17A-17B.

FIG. 18A shows fluid path lines in an exemplary vortex mixer that receives two fluids via inlet ports/channels along a side wall 1853 of a vortex mixing chamber 1850. The first fluid enters the vortex mixing chamber 1850 via a first inlet channel 1805/inlet port 1825 and via a third inlet channel 1815/inlet port 1835, and the second fluid enters the vortex mixing chamber 1850 via a second inlet channel 1810/inlet port 1830 and via a fourth inlet channel 1820/inlet port 1840. FIG. 18A shows the first fluid in blue as it enters the vortex mixing chamber 1850 via first inlet channel 1805/inlet port 1825, and the second fluid is shown in red after it enters vortex mixing chamber 1850 via second inlet channel 1810/ inlet port 1830. For ease of viewing, the colors are not shown as they relate to the third and fourth inlet channels/ inlet ports. Once the blue and the red fluids are fully mixed, the fluid path lines are shown in yellow. In this embodiment, and as can be seen in FIG. 18A, there is a concentration of the first fluid along the side wall after the first inlet port 1825 and a concentration of the second fluid along the side wall after the second inlet port 1830. Thus, mixing begins along the side wall 1853 of the vortex mixing chamber 1850, and the fully mixed fluid circles the vortex mixing chamber 1850 towards the center of the chamber until the mixed fluid reaches the exit port and exits via the exit channel 1860. This configuration may result in significant fouling because so much of the mixing occurs at the side wall 1850 and because there is oversaturation of the first fluid after the first and third inlet ports 1825, 1835 and of the second fluid after the second and fourth inlet ports 1830, 1840.

FIG. 18B shows fluid lines in an alternative configuration of a vortex mixer, such as the configuration shown in the second stage mixer 502 of FIG. 5 (and discussed above with respect to FIGS. 17B and 17D). Here, a first fluid may enter the vortex mixing chamber 1880 via at least a first inlet channel 1875/inlet port 1885 and a second inlet channel 1877/inlet port 1886, and a second fluid may enter the vortex mixing chamber 1880 via a third inlet channel 1878/inlet port 1888. The first and second inlet ports 1885, 1886 may be configured along the side wall 1883 of the vortex mixing chamber 1880, while the third inlet port 1888 may be configured on a first wall 1881 of the vortex mixing chamber 1880. The first wall 1881 of the vortex mixing chamber 1880 may be configured opposite of the second wall 1882 of the vortex mixing chamber 1880, where the first wall 1881 and the second wall 1882 are parallel (or approximately parallel) to one another and are connected via the side wall 1883. In some embodiments, the third inlet port 1888 may be configured at or near the radial center of the first wall 1881 and may be opposite an exit port 1889 that is configured at or near the radial center of the second wall 1882. The exit port 1889 may be connected to an exit channel 1890.

In FIG. 18B, the blue fluid lines represent the second fluid which enters the vortex mixing chamber 1880 from third inlet channel 1878/inlet port 1888. The second fluid mixes with the first fluid (not shown) which is swirling around the vortex mixing chamber 1880. The mixing happens at or near the center of the vortex mixing chamber 1880. Some, most, or all of the mixing occurs in the vortex mixing chamber 1880 before the mixed fluid, shown in yellow, exits the vortex mixing chamber 1880 via exit port 1889 and into exit channel 1890. In some embodiments, all or almost all of the mixing occurs in the vortex mixing chamber 1880 before the mixed fluid exits the vortex mixing chamber 1880 via exit port 1889 to exit channel 1890. In some embodiments, some mixing may occur in the vortex mixing chamber 1880 and mixing may continue as the fluid swirls past exit port 1889 and into exit channel 1890.

In the embodiment of FIG. 18B, the mixing occurs at or near the center of the vortex mixing chamber 1880. This configuration results in decreased fouling and decreased mixing time because the mixing occurs away from the walls of the vortex mixing chamber 1880, and because it avoids oversaturation of alternating fluids, as noted in FIG. 18A.

FIGS. 19A-19B show a mixing ratio as a function of time (s). The mixing ratio may represent the ratio of a first component found in a first fluid to be mixed in the vortex mixer to a second component found in a second fluid to be mixed in the vortex mixer. For example, when mixing lipids and nucleic acid, a local N:P ratio may be used, where N represents nitrogen groups in the lipids and P represents phosphorous groups in the nucleic acid. FIG. 19A shows the mixing ratio as a function of time (s) in the embodiment of FIG. 18A, while FIG. 19B shows the mixing ratio as a function of time (s) in the embodiment of FIG. 18B. Thus, in the mixer of FIG. 18B, equilibrium (e.g., a fully mixed ratio) is achieved much faster than in the mixer of FIG. 18A. In the embodiment of FIGS. 18B and 19B, the N:P ratio achieves equilibrium in approximately 0.002 seconds, whereas in the embodiment of FIGS. 18A and 19A, the N:P ratio does not achieve equilibrium until approximately 0.025 seconds.

Although the exemplary embodiments discussed above refer to forming nucleic acid-containing lipid nanoparticles, it should be noted that the lipid nanoparticles can also encapsulate other nucleic acids, proteins, and the like.

Each of the embodiments of the vortex mixer(s) discussed herein can be formed from a large number of materials, including but not limited to stainless steel, LFEM, acrylic, PEEK, 3-D printed media, etc.

Any and all references to publications or other documents, including but not limited to, patents, patent applications, articles, webpages, books, etc., presented in the present application, are herein incorporated by reference in their entirety.

Definitions

As used herein, the term "about" or "approximately" generally means±10%, of the value stated, e.g., about 90 degrees would include 81 degrees to 99 degrees, about 1,000 μm would include 900 μm to 1,100 μm. In some embodiments, "about" or "approximately" generally means±9%, ±8%, ±7%, ±6%, ±5%, ±4%, ±3%, ±2%, or ±1% of the stated value. In some embodiments, when "about" or "approximately" refers to angle measurements, these terms generally mean±10 degrees, ±9 degrees, ±8 degrees, ±7 degrees, ±6 degrees, ±5 degrees, ±4 degrees, ±3 degrees, ±2 degrees, or ±1 degree of the stated value. In some embodiments, when "about" or "approximately" refers to distances, these terms generally mean±10 mm, ±9 mm, ±8 mm, ±7 mm, ±6 mm, ±5 mm, ±4 mm, ±3 mm, ±2 mm, ±1 mm, ±900 μm, ±800 μm, ±700 μm, ±600 μm, ±500 μm, ±400 μm, ±300 μm, ±200 μm, ±100 μm, ±90 μm, ±80 μm, ±70 μm, ±60 μm, ±50 μm, ±40 μm, ±30 μm, ±20 μm, or ±10 μm of the stated value.

Nucleic Acids

In some embodiments, the nucleic acid is a polynucleotide (e.g., ribonucleic acid or deoxyribonucleic acid). The term "polynucleotide," in its broadest sense, includes any compound and/or substance that is or can be incorporated into an oligonucleotide chain. Exemplary polynucleotides for use in accordance with the present disclosure include, but are not limited to, one or more of deoxyribonucleic acid (DNA), ribonucleic acid (RNA) including messenger mRNA (mRNA), hybrids thereof, RNAi-inducing agents, RNAi agents, siRNAs, shRNAs, miRNAs, antisense RNAs, ribozymes, catalytic DNA, RNAs that induce triple helix formation, aptamers, vectors, etc. In some embodiments, the nucleic acid or polynucleotide is an RNA. RNAs can be selected from the group consisting of, but are not limited to, shortmers, antagomirs, antisense, ribozymes, small interfering RNA (siRNA), asymmetrical interfering RNA (aiRNA), microRNA (miRNA), Dicer-substrate RNA (dsRNA), small hairpin RNA (shRNA), transfer RNA (tRNA), messenger RNA (mRNA), and mixtures thereof. In some embodiments, the RNA is an mRNA.

In some embodiments, the nucleic acid or polynucleotide is an mRNA. An mRNA may encode any polypeptide of interest, including any naturally or non-naturally occurring or otherwise modified polypeptide. A polypeptide encoded by an mRNA may be of any size and may have any secondary structure or activity. In some embodiments, a polypeptide encoded by an mRNA may have a therapeutic effect when expressed in a cell.

In some embodiments, the nucleic acid or polynucleotide is an siRNA. An siRNA may be capable of selectively knocking down or down regulating expression of a gene of interest. For example, an siRNA could be selected to silence a gene associated with a particular disease, disorder, or condition upon administration to a subject in need thereof of a lipid-containing composition including the siRNA. An siRNA may comprise a sequence that is complementary to an mRNA sequence that encodes a gene or protein of interest. In some embodiments, the siRNA may be an immunomodulatory siRNA.

In some embodiments, the nucleic acid or polynucleotide is an sgRNA and/or cas9 mRNA. sgRNA and/or cas9 mRNA can be used as gene editing tools. For example, an sgRNA-cas9 complex can affect mRNA translation of cellular genes.

In some embodiments, the nucleic acid or polynucleotide is an shRNA or a vector or plasmid encoding the same. An shRNA may be produced inside a target cell upon delivery of an appropriate construct to the nucleus. Constructs and mechanisms relating to shRNA are well known in the relevant arts.

Nucleic acids and polynucleotides useful in the disclosure typically include a first region of linked nucleosides encoding a polypeptide of interest (e.g., a coding region), a first flanking region located at the 5'-terminus of the first region (e.g., a 5'-UTR), a second flanking region located at the 3'-terminus of the first region (e.g., a 3'-UTR), at least one 5'-cap region, and a 3'-stabilizing region. In some embodiments, a nucleic acid or polynucleotide further includes a poly-A region or a Kozak sequence (e.g., in the 5'-UTR). In some embodiments, polynucleotides may contain one or more intronic nucleotide sequences capable of being excised from the polynucleotide. In some embodiments, a polynucleotide or nucleic acid (e.g., an mRNA) may include a 5' cap structure, a chain terminating nucleotide, a stem loop, a polyA sequence, and/or a polyadenylation signal. Any one of the regions of a nucleic acid may include one or more alternative components (e.g., an alternative nucleoside). For example, the 3'-stabilizing region may contain an alternative nucleoside such as an L-nucleoside, an inverted thymidine, or a 2'-O-methyl nucleoside and/or the coding region, 5'-UTR, 3'-UTR, or cap region may include an alternative nucleoside such as a 5-substituted uridine (e.g., 5-methoxyuridine), a 1-substituted pseudouridine (e.g., 1-methyl-pseudouridine or 1-ethyl-pseudouridine), and/or a 5-substituted cytidine (e.g., 5-methyl-cytidine).

Generally, the shortest length of a polynucleotide can be the length of the polynucleotide sequence that is sufficient to encode for a dipeptide. In some embodiments, the length of the polynucleotide sequence is sufficient to encode for a tripeptide. In some embodiments, the length of the polynucleotide sequence is sufficient to encode for a tetrapeptide. In some embodiments, the length of the polynucleotide sequence is sufficient to encode for a pentapeptide. In some embodiments, the length of the polynucleotide sequence is sufficient to encode for a hexapeptide. In some embodiments, the length of the polynucleotide sequence is sufficient to encode for a heptapeptide. In some embodiments, the length of the polynucleotide sequence is sufficient to encode for an octapeptide. In some embodiments, the length of the polynucleotide sequence is sufficient to encode for a nonapeptide. In some embodiments, the length of the polynucleotide sequence is sufficient to encode for a decapeptide.

Examples of dipeptides that the alternative polynucleotide sequences can encode for include, but are not limited to, carnosine and anserine.

In some embodiments, the polynucleotide is greater than 30 nucleotides in length, greater than 35 nucleotides in length, at least 40 nucleotides, at least 45 nucleotides, at least 55 nucleotides, at least 50 nucleotides, at least 60 nucleotides, at least 80 nucleotides, at least 90 nucleotides, at least 100 nucleotides, at least 120 nucleotides, at least 140 nucleotides, at least 160 nucleotides, at least 180 nucleotides, at least 200 nucleotides, at least 250 nucleotides, at least 300 nucleotides, at least 350 nucleotides, at least 400 nucleotides, at least 450 nucleotides, at least 500 nucleotides, at least 600 nucleotides, at least 700 nucleotides, at least 800 nucleotides, at least 900 nucleotides, at least 1000 nucleotides, at least 1100 nucleotides, at least 1200 nucleotides, at least 1300 nucleotides, at least 1400 nucleotides, at least 1500 nucleotides, at least 1600 nucleotides, at least 1800 nucleotides, at least 2000 nucleotides, at least 2500 nucleotides, at least 3000 nucleotides, at least 4000 nucleotides, at least 5000 nucleotides, or greater than 5000 nucleotides.

Nucleic acids and polynucleotides may include one or more naturally occurring components, including any of the canonical nucleotides A (adenosine), G (guanosine), C (cytosine), U (uridine), or T (thymidine). In some embodiments, all or substantially all of the nucleotides comprising (a) the 5'-UTR, (b) the open reading frame (ORF), (c) the 3'-UTR, (d) the poly A tail, and any combination of (a, b, c, or d above) comprise naturally occurring canonical nucleotides A (adenosine), G (guanosine), C (cytosine), U (uridine), or T (thymidine).

Nucleic acids and polynucleotides may include one or more alternative components, as described herein, which impart useful properties including increased stability and/or the lack of a substantial induction of the innate immune response of a cell into which the polynucleotide is introduced. For example, an alternative polynucleotide or nucleic acid exhibits reduced degradation in a cell into which the polynucleotide or nucleic acid is introduced, relative to a corresponding unaltered polynucleotide or nucleic acid. These alternative species may enhance the efficiency of protein production, intracellular retention of the polynucleotides, and/or viability of contacted cells, as well as possess reduced immunogenicity.

Polynucleotides and nucleic acids may be naturally or non-naturally occurring. Polynucleotides and nucleic acids may include one or more modified (e.g., altered or alternative) nucleobases, nucleosides, nucleotides, or combinations thereof. The nucleic acids and polynucleotides can include any useful modification or alteration, such as to the nucleobase, the sugar, or the internucleoside linkage (e.g., to a linking phosphate/to a phosphodiester linkage/to the phosphodiester backbone). In some embodiments, alterations (e.g., one or more alterations) are present in each of the nucleobase, the sugar, and the internucleoside linkage. Alterations according to the present disclosure may be alterations of ribonucleic acids (RNAs) to deoxyribonucleic acids (DNAs), e.g., the substitution of the 2'-OH of the ribofuranosyl ring to 2'-H, threose nucleic acids (TNAs), glycol nucleic acids (GNAs), peptide nucleic acids (PNAs), locked nucleic acids (LNAs), or hybrids thereof. Additional alterations are described herein.

Polynucleotides and nucleic acids may or may not be uniformly altered along the entire length of the molecule. For example, one or more or all types of nucleotide (e.g., purine or pyrimidine, or any one or more or all of A, G, U, C) may or may not be uniformly altered in a polynucleotide or nucleic acid, or in a given predetermined sequence region thereof. In some embodiments, all nucleotides X in a polynucleotide (or in a given sequence region thereof) are altered, wherein X may any one of nucleotides A, G, U, C, or any one of the combinations A+G, A+U, A+C, G+U, G+C, U+C, A+G+U, A+G+C, G+U+C or A+G+C.

Different sugar alterations and/or internucleoside linkages (e.g., backbone structures) may exist at various positions in a polynucleotide. One of ordinary skill in the art will appreciate that the nucleotide analogs or other alteration(s) may be located at any position(s) of a polynucleotide such that the function of the polynucleotide is not substantially decreased. An alteration may also be a 5'- or 3'-terminal alteration. In some embodiments, the polynucleotide includes an alteration at the 3'-terminus. The polynucleotide may contain from about 10% to about 100% alternative nucleotides (either in relation to overall nucleotide content, or in relation to one or more types of nucleotide, i.e., any one or more of A, G, U or C) or any intervening percentage (e.g., from 1% to 20%, from 1% to 25%, from 1% to 50%, from 1% to 60%, from 1% to 70%, from 1% to 80%, from 1% to 90%, from 1% to 95%, from 10% to 20%, from 10% to 25%, from 10% to 50%, from 10% to 60%, from 10% to 70%, from 10% to 80%, from 10% to 90%, from 10% to 95%, from 10% to 100%, from 20% to 25%, from 20% to 50%, from 20% to 60%, from 20% to 70%, from 20% to 80%, from 20% to 90%, from 20% to 95%, from 20% to 100%, from 50% to 60%, from 50% to 70%, from 50% to 80%, from 50% to 90%, from 50% to 95%, from 50% to 100%, from 70% to 80%, from 70% to 90%, from 70% to 95%, from 70% to 100%, from 80% to 90%, from 80% to 95%, from 80% to 100%, from 90% to 95%, from 90% to 100%, and from 95% to 100%). It will be understood that any remaining percentage is accounted for by the presence of a canonical nucleotide (e.g., A, G, U, or C).

Polynucleotides may contain at a minimum zero and at maximum 100% alternative nucleotides, or any intervening percentage, such as at least 5% alternative nucleotides, at least 10% alternative nucleotides, at least 25% alternative nucleotides, at least 50% alternative nucleotides, at least 80% alternative nucleotides, or at least 90% alternative nucleotides. For example, polynucleotides may contain an alternative pyrimidine such as an alternative uracil or cytosine. In some embodiments, at least 5%, at least 10%, at least 25%, at least 50%, at least 80%, at least 90% or 100% of the uracil in a polynucleotide is replaced with an alternative uracil (e.g., a 5-substituted uracil). The alternative uracil can be replaced by a compound having a single unique structure, or can be replaced by a plurality of compounds having different structures (e.g., 2, 3, 4 or more unique structures). In some embodiments, at least 5%, at least 10%, at least 25%, at least 50%, at least 80%, at least 90% or 100% of the cytosine in the polynucleotide is replaced with an alternative cytosine (e.g., a 5-substituted cytosine). The alternative cytosine can be replaced by a compound having a single unique structure, or can be replaced by a plurality of compounds having different structures (e.g., 2, 3, 4 or more unique structures).

In some embodiments, nucleic acids do not substantially induce an innate immune response of a cell into which the polynucleotide (e.g., mRNA) is introduced. Features of an induced innate immune response include 1) increased expression of pro-inflammatory cytokines, 2) activation of intracellular PRRs (RIG-I, MDA5, etc., and/or 3) termination or reduction in protein translation.

The nucleic acids can optionally include other agents (e.g., RNAi-inducing agents, RNAi agents, siRNAs, shRNAs, miRNAs, antisense RNAs, ribozymes, catalytic DNA, tRNA, RNAs that induce triple helix formation, aptamers, vectors). In some embodiments, the nucleic acids may include one or more messenger RNAs (mRNAs) having one or more alternative nucleoside or nucleotides (i.e., alternative mRNA molecules).

In some embodiments, a nucleic acid (e.g., mRNA) comprises one or more polynucleotides comprising features as described in WO2002/098443, WO2003/051401, WO2008/052770, WO2009127230, WO2006122828, WO2008/083949, WO2010088927, WO2010/037539, WO2004/004743, WO2005/016376, WO2006/024518, WO2007/095976, WO2008/014979, WO2008/077592, WO2009/030481, WO2009/095226, WO2011069586, WO2011026641, WO2011/144358, WO2012019780, WO2012013326, WO2012089338, WO2012113513, WO2012116811, WO2012116810, WO2013113502, WO2013113501, WO2013113736, WO2013143698, WO2013143699, WO2013143700, WO2013/120626, WO2013120627, WO2013120628, WO2013120629, WO2013174409, WO2014127917, WO2015/024669, WO2015/024668, WO2015/024667, WO2015/024665, WO2015/024666, WO2015/024664, WO2015101415, WO2015101414, WO2015024667, WO2015062738, WO2015101416, all of which are incorporated by reference herein.

Nucleobase Alternatives

The alternative nucleosides and nucleotides can include an alternative nucleobase. A nucleobase of a nucleic acid is an organic base such as a purine or pyrimidine or a derivative thereof. A nucleobase may be a canonical base (e.g., adenine, guanine, uracil, thymine, and cytosine). These nucleobases can be altered or wholly replaced to provide polynucleotide molecules having enhanced properties, e.g., increased stability such as resistance to nucleases. Non-canonical or modified bases may include, for example, one or more substitutions or modifications including but not limited to alkyl, aryl, halo, oxo, hydroxyl, alkyloxy, and/or thio substitutions; one or more fused or open rings; oxidation; and/or reduction.

Alternative nucleotide base pairing encompasses not only the standard adenine-thymine, adenine-uracil, or guanine-cytosine base pairs, but also base pairs formed between nucleotides and/or alternative nucleotides including non-standard or alternative bases, wherein the arrangement of hydrogen bond donors and hydrogen bond acceptors permits hydrogen bonding between a non-standard base and a standard base or between two complementary non-standard base structures. One example of such non-standard base pairing is the base pairing between the alternative nucleotide inosine and adenine, cytosine, or uracil.

In some embodiments, the alternative nucleoside or nucleotide is uridine. In some embodiments, the alternative uridine is 1-methylpseudouridine (1mΨ). In some embodiments, 1-methylpseudouridine (1mΨ) includes the structure:

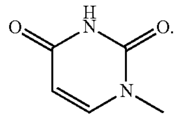

The polynucleotide may contain from about 1% to about 100% 1-methylpseudouridine (1mΨ) (either in relation to overall nucleotide content, or in relation to one or more types of nucleotide, i.e., any one or more of A, G, U or C) or any intervening percentage (e.g., from 1% to 20%, from 1% to 25%, from 1% to 50%, from 1% to 60%, from 1% to 70%, from 1% to 80%, from 1% to 90%, from 1% to 95%, from 10% to 20%, from 10% to 25%, from 10% to 50%, from 10% to 60%, from 10% to 70%, from 10% to 80%, from 10% to 90%, from 10% to 95%, from 10% to 100%, from 20% to 25%, from 20% to 50%, from 20% to 60%, from 20% to 70%, from 20% to 80%, from 20% to 90%, from 20% to 95%, from 20% to 100%, from 50% to 60%, from 50% to 70%, from 50% to 80%, from 50% to 90%, from 50% to 95%, from 50% to 100%, from 70% to 80%, from 70% to 90%, from 70% to 95%, from 70% to 100%, from 80% to 90%, from 80% to 95%, from 80% to 100%, from 90% to 95%, from 90% to 100%, and from 95% to 100%). It will be understood that any remaining percentage is accounted for by the presence of a canonical nucleotide (e.g., A, G, U, or C).

In some embodiments, uridine has been replaced with 1-methylpseudouridine (1mΨ). In some embodiments, 1% of uridine has been replaced with 1-methylpseudouridine (1mΨ). In some embodiments, 5% of uridine has been replaced with 1-methylpseudouridine (1mΨ). In some embodiments, 10% of uridine has been replaced with 1-methylpseudouridine (1mΨ). In some embodiments, 15% of uridine has been replaced with 1-methylpseudouridine (1mΨ). In some embodiments, 20% of uridine has been replaced with 1-methylpseudouridine (1mΨ). In some embodiments, 25% of uridine has been replaced with 1-methylpseudouridine (1mΨ). In some embodiments, 30% of uridine has been replaced with 1-methylpseudouridine (1mΨ). In some embodiments, 35% of uridine has been replaced with 1-methylpseudouridine (1mΨ). In some embodiments, 40% of uridine has been replaced with 1-methylpseudouridine (1mΨ). In some embodiments, 45% of uridine has been replaced with 1-methylpseudouridine (1mΨ). In some embodiments, 50% of uridine has been replaced with 1-methylpseudouridine (1mΨ). In some embodiments, 55% of uridine has been replaced with 1-methylpseudouridine (1mΨ). In some embodiments, 60% of uridine has been replaced with 1-methylpseudouridine (1mΨ). In some embodiments, 65% of uridine has been replaced with 1-methylpseudouridine (1mΨ). In some embodiments, 70% of uridine has been replaced with 1-methylpseudouridine (1mΨ). In some embodiments, 75% of uridine has been replaced with 1-methylpseudouridine (1mΨ). In some embodiments, 80% of uridine has been replaced with 1-methylpseudouridine (1mΨ). In some embodiments, 85% of uridine has been replaced with 1-methylpseudouridine (1mΨ). In some embodiments, 90% of uridine has been replaced with 1-methylpseudouridine (1mΨ). In some embodiments, 95% of uridine has been replaced with 1-methylpseudouridine (1mΨ). In some embodiments, 100% of uridine has been replaced with 1-methylpseudouridine (1mΨ).

The term "polynucleotide," in its broadest sense, includes any compound and/or substance that is or can be incorporated into an oligonucleotide chain with a uridine to 1-methylpseudouridine (1mΨ) base modification.

In some embodiments, the nucleic acid or polynucleotide is an mRNA with a uridine to 1-methylpseudouridine (1mΨ) base modification.

In some embodiments, a polynucleotide is greater than 30 nucleotides in length with a uridine to 1-methylpseudouridine (1mΨ) base modification. In some embodiments, the polynucleotide molecule is greater than 35 nucleotides in length with a uridine to 1-methylpseudouridine (1mΨ) base modification. In some embodiments, the length is at least 40 nucleotides with a uridine to 1-methylpseudouridine (1mΨ) base modification. In some embodiments, the length is at least 45 nucleotides with a uridine to 1-methylpseudouridine (1mΨ) base modification. In some embodiments, the length is at least 55 nucleotides with a uridine to 1-methylpseudouridine (1mΨ) base modification. In some embodiments, the length is at least 50 nucleotides with a uridine to 1-methylpseudouridine (1mΨ) base modification. In some embodiments, the length is at least 60 nucleotides with a uridine to 1-methylpseudouridine (1mΨ) base modification. In some embodiments, the length is at least 80 nucleotides with a uridine to 1-methylpseudouridine (1mΨ) base modification. In some embodiments, the length is at least 90 nucleotides with a uridine to 1-methylpseudouridine (1mΨ) base modification. In some embodiments, the length is at least 100 nucleotides with a uridine to 1-methylpseudouridine (1mΨ) base modification. In some embodiments, the length is at least 120 nucleotides with a uridine to 1-methylpseudouridine (1mΨ) base modification. In some embodiments, the length is at least 140 nucleotides with a uridine to 1-methylpseudouridine (1mΨ) base modification. In some embodiments, the length is at least 160 nucleotides with a uridine to 1-methylpseudouridine (1mΨ) base modification. In some embodiments, the length is at least 180 nucleotides with a uridine to 1-methylpseudouridine (1mΨ) base modification. In some embodiments, the length is at least 200 nucleotides with a uridine to 1-methylpseudouridine (1mΨ) base modification. In some embodiments, the length is at least 250 nucleotides with a uridine to 1-methylpseudouridine (1mΨ) base modification. In some embodiments, the length is at least 300 nucleotides with a uridine to 1-methylpseudouridine (1mΨ) base modification. In some embodiments, the length is at least 350 nucleotides with a uridine to 1-methylpseudouridine (1mΨ) base modification. In some embodiments, the length is at least 400 nucleotides with a uridine to 1-methylpseudouridine (1mΨ) base modification. In some embodiments, the length is at least 450 nucleotides with a uridine to 1-methylpseudouridine (1mΨ) base modification. In some embodiments, the length is at least 500 nucleotides with a uridine to 1-methylpseudouridine (1mΨ) base modification. In some embodiments, the length is at least 600 nucleotides with a uridine to 1-methylpseudouridine (1mΨ) base modification. In some embodiments, the length is at least 700 nucleotides with a uridine to 1-methylpseudouridine (1mΨ) base modification. In some embodiments, the length is at least 800 nucleotides with a uridine to 1-methylpseudouridine (1mΨ) base modification. In some embodiments, the length is at least 900 nucleotides with a uridine to 1-methylpseudouridine (1mΨ) base modification. In some embodiments, the length is at least 1000 nucleotides with a uridine to 1-methylpseudouridine (1mΨ) base modification. In some embodiments, the length is at least 1100 nucleotides with a uridine to 1-methylpseudouridine (1mΨ) base modification. In some embodiments, the length is at least 1200 nucleotides with a uridine to 1-methylpseudouridine (1mΨ) base modification. In some embodiments, the length is at least 1300 nucleotides with a uridine to 1-methylpseudouridine (1mΨ) base modification. In some embodiments, the length is at least 1400 nucleotides with a uridine to 1-methylpseudouridine (1mΨ) base modification. In some embodiments, the length is at least 1500 nucleotides with a uridine to 1-methylpseudouridine (1mΨ) base modification. In some embodiments, the length is at least 1600 nucleotides with a uridine to 1-methylpseudouridine (1mΨ) base modification. In some embodiments, the length is at least 1800 nucleotides with a uridine to 1-methylpseudouridine (1mΨ) base modification. In some embodiments, the length is at least 2000 nucleotides with a uridine to 1-methylpseudouridine (1mΨ) base modification. In some embodiments, the length is at least 2500 nucleotides with a uridine to 1-methylpseudouridine (1mΨ) base modification. In some embodiments, the length is at least 3000 nucleotides with a uridine to 1-methylpseudouridine (1mΨ) base modification. In some embodiments, the length is at least 4000 nucleotides with a uridine to 1-methylpseudouridine (1mΨ) base modification. In some embodiments, the length is at least 5000 nucleotides, or greater than 5000 nucleotides with a uridine to 1-methylpseudouridine (1mΨ) base modification.

Polynucleotides may contain at a minimum zero and at maximum 100% uridine to 1-methylpseudouridine (1mΨ) base modification, or any intervening percentage, such as at least 5% uridine to 1-methylpseudouridine (1mΨ) base modification, at least 10% uridine to 1-methylpseudouridine (1mΨ) base modification, at least 25% uridine to 1-methylpseudouridine (1mΨ) base modification, at least 50% uridine to 1-methylpseudouridine (1mΨ) base modification, at least 80% uridine to 1-methylpseudouridine (1mΨ) base modification, or at least 90% uridine to 1-methylpseudouridine (1mΨ) base modification.
The alternative uracil can be replaced by a compound having a single unique structure, or can be replaced by a plurality of compounds having different structures (e.g., 2, 3, 4 or more unique structures). In some embodiments, at least 5%, at least 10%, at least 25%, at least 50%, at least 80%, at least 90% or 100% of the cytosine in the polynucleotide is replaced with an alternative cytosine (e.g., a 5-substituted cytosine). The alternative cytosine can be replaced by a compound having a single unique structure, or can be replaced by a plurality of compounds having different structures (e.g., 2, 3, 4 or more unique structures).

In some embodiments, the nucleobase is an alternative uracil. Exemplary nucleobases and nucleosides having an alternative uracil include pseudouridine (ψ), pyridin-4-one ribonucleoside, 5-aza-uracil, 6-aza-uracil, 2-thio-5-aza-uracil, 2-thio-uracil ($s^2U$), 4-thio-uracil ($s^4U$), 4-thio-pseudouridine, 2-thio-pseudouridine, 5-hydroxy-uracil ($ho^5U$), 5-aminoallyl-uracil, 5-halo-uracil (e.g., 5-iodo-uracil or 5-bromo-uracil), 3-methyl-uracil ($m^3U$), 5-methoxy-uracil ($mo^5U$), uracil 5-oxyacetic acid ($cmo^5U$), uracil 5-oxyacetic acid methyl ester ($mcmo^5U$), 5-carboxymethyl-uracil ($cm^5U$), 1-carboxymethyl-pseudouridine, 5-carboxyhydroxymethyl-uracil ($chm^5U$), 5-carboxyhydroxymethyl-uracil methyl ester ($mchm^5U$), 5-methoxycarbonylmethyl-uracil ($mcm^5U$), 5-methoxycarbonylmethyl-2-thio-uracil ($mcm^5s^2U$), 5-aminomethyl-2-thio-uracil ($nm^5s^2U$), 5-methylaminomethyl-uracil ($mnm^5U$), 5-methylaminomethyl-2-thio-uracil ($mnm^5s^2U$), 5-methylaminomethyl-2-seleno-uracil ($mnm^5se^2U$), 5-carbamoylmethyl-uracil ($ncm^5U$), 5-carboxymethylaminomethyl-uracil ($cmnm^5U$), 5-carboxymethylaminomethyl-2-thio-uracil ($cmnm^5s^2U$), 5-propynyl-uracil, 1-propynyl-pseudouracil, 5-taurinomethyl-uracil ($\tau m^5U$), 1-taurinomethyl-pseudouridine, 5-taurinomethyl-2-thio-uracil ($\tau m^5s^2U$), 1-taurinomethyl-4-thio-pseudouridine, 5-methyl-uracil ($m^5U$, i.e., having the nucleobase deoxythymine), 1-methyl-pseudouridine ($m^1y$), 5-methyl-2-thio-uracil ($m^5s^2U$), 1-methyl-4-thio-pseudouridine ($m^1s^4\psi$), 4-thio-1-methyl-pseudouridine, 3-methyl-pseudouridine ($m^3\psi$), 2-thio-1-methyl-pseudouridine, 1-methyl-1-deaza-pseudouridine, 2-thio-1-methyl-1-deaza-pseudouridine, dihydrouracil (D), dihydropseudouridine, 5,6-dihydrouracil, 5-methyl-dihydrouracil ($m^5D$), 2-thio-dihydrouracil, 2-thio-dihydropseudouridine, 2-methoxy-uracil, 2-methoxy-4-thio-uracil, 4-methoxy-pseudouridine, 4-methoxy-2-thio-pseudouridine, N1-methyl-pseudouridine, 3-(3-amino-3-carboxypropyl)uracil ($acp^3U$), 1-methyl-3-(3-amino-3-carboxypropyl)pseudouridine ($acp^3\psi$), 5-(isopentenylaminomethyl)uracil ($inm^5U$), 5-(isopentenylaminomethyl)-2-thio-uracil ($inm^5s^2U$), 5,2'-O-dimethyl-uridine ($m^5Um$), 2-thio-2'-O_methyl-uridine ($s^2Um$), 5-methoxycarbonylmethyl-2'-O-methyl-uridine ($mcm^5Um$), 5-carbamoylmethyl-2'-O-methyl-uridine ($ncm^5Um$), 5-carboxymethylaminomethyl-2'-O-methyl-uridine ($cmnm^5Um$), 3,2'-O-dimethyl-uridine ($m^3Um$), and 5-(isopentenylaminomethyl)-2'-O-methyl-uridine ($inm^5Um$), 1-thio-uracil, deoxythymidine, 5-(2-carbomethoxyvinyl)-uracil, 5-(carbamoylhydroxymethyl)-uracil, 5-carbamoylmethyl-2-thio-uracil, 5-carboxymethyl-2-thio-uracil, 5-cyanomethyl-uracil, 5-methoxy-2-thio-uracil, and 5-[3-(1-E-propenylamino)]uracil.

In some embodiments, the nucleobase is an alternative cytosine. Exemplary nucleobases and nucleosides having an alternative cytosine include 5-aza-cytosine, 6-aza-cytosine, pseudoisocytidine, 3-methyl-cytosine (m3C), N4-acetyl-cytosine (ac4C), 5-formyl-cytosine (f5C), N4-methyl-cytosine (m4C), 5-methyl-cytosine (m5C), 5-halo-cytosine (e.g., 5-iodo-cytosine), 5-hydroxymethyl-cytosine (hm5C), 1-methyl-pseudoisocytidine, pyrrolo-cytosine, pyrrolo-pseudoisocytidine, 2-thio-cytosine (s2C), 2-thio-5-methyl-cytosine, 4-thio-pseudoisocytidine, 4-thio-1-methyl-pseudoisocytidine, 4-thio-1-methyl-1-deaza-pseudoisocytidine, 1-methyl-1-deaza-pseudoisocytidine, zebularine, 5-aza-zebularine, 5-methyl-zebularine, 5-aza-2-thio-zebularine, 2-thio-zebularine, 2-methoxy-cytosine, 2-methoxy-5-methyl-cytosine, 4-methoxy-pseudoisocytidine, 4-methoxy-1-methyl-pseudoisocytidine, lysidine (k2C), 5,2'-O-dimethyl-cytidine (m5Cm), N4-acetyl-2'-O-methyl-cytidine (ac4Cm), N4,2'-O-dimethyl-cytidine (m4Cm), 5-formyl-2'-O-methyl-cytidine (f5Cm), N4,N4,2'-O-trimethyl-cytidine (m42Cm), 1-thio-cytosine, 5-hydroxy-cytosine, 5-(3-azidopropyl)-cytosine, and 5-(2-azidoethyl)-cytosine.

In some embodiments, the nucleobase is an alternative adenine. Exemplary nucleobases and nucleosides having an alternative adenine include 2-amino-purine, 2,6-diaminopurine, 2-amino-6-halo-purine (e.g., 2-amino-6-chloro-purine), 6-halo-purine (e.g., 6-chloro-purine), 2-amino-6-methyl-purine, 8-azido-adenine, 7-deaza-adenine, 7-deaza-8-azaadenine, 7-deaza-2-amino-purine, 7-deaza-8-aza-2-amino-purine, 7-deaza-2,6-diaminopurine, 7-deaza-8-aza-2,6-diaminopurine, 1-methyl-adenine (m1A), 2-methyl-adenine (m2A), N6-methyl-adenine (m6A), 2-methylthio-N6-methyl-adenine (ms2m6A), N6-isopentenyl-adenine (i6A), 2-methylthio-N6-isopentenyl-adenine (ms2i6A), N6-(cis-hydroxyisopentenyl)adenine (io6A), 2-methylthio-N6-(cis-hydroxyisopentenyl)adenine (ms2io6A), N6-glycinylcarbamoyl-adenine (g6A), N6-threonylcarbamoyl-adenine (t6A), N6-methyl-N6-threonylcarbamoyl-adenine (m6t6A), 2-methylthio-N6-threonylcarbamoyl-adenine (ms2g6A), N6,N6-dimethyl-adenine (m62A), N6-hydroxynorvalylcarbamoyl-adenine (hn6A), 2-methylthio-N6-hydroxynorvalylcarbamoyl-adenine (ms2hn6A), N6-acetyl-adenine (ac6A), 7-methyl-adenine, 2-methylthio-adenine, 2-methoxy-adenine, N6,2'-O-dimethyl-adenosine (m6Am), N6,N6,2'-O-trimethyl-adenosine (m62Am), 1,2'-O-dimethyl-adenosine (m1Am), 2-amino-N6-methyl-purine, 1-thio-adenine, 8-azido-adenine, N6-(19-amino-pentaoxanonadecyl)-adenine, 2,8-dimethyl-adenine, N6-formyl-adenine, and N6-hydroxymethyl-adenine.

In some embodiments, the nucleobase is an alternative guanine. Exemplary nucleobases and nucleosides having an alternative guanine include inosine (I), 1-methyl-inosine (m1I), wyosine (imG), methylwyosine (mimG), 4-demethyl-wyosine (imG-14), isowyosine (imG2), wybutosine (yW), peroxywybutosine (o2yW), hydroxywybutosine (OHyW), undermodified hydroxywybutosine (OHyW*), 7-deaza-guanine, queuosine (Q), epoxyqueuosine (oQ), galactosyl-queuosine (galQ), mannosyl-queuosine (manQ), 7-cyano-7-deaza-guanine (preQ0), 7-aminomethyl-7-deaza-guanine (preQ1), archaeosine (G+), 7-deaza-8-aza-guanine, 6-thio-guanine, 6-thio-7-deaza-guanine, 6-thio-7-deaza-8-aza-guanine, 7-methyl-guanine (m7G), 6-thio-7-methyl-guanine, 7-methyl-inosine, 6-methoxy-guanine, 1-methyl-guanine (m1G), N2-methyl-guanine (m2G), N2,N2-dimethyl-guanine (m22G), N2,7-dimethyl-guanine (m2, 7G), N2, N2,7-dimethyl-guanine (m2,2,7G), 8-oxo-guanine, 7-methyl-8-oxo-guanine, 1-methyl-6-thio-guanine, N2-methyl-6-thio-guanine, N2,N2-dimethyl-6-thio-guanine, N2-methyl-2'-O-methyl-guanosine (m2Gm), N2,N2-dimethyl-2'-O-methyl-guanosine (m22Gm), 1-methyl-2'-O-methyl-guanosine (m1Gm), N2,7-dimethyl-2'-O-methyl-guanosine (m2,7Gm), 2'-O-methyl-inosine (Im), 1,2'-O-dimethyl-inosine (m1Im), 1-thio-guanine, and O-6-methyl-guanine.

The alternative nucleobase of a nucleotide can be independently a purine, a pyrimidine, a purine or pyrimidine analog. For example, the nucleobase can be an alternative to adenine, cytosine, guanine, uracil, or hypoxanthine. In some embodiments, the nucleobase can also include, for example, naturally-occurring and synthetic derivatives of a base, including pyrazolo[3,4-d]pyrimidines, 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-propynyl uracil and cytosine, 6-azo uracil, cytosine and thymine, 5-uracil (pseudouracil), 4-thiouracil, 8-halo (e.g., 8-bromo), 8-amino, 8-thiol, 8-thioalkyl, 8-hydroxy and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, deazaguanine, 7-deazaguanine, 3-deazaguanine, deazaadenine, 7-deazaadenine, 3-deazaadenine, pyrazolo[3,4-d]pyrimidine, imidazo[1,5-a]1,3,5 triazinones, 9-deazapurines, imidazo[4,5-d]pyrazines, thiazolo[4,5-d]pyrimidines, pyrazin-2-ones, 1,2,4-triazine, pyridazine; or 1,3,5 triazine. When the nucleotides are depicted using the shorthand A, G, C, T or U, each letter refers to the representative base and/or derivatives thereof, e.g., A includes adenine or adenine analogs, e.g., 7-deaza adenine).

Alterations on the Sugar

Nucleosides include a sugar molecule (e.g., a 5-carbon or 6-carbon sugar, such as pentose, ribose, arabinose, xylose, glucose, galactose, or a deoxy derivative thereof) in combination with a nucleobase, while nucleotides are nucleosides containing a nucleoside and a phosphate group or alternative group (e.g., boranophosphate, thiophosphate, selenophosphate, phosphonate, alkyl group, amidate, and glycerol). A nucleoside or nucleotide may be a canonical species, e.g., a nucleoside or nucleotide including a canonical nucleobase, sugar, and, in the case of nucleotides, a phosphate group, or may be an alternative nucleoside or nucleotide including one or more alternative components. For example, alternative nucleosides and nucleotides can be altered on the sugar of the nucleoside or nucleotide. In some embodiments, the alternative nucleosides or nucleotides include the structure:

Formula IV

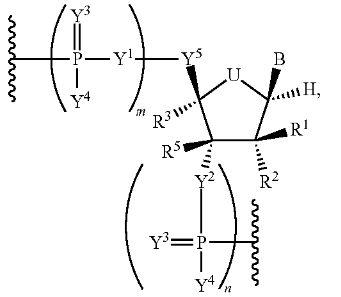

Formula V

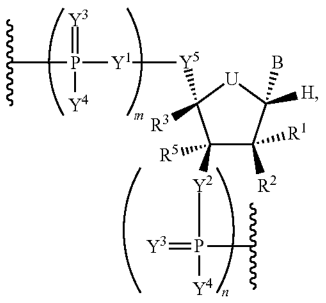

Formula VI

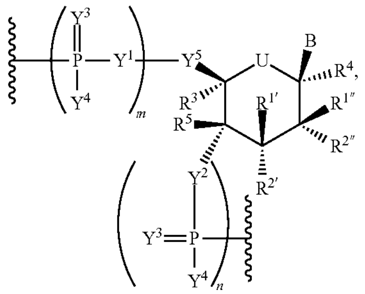

or

Formula VII

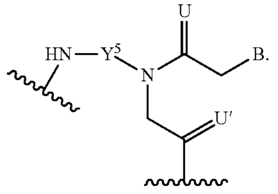

In each of the Formulae IV, V, VI and VII, each of m and n is independently, an integer from 0 to 5, each of U and U' independently, is O, S, $N(R^U)_{nu}$, or $C(R^U)_{nu}$, wherein nu is an integer from 0 to 2 and each $R^U$ is, independently, H, halo, or optionally substituted alkyl;

each of $R^{1'}$, $R^{2'}$, $R^{1''}$, $R^{2''}$, $R^1$, $R^2$, $R^3$, $R^4$, and $R^5$ is, independently, if present, H, halo, hydroxy, thiol, optionally substituted alkyl, optionally substituted alkoxy, optionally substituted alkenyloxy, optionally substituted alkynyloxy, optionally substituted aminoalkoxy, optionally substituted alkoxyalkoxy, optionally substituted hydroxyalkoxy, optionally substituted amino, azido, optionally substituted aryl, optionally substituted aminoalkyl, optionally substituted aminoalkenyl, optionally substituted aminoalkynyl, or absent; wherein the combination of $R^3$ with one or more of $R^{1'}$, $R^{1''}$, $R^{2'}$, $R^{2''}$, or $R^5$ (e.g., the combination of $R^{1'}$ and $R^3$, the combination of $R^{1''}$ and $R^3$, the combination of $R^{2'}$ and $R^3$, the combination of $R^{2''}$ and $R^3$, or the combination of $R^5$ and $R^3$) can join together to form optionally substituted alkylene or optionally substituted heteroalkylene and, taken together with the carbons to which they are attached, provide an optionally substituted heterocyclyl (e.g., a bicyclic, tricyclic, or tetracyclic heterocyclyl); wherein the combination of $R^5$ with one or more of $R^{1'}$, $R^{1''}$, $R^{2'}$, or $R^{2''}$ (e.g., the combination of $R^{1'}$ and $R^5$, the combination of $R^{1''}$ and $R^5$, the combination of $R^{2'}$ and $R^5$, or the combination of $R^{2''}$ and $R^5$) can join together to form optionally substituted alkylene or optionally substituted heteroalkylene and, taken together with the carbons to which they are attached, provide an optionally substituted heterocyclyl (e.g., a bicyclic, tricyclic, or tetracyclic heterocyclyl); and wherein the combination of $R^4$ and one or more of $R^{1'}$, $R^{1''}$, $R^{2'}$ $R^{2''}$, $R^3$, or $R^5$ can join together to form optionally substituted alkylene or optionally substituted heteroalkylene and, taken together with the carbons to which they are attached, provide an optionally substituted heterocyclyl (e.g., a bicyclic, tricyclic, or tetracyclic heterocyclyl); each of m' and m" is, independently, an integer from 0 to 3 (e.g., from 0 to 2, from 0 to 1, from 1 to 3, or from 1 to 2);

each of $Y^1$, $Y^2$, and $Y^3$, is, independently, O, S, Se, —$NR^{N1}$— optionally substituted alkylene, or optionally substituted heteroalkylene, wherein $R^{N1}$ is H, optionally substituted alkyl, optionally substituted alkenyl, optionally substituted alkynyl, optionally substituted aryl, or absent;

each $Y^4$ is, independently, H, hydroxy, thiol, boranyl, optionally substituted alkyl, optionally substituted alkenyl, optionally substituted alkynyl, optionally substituted alkoxy, optionally substituted alkenyloxy, optionally substituted alkynyloxy, optionally substituted thioalkoxy, optionally substituted alkoxyalkoxy, or optionally substituted amino;

each $Y^5$ is, independently, O, S, Se, optionally substituted alkylene (e.g., methylene), or optionally substituted heteroalkylene; and B is a nucleobase, either modified or unmodified. In some embodiments, the 2'-hydroxy group (OH) can be modified or replaced with a number of different substituents. Exemplary substitutions at the 2'-position include, but are not limited to, H, azido, halo (e.g., fluoro), optionally substituted $C_{1-6}$ alkyl (e.g., methyl); optionally substituted $C_{1-6}$ alkoxy (e.g., methoxy or ethoxy); optionally substituted $C_{6-10}$ aryloxy; optionally substituted $C_{3-8}$ cycloalkyl; optionally substituted $C_{6-10}$ aryl-$C_{1-6}$ alkoxy, optionally substituted $C_{1-12}$ (heterocyclyl) oxy; a sugar (e.g., ribose, pentose, or any described herein); a polyethyleneglycol (PEG), $—O(CH_2CH_2O)_nCH_2CH_2OR$, where R is H or optionally substituted alkyl, and n is an integer from 0 to 20 (e.g., from 0 to 4, from 0 to 8, from 0 to 10, from 0 to 16, from 1 to 4, from 1 to 8, from 1 to 10, from 1 to 16, from 1 to 20, from 2 to 4, from 2 to 8, from 2 to 10, from 2 to 16, from 2 to 20, from 4 to 8, from 4 to 10, from 4 to 16, and from 4 to 20); "locked" nucleic acids (LNA) in which the 2'-hydroxy is connected by a $C_{1-6}$ alkylene or $C_{1-6}$ heteroalkylene bridge to the 4'-carbon of the same ribose sugar, where exemplary bridges included methylene, propylene, ether, or amino bridges; aminoalkyl, as defined herein; aminoalkoxy, as defined herein; amino as defined herein; and amino acid, as defined herein.

Generally, RNA includes the sugar group ribose, which is a 5-membered ring having an oxygen. Exemplary, non-limiting alternative nucleotides include replacement of the oxygen in ribose (e.g., with S, Se, or alkylene, such as methylene or ethylene); addition of a double bond (e.g., to replace ribose with cyclopentenyl or cyclohexenyl); ring contraction of ribose (e.g., to form a 4-membered ring of cyclobutane or oxetane); ring expansion of ribose (e.g., to form a 6- or 7-membered ring having an additional carbon or heteroatom, such as for anhydrohexitol, altritol, mannitol, cyclohexanyl, cyclohexenyl, and morpholino (that also has a phosphoramidate backbone)); multicyclic forms (e.g., tricyclo and "unlocked" forms, such as glycol nucleic acid (GNA) (e.g., R-GNA or S-GNA, where ribose is replaced by glycol units attached to phosphodiester bonds), threose nucleic acid (TNA, where ribose is replace with α-L-threofuranosyl-(3'→2')), and peptide nucleic acid (PNA, where 2-amino-ethyl-glycine linkages replace the ribose and phosphodiester backbone).

In some embodiments, the sugar group contains one or more carbons that possess the opposite stereochemical configuration of the corresponding carbon in ribose. Thus, a polynucleotide molecule can include nucleotides containing, e.g., arabinose or L-ribose, as the sugar.

In some embodiments, the polynucleotide includes at least one nucleoside wherein the sugar is L-ribose, 2'-O-methyl-ribose, 2'-fluoro-ribose, arabinose, hexitol, an LNA, or a PNA.

Alterations on the Internucleoside Linkage

Alternative nucleotides can be altered on the internucleoside linkage (e.g., phosphate backbone). Herein, in the context of the polynucleotide backbone, the phrases "phosphate" and "phosphodiester" are used interchangeably. Backbone phosphate groups can be altered by replacing one or more of the oxygen atoms with a different substituent.

The alternative nucleotides can include the wholesale replacement of an unaltered phosphate moiety with another internucleoside linkage as described herein. Examples of alternative phosphate groups include, but are not limited to, phosphorothioate, phosphoroselenates, boranophosphates, boranophosphate esters, hydrogen phosphonates, phosphoramidates, phosphorodiamidates, alkyl or aryl phosphonates, and phosphotriesters. Phosphorodithioates have both non-linking oxygens replaced by sulfur. The phosphate linker can also be altered by the replacement of a linking oxygen with nitrogen (bridged phosphoramidates), sulfur (bridged phosphorothioates), and carbon (bridged methylene-phosphonates).

The alternative nucleosides and nucleotides can include the replacement of one or more of the non-bridging oxygens with a borane moiety ($BH_3$), sulfur (thio), methyl, ethyl, and/or methoxy. As a non-limiting example, two non-bridging oxygens at the same position (e.g., the alpha (α), beta (β) or gamma (γ) position) can be replaced with a sulfur (thio) and a methoxy.

The replacement of one or more of the oxygen atoms at the α position of the phosphate moiety (e.g., α-thio phosphate) is provided to confer stability (such as against exonucleases and endonucleases) to RNA and DNA through the unnatural phosphorothioate backbone linkages. Phosphorothioate DNA and RNA have increased nuclease resistance and subsequently a longer half-life in a cellular environment.

Other internucleoside linkages that may be employed according to the present disclosure, including internucleoside linkages which do not contain a phosphorous atom, are described herein.

Internal Ribosome Entry Sites

Polynucleotides may contain an internal ribosome entry site (IRES). An IRES may act as the sole ribosome binding site, or may serve as one of multiple ribosome binding sites of an mRNA. A polynucleotide containing more than one functional ribosome binding site may encode several peptides or polypeptides that are translated independently by the ribosomes (e.g., multicistronic mRNA). When polynucleotides are provided with an IRES, further optionally provided is a second translatable region. Examples of IRES sequences that can be used according to the present disclosure include without limitation, those from picornaviruses (e.g., FMDV), pest viruses (CFFV), polio viruses (PV), encephalomyocarditis viruses (ECMV), foot-and-mouth disease viruses (FMDV), hepatitis C viruses (HCV), classical swine fever viruses (CSFV), murine leukemia virus (MLV), simian immune deficiency viruses (SIV) or cricket paralysis viruses (CrPV).

5'-Cap Structure

A polynucleotide (e.g., an mRNA) may include a 5'-cap structure. The 5'-cap structure of a polynucleotide is involved in nuclear export and increasing polynucleotide stability and binds the mRNA Cap Binding Protein (CBP), which is responsible for polynucleotide stability in the cell and translation competency through the association of CBP with poly-A binding protein to form the mature cyclic mRNA species. The cap further assists the removal of 5'-proximal introns removal during mRNA splicing.

Endogenous polynucleotide molecules may be 5'-end capped generating a 5'-ppp-5'-triphosphate linkage between a terminal guanosine cap residue and the 5'-terminal transcribed sense nucleotide of the polynucleotide. This 5'-guanylate cap may then be methylated to generate an N7-methyl-guanylate residue. The ribose sugars of the terminal and/or anteterminal transcribed nucleotides of the 5' end of the polynucleotide may optionally also be 2'-O-methylated. 5'-decapping through hydrolysis and cleavage of the guanylate cap structure may target a polynucleotide molecule, such as an mRNA molecule, for degradation.

Alterations to polynucleotides may generate a non-hydrolyzable cap structure preventing decapping and thus increasing polynucleotide half-life. Because cap structure hydrolysis requires cleavage of 5'-ppp-5' phosphorodiester linkages, alternative nucleotides may be used during the capping reaction. For example, a Vaccinia Capping Enzyme from New England Biolabs (Ipswich, MA) may be used with α-thio-guanosine nucleotides according to the manufacturer's instructions to create a phosphorothioate linkage in the 5'-ppp-5' cap. Additional alternative guanosine nucleotides may be used such as α-methyl-phosphonate and seleno-phosphate nucleotides.

Additional alterations include, but are not limited to, 2'-O-methylation of the ribose sugars of 5'-terminal and/or 5'-anteterminal nucleotides of the polynucleotide (as mentioned above) on the 2'-hydroxy group of the sugar. Multiple distinct 5'-cap structures can be used to generate the 5'-cap of a polynucleotide, such as an mRNA molecule.

5'-Cap structures include those described in International Patent Publication Nos. WO2008127688, WO 2008016473, and WO 2011015347, the cap structures of each of which are incorporated herein by reference.

Cap analogs, which herein are also referred to as synthetic cap analogs, chemical caps, chemical cap analogs, or structural or functional cap analogs, differ from natural (i.e., endogenous, wild-type, or physiological) 5'-caps in their chemical structure, while retaining cap function. Cap analogs may be chemically (i.e., non-enzymatically) or enzymatically synthesized and/linked to a polynucleotide.

For example, the Anti-Reverse Cap Analog (ARCA) cap contains two guanosines linked by a 5'-5'-triphosphate group, wherein one guanosine contains an N7-methyl group as well as a 3'-O-methyl group (i.e., N7,3'-O-dimethyl-guanosine-5'-triphosphate-5'-guanosine, $m^7G$-3'mppp-G, which may equivalently be designated 3' O-Me-m7G(5')ppp(5')G). The 3'-o atom of the other, unaltered, guanosine becomes linked to the 5'-terminal nucleotide of the capped polynucleotide (e.g., an mRNA). The N7- and 3'-O-methylated guanosine provides the terminal moiety of the capped polynucleotide (e.g., mRNA).

Another exemplary cap is mCAP, which is similar to ARCA but has a 2'-O-methyl group on guanosine (i.e., N7,2'-O-dimethyl-guanosine-5'-triphosphate-5'-guanosine, $m^7$Gm-ppp-G).

A cap may be a dinucleotide cap analog, a non-limiting example includes those described in U.S. Pat. No. 8,519,110, the cap structures of which are herein incorporated by reference.

Alternatively, a cap analog may be a N7-(4-chlorophenoxyethyl) substituted dinucleotide cap analog known in the art and/or described herein. Non-limiting examples of N7-(4-chlorophenoxyethyl) substituted dinucleotide cap analogs include a N7-(4-chlorophenoxyethyl)-G(5')ppp(5')G and a N7-(4-chlorophenoxyethyl)-m3'-OG(5')ppp(5')G cap analog (see, e.g., the various cap analogs and the methods of synthesizing cap analogs described in Kore et al. Bioorganic & Medicinal Chemistry 2013 21:4570-4574; the cap structures of which are herein incorporated by reference). In some embodiments, a cap analog useful in the polynucleotides of the present disclosure is a 4-chloro/bromophenoxyethyl analog.

While cap analogs allow for the concomitant capping of a polynucleotide in an in vitro transcription reaction, up to 20% of transcripts remain uncapped. This, as well as the structural differences of a cap analog from endogenous 5'-cap structures of polynucleotides produced by the endogenous, cellular transcription machinery, may lead to reduced translational competency and reduced cellular stability.

Alternative polynucleotides may also be capped post-transcriptionally, using enzymes, in order to generate more authentic 5'-cap structures. As used herein, the phrase "more authentic" refers to a feature that closely mirrors or mimics, either structurally or functionally, an endogenous or wild type feature. That is, a "more authentic" feature is better representative of an endogenous, wild-type, natural or physiological cellular function, and/or structure as compared to synthetic features or analogs of the prior art, or which outperforms the corresponding endogenous, wild-type, natural, or physiological feature in one or more respects. Non-limiting examples of more authentic 5'-cap structures useful in the polynucleotides of the present disclosure are those which, among other things, have enhanced binding of cap binding proteins, increased half life, reduced susceptibility to 5'-endonucleases, and/or reduced 5'-decapping, as compared to synthetic 5'-cap structures known in the art (or to a wild-type, natural or physiological 5'-cap structure). For example, recombinant Vaccinia Virus Capping Enzyme and recombinant 2'-O-methyltransferase enzyme can create a canonical 5'-5'-triphosphate linkage between the 5'-terminal nucleotide of a polynucleotide and a guanosine cap nucleotide wherein the cap guanosine contains an N7-methylation and the 5'-terminal nucleotide of the polynucleotide contains a 2'-O-methyl. Such a structure is termed the Cap1 structure. This cap results in a higher translational-competency, cellular stability, and a reduced activation of cellular pro-inflammatory cytokines, as compared, e.g., to other 5' cap analog structures known in the art. Other exemplary cap structures include 7mG(5')ppp(5')N,pN2p (Cap 0), 7mG(5')ppp(5')N1mpNp (Cap 1), 7mG(5')-ppp(5')N1mpN2mp (Cap 2), and m(7)Gpppm(3)(6,6,2')Apm(2')Apm(2')Cpm(2)(3,2')Up (Cap 4).

Because the alternative polynucleotides may be capped post-transcriptionally, and because this process is more efficient, nearly 100% of the alternative polynucleotides may be capped. This is in contrast to ~80% when a cap analog is linked to a polynucleotide in the course of an in vitro transcription reaction.

5'-terminal caps may include endogenous caps or cap analogs. A 5'-terminal cap may include a guanosine analog. Useful guanosine analogs include inosine, N1-methyl-guanosine, 2'-fluoro-guanosine, 7-deaza-guanosine, 8-oxo-guanosine, 2-amino-guanosine, LNA-guanosine, and 2-azido-guanosine.

In some embodiments, a polynucleotide contains a modified 5'-cap. A modification on the 5'-cap may increase the stability of polynucleotide, increase the half-life of the polynucleotide, and could increase the polynucleotide translational efficiency. The modified 5'-cap may include, but is not limited to, one or more of the following modifications: modification at the 2'- and/or 3'-position of a capped guanosine triphosphate (GTP), a replacement of the sugar ring oxygen (that produced the carbocyclic ring) with a methylene moiety ($CH_2$), a modification at the triphosphate bridge moiety of the cap structure, or a modification at the nucleobase (G) moiety.

5'-UTRs

A 5'-UTR may be provided as a flanking region to polynucleotides (e.g., mRNAs). A 5'-UTR may be homologous or heterologous to the coding region found in a polynucleotide. Multiple 5'-UTRs may be included in the flanking region and may be the same or of different sequences. Any portion of the flanking regions, including none, may be codon optimized and any may independently contain one or more different structural or chemical alterations, before and/or after codon optimization.

Shown in Table 21 in U.S. Provisional Application No. 61/775,509, and in Table 21 and in Table 22 in U.S. Provisional Application No. 61/829,372, of which are incorporated herein by reference, is a listing of the start and stop site of alternative polynucleotides (e.g., mRNA). In Table 21 each 5'-UTR (5'-UTR-005 to 5'-UTR 68511) is identified by its start and stop site relative to its native or wild type (homologous) transcript (ENST; the identifier used in the ENSEMBL database).

To alter one or more properties of a polynucleotide (e.g., mRNA), 5'-UTRs which are heterologous to the coding region of an alternative polynucleotide (e.g., mRNA) may be engineered. The polynucleotides (e.g., mRNA) may then be administered to cells, tissue or organisms and outcomes such as protein level, localization, and/or half-life may be measured to evaluate the beneficial effects the heterologous 5'-UTR may have on the alternative polynucleotides (mRNA). Variants of the 5'-UTRs may be utilized wherein one or more nucleotides are added or removed to the termini, including A, T, C or G. 5'-UTRs may also be codon-optimized, or altered in any manner described herein.

5'-UTRs, 3'-UTRs, and Translation Enhancer Elements (TEEs)

The 5'-UTR of a polynucleotides (e.g., mRNA) may include at least one translation enhancer element. The term "translational enhancer element" refers to sequences that increase the amount of polypeptide or protein produced from a polynucleotide. As a non-limiting example, the TEE may be located between the transcription promoter and the start codon. The polynucleotides (e.g., mRNA) with at least one TEE in the 5'-UTR may include a cap at the 5'-UTR. Further, at least one TEE may be located in the 5'-UTR of polynucleotides (e.g., mRNA) undergoing cap-dependent or cap-independent translation.

In one aspect, TEEs are conserved elements in the UTR which can promote translational activity of a polynucleotide such as, but not limited to, cap-dependent or cap-independent translation. The conservation of these sequences has been previously shown by Panek et al. (Nucleic Acids Research, 2013, 1-10) across 14 species including humans.

In one non-limiting example, the TEEs known may be in the 5'-leader of the Gtx homeodomain protein (Chappell et al., Proc. Natl. Acad. Sci. USA 101:9590-9594, 2004, the TEEs of which are incorporated herein by reference).

In another non-limiting example, TEEs are disclosed in US Patent Publication Nos. 2009/0226470 and 2013/0177581, International Patent Publication Nos. WO2009/075886, WO2012/009644, and WO1999/024595, and U.S. Pat. Nos. 6,310,197, and 6,849,405, the TEE sequences of each of which are incorporated herein by reference.

In yet another non-limiting example, the TEE may be an internal ribosome entry site (IRES), HCV-IRES or an IRES element such as, but not limited to, those described in U.S. Pat. No. 7,468,275, US Patent Publication Nos. 2007/0048776 and 2011/0124100 and International Patent Publication Nos. WO2007/025008 and WO2001/055369, the IRES sequences of each of which are incorporated herein by reference. The IRES elements may include, but are not limited to, the Gtx sequences (e.g., Gtx9-nt, Gtx8-nt, Gtx7-nt) described by Chappell et al. (Proc. Natl. Acad. Sci. USA 101:9590-9594, 2004) and Zhou et al. (PNAS 102:6273-6278, 2005) and in US Patent Publication Nos. 2007/0048776 and 2011/0124100 and International Patent Publication No. WO2007/025008, the IRES sequences of each of which are incorporated herein by reference.

"Translational enhancer polynucleotides" are polynucleotides which include one or more of the specific TEE exemplified herein and/or disclosed in the art (see e.g., U.S. Pat. Nos. 6,310,197, 6,849,405, 7,456,273, 7,183,395, U.S. Patent Publication Nos. 20090/226470, 2007/0048776, 2011/0124100, 2009/0093049, 2013/0177581, International Patent Publication Nos. WO2009/075886, WO2007/025008, WO2012/009644, WO2001/055371 WO1999/024595, and European Patent Nos. 2610341 and 2610340; the TEE sequences of each of which are incorporated herein by reference) or their variants, homologs or functional derivatives. One or multiple copies of a specific TEE can be present in a polynucleotide (e.g., mRNA). The TEEs in the translational enhancer polynucleotides can be organized in one or more sequence segments. A sequence segment can harbor one or more of the specific TEEs exemplified herein, with each TEE being present in one or more copies. When multiple sequence segments are present in a translational enhancer polynucleotide, they can be homogenous or heterogeneous. Thus, the multiple sequence segments in a translational enhancer polynucleotide can harbor identical or different types of the specific TEEs exemplified herein, identical or different number of copies of each of the specific TEEs, and/or identical or different organization of the TEEs within each sequence segment.

A polynucleotide (e.g., mRNA) may include at least one TEE that is described in International Patent Publication Nos. WO1999/024595, WO2012/009644, WO2009/075886, WO2007/025008, WO1999/024595, European Patent Publication Nos. 2610341 and 2610340, U.S. Pat. Nos. 6,310,197, 6,849,405, 7,456,273, 7,183,395, and US Patent Publication Nos. 2009/0226470, 2011/0124100, 2007/0048776, 2009/0093049, and 2013/0177581 the TEE sequences of each of which are incorporated herein by reference. The TEE may be located in the 5'-UTR of the polynucleotides (e.g., mRNA).

A polynucleotide (e.g., mRNA) may include at least one TEE that has at least 50%, at least 55%, at least 60%, at least 65%, at least 70%, at least 75%, at least 80%, at least 85%, at least 90%, at least 95% or at least 99% identity with the TEEs described in US Patent Publication Nos. 2009/0226470, 2007/0048776, 2013/0177581 and 2011/0124100, International Patent Publication Nos. WO1999/024595, WO2012/009644, WO2009/075886 and WO2007/025008, European Patent Publication Nos. 2610341 and 2610340, U.S. Pat. Nos. 6,310,197, 6,849,405, 7,456,273, 7,183,395, the TEE sequences of each of which are incorporated herein by reference.

The 5'-UTR of a polynucleotide (e.g., mRNA) may include at least 1, at least 2, at least 3, at least 4, at least 5, at least 6, at least 7, at least 8, at least 9, at least 10, at least 11, at least 12, at least 13, at least 14, at least 15, at least 16, at least 17, at least 18 at least 19, at least 20, at least 21, at least 22, at least 23, at least 24, at least 25, at least 30, at least 35, at least 40, at least 45, at least 50, at least 55 or more than 60 TEE sequences. The TEE sequences in the 5'-UTR of a polynucleotide (e.g., mRNA) may be the same or different TEE sequences. The TEE sequences may be in a pattern such as ABABAB, AABBAABBAABB, or ABCABCABC, or variants thereof, repeated once, twice, or more than three times. In these patterns, each letter, A, B, or C represent a different TEE sequence at the nucleotide level.

In some embodiments, the 5'-UTR may include a spacer to separate two TEE sequences. As a non-limiting example, the spacer may be a 15 nucleotide spacer and/or other spacers known in the art. As another non-limiting example, the 5'-UTR may include a TEE sequence-spacer module repeated at least once, at least twice, at least 3 times, at least 4 times, at least 5 times, at least 6 times, at least 7 times, at least 8 times, at least 9 times, or more than 9 times in the 5'-UTR.

In some embodiments, the spacer separating two TEE sequences may include other sequences known in the art which may regulate the translation of the polynucleotides (e.g., mRNA) of the present disclosure such as, but not limited to, miR sequences (e.g., miR binding sites and miR seeds). As a non-limiting example, each spacer used to separate two TEE sequences may include a different miR sequence or component of a miR sequence (e.g., miR seed sequence).

In some embodiments, the TEE in the 5'-UTR of a polynucleotide (e.g., mRNA) may include at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99% or more than 99% of the TEE sequences disclosed in US Patent Publication Nos. 2009/0226470, 2007/0048776, 2013/0177581 and 2011/0124100, International Patent Publication Nos. WO1999/024595, WO2012/009644, WO2009/075886 and WO2007/025008, European Patent Publication Nos. 2610341 and 2610340, and U.S. Pat. Nos. 6,310,197, 6,849,405, 7,456,273, and 7,183,395 the TEE sequences of each of which are incorporated herein by reference. In some embodiments, the TEE in the 5'-UTR of the polynucleotides (e.g., mRNA) of the present disclosure may include a 5-30 nucleotide fragment, a 5-25 nucleotide fragment, a 5-20 nucleotide fragment, a 5-15 nucleotide fragment, a 5-10 nucleotide fragment of the TEE sequences disclosed in US Patent Publication Nos. 2009/0226470, 2007/0048776, 2013/0177581 and 2011/0124100, International Patent Publication Nos. WO1999/024595, WO2012/009644, WO2009/075886 and WO2007/025008, European Patent Publication Nos. 2610341 and 2610340, and U.S. Pat. Nos. 6,310,197, 6,849,405, 7,456,273, and 7,183,395; the TEE sequences of each of which are incorporated herein by reference.

In certain cases, the TEE in the 5'-UTR of the polynucleotides (e.g., mRNA) of the present disclosure may include at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at least 99% or more than 99% of the TEE sequences disclosed in Chappell et al. (Proc. Natl. Acad. Sci. USA 101:9590-9594, 2004) and Zhou et al. (PNAS 102:6273-6278, 2005), in Supplemental Table 1 and in Supplemental Table 2 disclosed by Wellensiek et al (Genome-wide profiling of human cap-independent translation-enhancing elements, Nature Methods, 2013; DOI:10.1038/NMETH.2522); the TEE sequences of each of which are herein incorporated by reference. In some embodiments, the TEE in the 5'-UTR of the polynucleotides (e.g., mRNA) of the present disclosure may include a 5-30 nucleotide fragment, a 5-25 nucleotide fragment, a 5-20 nucleotide fragment, a 5-15 nucleotide fragment, a 5-10 nucleotide fragment of the TEE sequences disclosed in Chappell et al. (Proc. Natl. Acad. Sci. USA 101:9590-9594, 2004) and Zhou et al. (PNAS 102:6273-6278, 2005), in Supplemental Table 1 and in Supplemental Table 2 disclosed by Wellensiek et al (Genome-wide profiling of human cap-independent translation-enhancing elements, Nature Methods, 2013; DOI:10.1038/NMETH.2522); the TEE sequences of each of which is incorporated herein by reference.

In some embodiments, the TEE used in the 5'-UTR of a polynucleotide (e.g., mRNA) is an IRES sequence such as, but not limited to, those described in U.S. Pat. No. 7,468,275 and International Patent Publication No. WO2001/055369, the TEE sequences of each of which are incorporated herein by reference.

In some embodiments, the TEEs used in the 5'-UTR of a polynucleotide (e.g., mRNA) may be identified by the methods described in US Patent Publication Nos. 2007/0048776 and 2011/0124100 and International Patent Publication Nos. WO2007/025008 and WO2012/009644, the methods of each of which are incorporated herein by reference.

In some embodiments, the TEEs used in the 5'-UTR of a polynucleotide (e.g., mRNA) of the present disclosure may be a transcription regulatory element described in U.S. Pat. Nos. 7,456,273 and 7,183,395, US Patent Publication No. 2009/0093049, and International Publication No. WO2001/055371, the TEE sequences of each of which is incorporated herein by reference. The transcription regulatory elements may be identified by methods known in the art, such as, but not limited to, the methods described in U.S. Pat. Nos. 7,456,273 and 7,183,395, US Patent Publication No. 2009/0093049, and International Publication No. WO2001/055371, the methods of each of which is incorporated herein by reference.

In yet some embodiments, the TEE used in the 5'-UTR of a polynucleotide (e.g., mRNA) is a polynucleotide or portion thereof as described in U.S. Pat. Nos. 7,456,273 and 7,183,395, US Patent Publication No. 2009/0093049, and International Publication No. WO2001/055371, the TEE sequences of each of which are incorporated herein by reference.

The 5'-UTR including at least one TEE described herein may be incorporated in a monocistronic sequence such as, but not limited to, a vector system or a polynucleotide vector. As a non-limiting example, the vector systems and polynucleotide vectors may include those described in U.S. Pat. Nos. 7,456,273 and 7,183,395, US Patent Publication Nos. 2007/0048776, 2009/0093049 and 2011/0124100, and International Patent Publication Nos. WO2007/025008 and WO2001/055371, the TEE sequences of each of which are incorporated herein by reference.

The TEEs described herein may be located in the 5'-UTR and/or the 3'-UTR of the polynucleotides (e.g., mRNA). The TEEs located in the 3'-UTR may be the same and/or different than the TEEs located in and/or described for incorporation in the 5'-UTR.

In some embodiments, the 3'-UTR of a polynucleotide (e.g., mRNA) may include at least 1, at least 2, at least 3, at least 4, at least 5, at least 6, at least 7, at least 8, at least 9, at least 10, at least 11, at least 12, at least 13, at least 14, at least 15, at least 16, at least 17, at least 18 at least 19, at least 20, at least 21, at least 22, at least 23, at least 24, at least 25, at least 30, at least 35, at least 40, at least 45, at least 50, at least 55 or more than 60 TEE sequences. The TEE sequences in the 3'-UTR of the polynucleotides (e.g., mRNA) of the present disclosure may be the same or different TEE sequences. The TEE sequences may be in a pattern such as ABABAB, AABBAABBAABB, or ABCABCABC, or variants thereof, repeated once, twice, or more than three times. In these patterns, each letter, A, B, or C represent a different TEE sequence at the nucleotide level.

In one instance, the 3'-UTR may include a spacer to separate two TEE sequences. As a non-limiting example, the spacer may be a 15 nucleotide spacer and/or other spacers known in the art. As another non-limiting example, the 3'-UTR may include a TEE sequence-spacer module repeated at least once, at least twice, at least 3 times, at least 4 times, at least 5 times, at least 6 times, at least 7 times, at least 8 times, at least 9 times, or more than 9 times in the 3'-UTR.

In some embodiments, the spacer separating two TEE sequences may include other sequences known in the art which may regulate the translation of the polynucleotides (e.g., mRNA) of the present disclosure such as, but not limited to, miR sequences described herein (e.g., miR binding sites and miR seeds). As a non-limiting example, each spacer used to separate two TEE sequences may include a different miR sequence or component of a miR sequence (e.g., miR seed sequence).

In some embodiments, the incorporation of a miR sequence and/or a TEE sequence can change the shape of the stem loop region, which may increase and/or decrease translation. See e.g., Kedde et al., Nature Cell Biology 2010 12(10):1014-20, herein incorporated by reference in its entirety).

Stem Loops

Polynucleotides (e.g., mRNAs) may include a stem loop such as, but not limited to, a histone stem loop. The stem loop may be a nucleotide sequence that is about 25 or about 26 nucleotides in length such as, but not limited to, those described in International Patent Publication No. WO2013/103659, which are incorporated herein by reference. The histone stem loop may be located 3'-relative to the coding region (e.g., at the 3'-terminus of the coding region). As a non-limiting example, the stem loop may be located at the 3'-end of a polynucleotide described herein. In some embodiments, a polynucleotide (e.g., an mRNA) includes more than one stem loop (e.g., two stem loops). Examples of stem loop sequences are described in International Patent Publication Nos. WO2012/019780 and WO201502667, the stem loop sequences of which are herein incorporated by reference. In some embodiments, a polynucleotide includes the stem loop sequence CAAAGGCTCTTTTCAGAGCCACCA (SEQ ID NO: 1). In others, a polynucleotide includes the stem loop sequence CAAAGGCUCUUUUCAGAGCCACCA (SEQ ID NO: 2).

A stem loop may be located in a second terminal region of a polynucleotide. As a non-limiting example, the stem loop may be located within an untranslated region (e.g., 3'-UTR) in a second terminal region.

In some embodiments, a polynucleotide such as, but not limited to mRNA, which includes the histone stem loop may be stabilized by the addition of a 3'-stabilizing region (e.g., a 3'-stabilizing region including at least one chain terminating nucleoside). Not wishing to be bound by theory, the addition of at least one chain terminating nucleoside may slow the degradation of a polynucleotide and thus can increase the half-life of the polynucleotide.

In some embodiments, a polynucleotide such as, but not limited to mRNA, which includes the histone stem loop may be stabilized by an alteration to the 3'-region of the polynucleotide that can prevent and/or inhibit the addition of oligio(U) (see e.g., International Patent Publication No. WO2013/103659).

In yet some embodiments, a polynucleotide such as, but not limited to mRNA, which includes the histone stem loop may be stabilized by the addition of an oligonucleotide that terminates in a 3'-deoxynucleoside, 2',3'-dideoxynucleoside 3'-O-methylnucleosides, 3'-O-ethylnucleosides, 3'-arabinosides, and other alternative nucleosides known in the art and/or described herein.

In some embodiments, the polynucleotides of the present disclosure may include a histone stem loop, a poly-A region, and/or a 5'-cap structure. The histone stem loop may be before and/or after the poly-A region. The polynucleotides including the histone stem loop and a poly-A region sequence may include a chain terminating nucleoside described herein.

In some embodiments, the polynucleotides of the present disclosure may include a histone stem loop and a 5'-cap structure. The 5'-cap structure may include, but is not limited to, those described herein and/or known in the art.

In some embodiments, the conserved stem loop region may include a miR sequence described herein. As a non-limiting example, the stem loop region may include the seed sequence of a miR sequence described herein. In another non-limiting example, the stem loop region may include a miR-122 seed sequence.

In certain instances, the conserved stem loop region may include a miR sequence described herein and may also include a TEE sequence.

In some embodiments, the incorporation of a miR sequence and/or a TEE sequence changes the shape of the stem loop region which may increase and/or decrease translation. (See, e.g., Kedde et al. A Pumilio-induced RNA structure switch in p27-3'UTR controls miR-221 and miR-22 accessibility. Nature Cell Biology. 2010, herein incorporated by reference in its entirety).

Polynucleotides may include at least one histone stem-loop and a poly-A region or polyadenylation signal. Non-limiting examples of polynucleotide sequences encoding for at least one histone stem-loop and a poly-A region or a polyadenylation signal are described in International Patent Publication No. WO2013/120497, WO2013/120629, WO2013/120500, WO2013/120627, WO2013/120498, WO2013/120626, WO2013/120499 and WO2013/120628, the sequences of each of which are incorporated herein by reference. In certain cases, the polynucleotide encoding for a histone stem loop and a poly-A region or a polyadenylation signal may code for a pathogen antigen or fragment thereof such as the polynucleotide sequences described in International Patent Publication No WO2013/120499 and WO2013/120628, the sequences of both of which are incorporated herein by reference. In some embodiments, the polynucleotide encoding for a histone stem loop and a poly-A region or a polyadenylation signal may code for a therapeutic protein such as the polynucleotide sequences described in International Patent Publication No WO2013/120497 and WO2013/120629, the sequences of both of which are incorporated herein by reference. In some embodiments, the polynucleotide encoding for a histone stem loop and a poly-A region or a polyadenylation signal may code for a tumor antigen or fragment thereof such as the polynucleotide sequences described in International Patent Publication No WO2013/120500 and WO2013/120627, the sequences of both of which are incorporated herein by reference. In some embodiments, the polynucleotide encoding for a histone stem loop and a poly-A region or a polyadenylation signal may code for a allergenic antigen or an autoimmune self-antigen such as the polynucleotide sequences described in International Patent Publication No WO2013/120498 and WO2013/120626, the sequences of both of which are incorporated herein by reference.

Poly-A Regions

A polynucleotide or nucleic acid (e.g., an mRNA) may include a polyA sequence and/or polyadenylation signal. A polyA sequence may be comprised entirely or mostly of adenine nucleotides or analogs or derivatives thereof. A polyA sequence may be a tail located adjacent to a 3' untranslated region of a nucleic acid.

During RNA processing, a long chain of adenosine nucleotides (poly-A region) is normally added to messenger RNA (mRNA) molecules to increase the stability of the molecule. Immediately after transcription, the 3'-end of the transcript is cleaved to free a 3'-hydroxy. Then poly-A polymerase adds a chain of adenosine nucleotides to the RNA. The process, called polyadenylation, adds a poly-A region that is between 100 and 250 residues long.

Unique poly-A region lengths may provide certain advantages to the alternative polynucleotides of the present disclosure.

Generally, the length of a poly-A region of the present disclosure is at least 30 nucleotides in length. In some embodiments, the length is at least 40 nucleotides, at least 50 nucleotides, at least 60 nucleotides, at least 70 nucleotides, at least 80 nucleotides, at least 90 nucleotides, at least 100 nucleotides, at least 120 nucleotides, at least 140 nucleotides, at least 160 nucleotides, at least 180 nucleotides, at least 200 nucleotides, at least 250 nucleotides, at least 300 nucleotides, at least 350 nucleotides, at least 400 nucleotides, at least 450 nucleotides, at least 500 nucleotides, at least 600 nucleotides, at least 700 nucleotides, at least 800 nucleotides, at least 900 nucleotides, at least 1000 nucleotides, at least 1200 nucleotides, at least 1400 nucleotides, at least 1600 nucleotides, at least 1800 nucleotides, at least 2000 nucleotides, at least 2500 nucleotides, or at least 3000 nucleotides.

In some embodiments, the poly-A region may be 80 nucleotides, 120 nucleotides, 160 nucleotides in length on an alternative polynucleotide molecule described herein.

In some embodiments, the poly-A region may be 20, 40, 80, 100, 120, 140 or 160 nucleotides in length on an alternative polynucleotide molecule described herein.

In some embodiments, the poly-A region is designed relative to the length of the overall alternative polynucleotide. This design may be based on the length of the coding region of the alternative polynucleotide, the length of a particular feature or region of the alternative polynucleotide (such as mRNA), or based on the length of the ultimate product expressed from the alternative polynucleotide. When relative to any feature of the alternative polynucleotide (e.g., other than the mRNA portion which includes the poly-A region) the poly-A region may be 10, 20, 30, 40, 50, 60, 70, 80, 90 or 100% greater in length than the additional feature. The poly-A region may also be designed as a fraction of the alternative polynucleotide to which it belongs. In this context, the poly-A region may be 10, 20, 30, 40, 50, 60, 70, 80, or 90% or more of the total length of the construct or the total length of the construct minus the poly-A region.

In certain cases, engineered binding sites and/or the conjugation of polynucleotides (e.g., mRNA) for poly-A binding protein may be used to enhance expression. The engineered binding sites may be sensor sequences which can operate as binding sites for ligands of the local microenvironment of the polynucleotides (e.g., mRNA). As a non-limiting example, the polynucleotides (e.g., mRNA) may include at least one engineered binding site to alter the binding affinity of poly-A binding protein (PABP) and analogs thereof. The incorporation of at least one engineered binding site may increase the binding affinity of the PABP and analogs thereof.

Additionally, multiple distinct polynucleotides (e.g., mRNA) may be linked together to the PABP (poly-A binding protein) through the 3'-end using alternative nucleotides at the 3'-terminus of the poly-A region. Transfection experiments can be conducted in relevant cell lines at and protein production can be assayed by ELISA at 12 hours, 24 hours, 48 hours, 72 hours, and day 7 post-transfection. As a non-limiting example, the transfection experiments may be used to evaluate the effect on PABP or analogs thereof binding affinity as a result of the addition of at least one engineered binding site.

In certain cases, a poly-A region may be used to modulate translation initiation. While not wishing to be bound by theory, the poly-A region recruits PABP which in turn can interact with translation initiation complex and thus may be essential for protein synthesis.

In some embodiments, a poly-A region may also be used in the present disclosure to protect against 3'-5'-exonuclease digestion.

In some embodiments, a polynucleotide (e.g., mRNA) may include a polyA-G Quartet. The G-quartet is a cyclic hydrogen bonded array of four guanosine nucleotides that can be formed by G-rich sequences in both DNA and RNA. In this embodiment, the G-quartet is incorporated at the end of the poly-A region. The resultant polynucleotides (e.g., mRNA) may be assayed for stability, protein production and other parameters including half-life at various time points. It has been discovered that the polyA-G quartet results in protein production equivalent to at least 75% of that seen using a poly-A region of 120 nucleotides alone.

In some embodiments, a polynucleotide (e.g., mRNA) may include a poly-A region and may be stabilized by the addition of a 3'-stabilizing region. The polynucleotides (e.g., mRNA) with a poly-A region may further include a 5'-cap structure.

In some embodiments, a polynucleotide (e.g., mRNA) may include a poly-A-G Quartet. The polynucleotides (e.g., mRNA) with a poly-A-G Quartet may further include a 5'-cap structure.

In some embodiments, the 3'-stabilizing region which may be used to stabilize a polynucleotide (e.g., mRNA) including a poly-A region or poly-A-G Quartet may be, but is not limited to, those described in International Patent Publication No. WO2013/103659, the poly-A regions and poly-A-G Quartets of which are incorporated herein by reference. In some embodiments, the 3'-stabilizing region which may be used with the present disclosure include a chain termination nucleoside such as 3'-deoxyadenosine (cordycepin), 3'-deoxyuridine, 3'-deoxycytosine, 3'-deoxyguanosine, 3'-deoxythymine, 2',3'-dideoxynucleosides, such as 2',3'-dideoxyadenosine, 2',3'-dideoxyuridine, 2',3'-dideoxycytosine, 2',3'-dideoxyguanosine, 2',3'-dideoxythymine, a 2'-deoxynucleoside, or an O-methylnucleoside.

In some embodiments, a polynucleotide such as, but not limited to mRNA, which includes a polyA region or a poly-A-G Quartet may be stabilized by an alteration to the 3'-region of the polynucleotide that can prevent and/or inhibit the addition of oligio(U) (see e.g., International Patent Publication No. WO2013/103659).

In some embodiments, a polynucleotide such as, but not limited to mRNA, which includes a poly-A region or a poly-A-G Quartet may be stabilized by the addition of an oligonucleotide that terminates in a 3'-deoxynucleoside, 2',3'-dideoxynucleoside 3'-O-methylnucleosides, 3'-O-ethylnucleosides, 3'-arabinosides, and other alternative nucleosides known in the art and/or described herein.

Chain Terminating Nucleosides

A nucleic acid may include a chain terminating nucleoside. For example, a chain terminating nucleoside may include those nucleosides deoxygenated at the 2' and/or 3' positions of their sugar group. Such species may include 3'-deoxyadenosine (cordycepin), 3'-deoxyuridine, 3'-deoxycytosine, 3'-deoxyguanosine, 3'-deoxythymine, and 2',3'-dideoxynucleosides, such as 2',3'-dideoxyadenosine, 2',3'-dideoxyuridine, 2',3'-dideoxycytosine, 2',3'-dideoxyguanosine, and 2',3'-dideoxythymine.

Lipids and Lipid Mixtures

In some embodiments, the lipid is an ionizable lipid.

In some embodiments, the lipid is a phospholipid.

In some embodiments, the lipid is a PEG lipid.

In some embodiments, the lipid is a structural lipid.

In some embodiments, the lipid mixture comprises an ionizable lipid.

In some embodiments, the lipid mixture comprises a phospholipid.

In some embodiments, the lipid mixture comprises a PEG lipid.

In some embodiments, the lipid mixture comprises a structural lipid.

In some embodiments, the lipid mixture comprises an ionizable lipid, a phospholipid, a PEG lipid, a structural lipid, or any combination thereof.

Ionizable Lipids

In some aspects, the ionizable lipids of the present disclosure may be one or more of compounds of Formula (IL-I):

(IL-I)

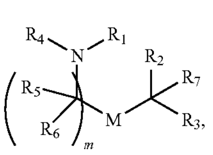

or their N-oxides, or salts or isomers thereof, wherein:

$R^1$ is selected from the group consisting of $C_{5-30}$ alkyl, $C_{5-20}$ alkenyl, —R*YR", —YR", and —R"M'R';

$R^2$ and $R^3$ are independently selected from the group consisting of H, $C_{1-14}$ alkyl, $C_{2-14}$ alkenyl, —R*YR", —YR", and —R*OR", or $R^2$ and $R^3$, together with the atom to which they are attached, form a heterocycle or carbocycle;

$R^4$ is selected from the group consisting of hydrogen, a $C_{3-6}$ carbocycle, $—(CH_2)_nQ$, $—(CH_2)_nCHQR$, $—(CH_2)_oC(R^{10})_2(CH_2)_{n-o}Q$, —CHQR, $—CQ(R)_2$, —C(O)NQR and unsubstituted $C_{1-6}$ alkyl, where Q is selected from a carbocycle, heterocycle, —OR, $—O(CH_2)_nN(R)_2$, —C(O)OR, —OC(O)R, $—CX_3$, $—CX_2H$, $—CXH_2$, —CN, $—N(R)_2$, $—C(O)N(R)_2$, —N(R)C(O)R, $—N(R)S(O)_2R$, $—N(R)C(O)N(R)_2$, $—N(R)C(S)N(R)_2$, $—N(R)R^8$, $—N(R)S(O)_2R^8$, $—O(CH_2)_nOR$, $—N(R)C(=NR^9)N(R)_2$, $—N(R)C(=CHR^9)N(R)_2$, $—OC(O)\ N(R)_2$, —N(R)C(O)OR, —N(OR)C(O)R, $—N(OR)S(O)_2R$, —N(OR)C(O)OR, $—N(OR)C(O)N(R)_2$, $—N(OR)C(S)N(R)_2$, $—N(OR)C(=NR^9)N(R)_2$, $—N(OR)C(=CHR^9)N(R)_2$, $—C(=NR^9)N(R)_2$, $—C(=NR^9)R$, —C(O)N(R)OR, $—(CH_2)_nN(R)_2$ and $—C(R)N(R)_2C(O)OR$, each o is independently selected from 1, 2, 3, and 4, and each n is independently selected from 1, 2, 3, 4, and 5;

each $R^5$ is independently selected from the group consisting of OH, $C_{1-3}$ alkyl, $C_{2-3}$ alkenyl, and H;

each $R^6$ is independently selected from the group consisting of OH, $C_{1-3}$ alkyl, $C_{2-3}$ alkenyl, and H;

M and M' are independently selected from —C(O)O—, —OC(O)—, —OC(O)-M"-C(O)O—, —C(O)N(R')—, —N(R')C(O)—, —C(O)—, —C(S)—, —C(S)S—, —SC(S)—, —CH(OH)—, —P(O)(OR')O—, $—S(O)_2—$, —S—S—, an aryl group, and a heteroaryl group, in which M" is a bond, $C_{1-13}$ alkyl or $C_{2-13}$ alkenyl;

$R^7$ is selected from the group consisting of $C_{1-3}$ alkyl, $C_{2-3}$ alkenyl, and H;

$R^8$ is selected from the group consisting of $C_{3-6}$ carbocycle and heterocycle;

$R^9$ is selected from the group consisting of H, CN, $NO_2$, $C_{1-6}$ alkyl, —OR, $—S(O)_2R$, $—S(O)_2N(R)_2$, $C_{2-6}$ alkenyl, $C_{3-6}$ carbocycle and heterocycle;

$R^{10}$ is selected from the group consisting of H, OH, $C_{1-3}$ alkyl, and $C_{2-3}$ alkenyl; each R is independently selected from the group consisting of $C_{1-6}$ alkyl, $C_{1-3}$ alkyl-aryl, $C_{2-3}$ alkenyl, $(CH_2)_qOR^*$, and H, and each q is independently selected from 1, 2, and 3;

each R' is independently selected from the group consisting of $C_{1-18}$ alkyl, $C_{2-18}$ alkenyl, —R*YR", —YR", and H;

each R" is independently selected from the group consisting of $C_{3-15}$ alkyl and $C_{3-15}$ alkenyl;

each R* is independently selected from the group consisting of $C_{1-12}$ alkyl and $C_{2-12}$ alkenyl;

each Y is independently a $C_{3-6}$ carbocycle;

each X is independently selected from the group consisting of F, Cl, Br, and I; and m is selected from 5, 6, 7, 8, 9, 10, 11, 12, and 13; and wherein when $R^4$ is $—(CH_2)_nQ$, $—(CH_2)_nCHQR$, —CHQR, or $—CQ(R)_2$, then (i) Q is not $—N(R)_2$ when n is 1, 2, 3, 4 or 5, or (ii) Q is not 5, 6, or 7-membered heterocycloalkyl when n is 1 or 2.

In some embodiments, a subset of compounds of Formula (IL-I) includes those of Formula (IL-IA):

(IL-IA)

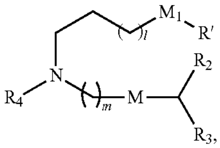

or its N-oxide, or a salt or isomer thereof, wherein:

l is selected from 1, 2, 3, 4, and 5; m is selected from 5, 6, 7, 8, and 9; $M_1$ is a bond or M'; $R^4$ is hydrogen, unsubstituted $C_{1-3}$ alkyl, $—(CH_2)_oC(R^{10})_2(CH_2)_{n-o}Q$, —C(O)NQR or $—(CH_2)_nQ$, in which Q is OH, $—NHC(S)N(R)_2$, $—NHC(O)N(R)_2$, —N(R)C(O)R, $—N(R)S(O)_2R$, —N(R)R', $—NHC(═NR^9)N(R)_2$, $—NHC(═CHR^9)N(R)_2$, $—OC(O)N(R)_2$, —N(R)C(O)OR, $—(CH_2)_nN(R)_2$, heteroaryl or heterocycloalkyl; M and M' are independently selected from —C(O)O—, —OC(O)—, —OC(O)-M"-C(O)O—, —C(O)N(R')—, —P(O)(OR')O—, —S—S—, an aryl group, and a heteroaryl group; and $R^2$ and $R^3$ are independently selected from the group consisting of H, $C_{1-14}$ alkyl, and $C_{2-14}$ alkenyl. For example, m is 5, 7, or 9. For example, Q is OH, $—NHC(S)N(R)_2$, or $—NHC(O)N(R)_2$.

In some embodiments, Q is —N(R)C(O)R, or $—N(R)S(O)_2R$.

In some embodiments, a subset of compounds of Formula (I) includes those of Formula (IL-IB):

(IL-IB)

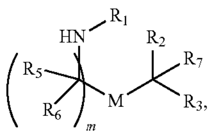

or its N-oxide, or a salt or isomer thereof in which all variables are as defined herein.

In some embodiments, m is selected from 5, 6, 7, 8, and 9; $R_4$ is hydrogen, unsubstituted $C_{1-3}$ alkyl, or $—(CH_2)_nQ$, in which Q is OH, $—NHC(S)N(R)_2$, $—NHC(O)N(R)_2$, —N(R)C(O)R, $—N(R)S(O)_2R$, $—N(R)R_8$, $—NHC(═NR_9)N(R)_2$, $—NHC(═CHR_9)N(R)_2$, $—OC(O)N(R)_2$, —N(R)C(O)OR, heteroaryl or heterocycloalkyl; M and M' are independently selected from —C(O)O—, —OC(O)—, —OC(O)-M"-C(O)O—, —C(O)N(R')—, —P(O)(OR')O—, —S—S—, an aryl group, and a heteroaryl group; and $R_2$ and $R_3$ are independently selected from the group consisting of H, $C_{1-14}$ alkyl, and $C_{2-14}$ alkenyl. In some embodiments, m is 5, 7, or 9. In some embodiments, Q is OH, $—NHC(S)N(R)_2$, or $—NHC(O)N(R)_2$. In some embodiments, Q is —N(R)C(O)R, or $—N(R)S(O)_2R$.

In some embodiments, a subset of compounds of Formula (IL-I) includes those of Formula (IL-II):

(IL-II)

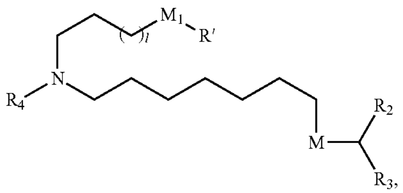

or its N-oxide, or a salt or isomer thereof, wherein 1 is selected from 1, 2, 3, 4, and 5; $M_1$ is a bond or M'; $R^4$ is hydrogen, unsubstituted $C_{1-3}$ alkyl, $—(CH_2)_oC(R^{10})_2(CH_2)_{n-o}Q$, —C(O)NQR or $—(CH_2)_nQ$, in which n is 2, 3, or 4, and Q is OH, $—NHC(S)N(R)_2$, $—NHC(O)N(R)_2$, —N(R)C(O)R, $—N(R)S(O)_2R$, $—N(R)R^8$, $—NHC(═NR^9)N(R)_2$, $—NHC(═CHR^9)N(R)_2$, $—OC(O)N(R)_2$, —N(R)C(O)OR, $—(CH_2)_nN(R)_2$, heteroaryl or heterocycloalkyl; M and M' are independently selected from —C(O)O—, —OC(O)—, —OC(O)-M"-C(O)O—, —C(O)N(R')—, —P(O)(OR')O—, —S—S—, an aryl group, and a heteroaryl group; and $R^2$ and $R^3$ are independently selected from the group consisting of H, $C_{1-14}$ alkyl, and $C_{2-14}$ alkenyl.

In some embodiments, the compounds of Formula (IL-I) are of Formula (IL-IIa), (IL-IIa)

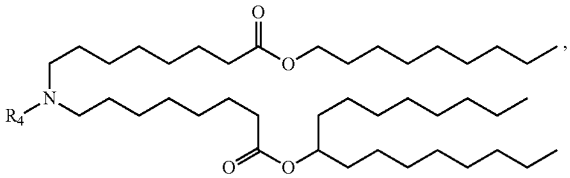

or their N-oxides, or salts or isomers thereof, wherein $R_4$ is as described herein.

In some embodiments, the compounds of Formula (IL-I) are of Formula (IL-IIb), (IL-IIb)

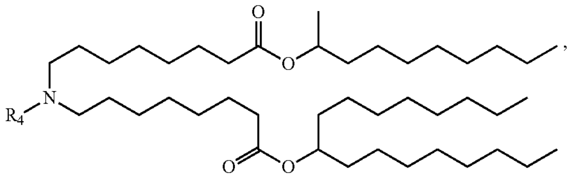

or their N-oxides, or salts or isomers thereof, wherein $R_4$ is as described herein.

In some embodiments, the compounds of Formula (IL-I) are of Formula (IL-IIc) or (IL-IIe):

(IL-IIc)

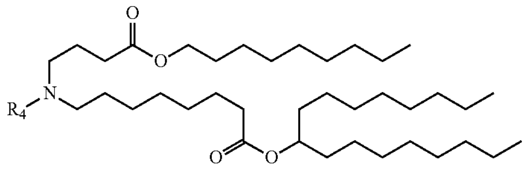

or (IL-IIe)

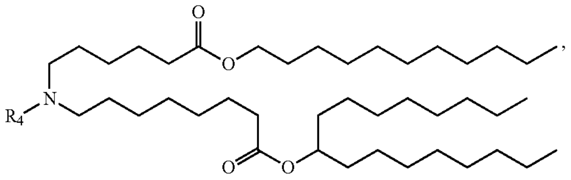

or their N-oxides, or salts or isomers thereof, wherein $R_4$ is as described herein.

In some embodiments, the compounds of Formula (IL-I) are of Formula (IL-IIf):

(IL-IIf)

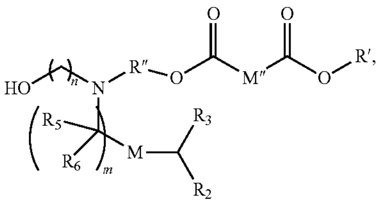

or their N-oxides, or salts or isomers thereof, wherein M is —C(O)O— or —OC(O)—, M" is $C_{1-6}$ alkyl or $C_{2-6}$ alkenyl, $R_2$ and $R_3$ are independently selected from the group consisting of $C_{5-14}$ alkyl and $C_{5-14}$ alkenyl, and n is selected from 2, 3, and 4.

In a further embodiment, the compounds of Formula (IL-I) are of Formula (IL-IId), (IL-IId)

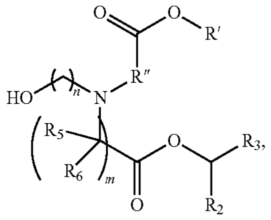

or their N-oxides, or salts or isomers thereof, wherein n is 2, 3, or 4; and m, R', R", and $R^2$ through $R_6$ are as described herein. In some embodiments, each of $R_2$ and $R_3$ may be independently selected from the group consisting of $C_{5-14}$ alkyl and $C_{5-14}$ alkenyl.

In a further embodiment, the compounds of Formula (IL-I) are of Formula (IL-IIg), (IL-IIg)

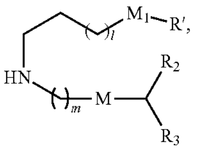

or their N-oxides, or salts or isomers thereof, wherein 1 is selected from 1, 2, 3, 4, and 5; m is selected from 5, 6, 7, 8, and 9; $M_1$ is a bond or M'; M and M' are independently selected from —C(O)O—, —OC(O)—, —OC(O)-M"-C(O)O—, —C(O)N(R')—, —P(O)(OR')O—, —S—S—, an aryl group, and a heteroaryl group; and $R_2$ and $R_3$ are independently selected from the group consisting of H, $C_{1-14}$ alkyl, and $C_{2-14}$ alkenyl. In some embodiments, M" is $C_{1-6}$ alkyl (e.g., $C_{1-4}$ alkyl) or $C_{2-6}$ alkenyl (e.g. $C_{2-4}$ alkenyl). In some embodiments, $R_2$ and $R_3$ are independently selected from the group consisting of $C_{5-14}$ alkyl and $C_{5-14}$ alkenyl.

In some embodiments, the ionizable lipids are one or more of the compounds described in U.S. Application Nos. 62/220,091, 62/252,316, 62/253,433, 62/266,460, 62/333,557, 62/382,740, 62/393,940, 62/471,937, 62/471,949, 62/475,140, and 62/475,166, and PCT Application No. PCT/US2016/052352.

In some embodiments, the ionizable lipids are selected from Compounds 1-280 described in U.S. Application No. 62/475,166.

In some embodiments, the ionizable lipid is

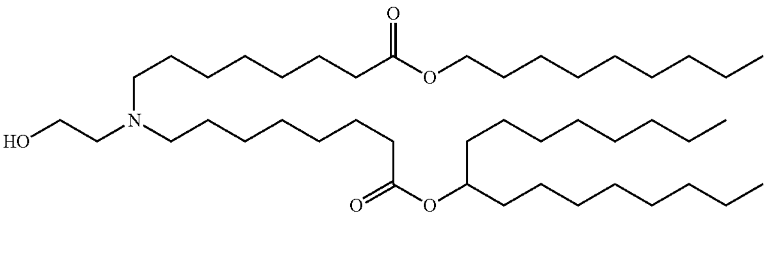

or a salt thereof.

In some embodiments, the ionizable lipid is

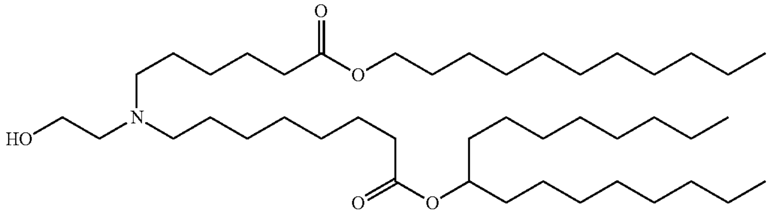
, or a salt thereof.

In some embodiments, the ionizable lipid is

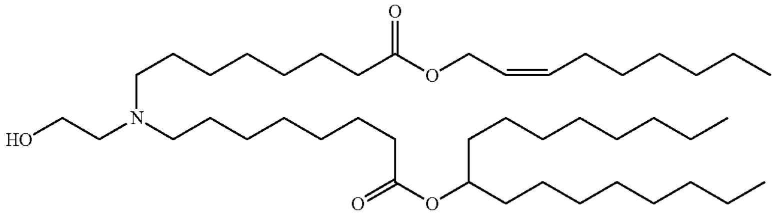
, or a salt thereof.

In some embodiments, the ionizable lipid is

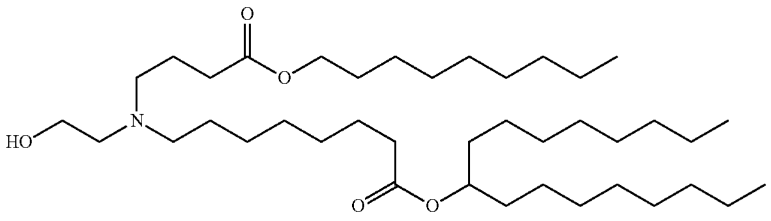
, or a salt thereof.

In some embodiments, the ionizable lipids are one or more of the compounds described in U.S. Application Nos. 62/733,315 and 62/798,874.

In some embodiments, the ionizable lipid is of Formula (IL-IIh):

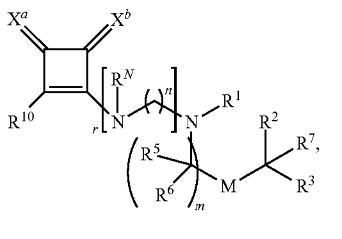
(IL-IIh)

or its N-oxide, or a salt or isomer thereof, wherein $R^1$ is selected from the group consisting of $C_{5-30}$ alkyl, $C_{5-20}$ alkenyl, —R*YR", —YR", and —R"M'R';

$R^2$ and $R^3$ are independently selected from the group consisting of H, $C_{1-14}$ alkyl, $C_{2-14}$ alkenyl, —R*YR", —YR", and —R*OR", or $R^2$ and $R^3$, together with the atom to which they are attached, form a heterocycle or carbocycle;

each $R^5$ is independently selected from the group consisting of OH, $C_{1-3}$ alkyl, $C_{2-3}$ alkenyl, and H;

each $R^6$ is independently selected from the group consisting of OH, $C_{1-3}$ alkyl, $C_{2-3}$ alkenyl, and H;

M and M' are independently selected from —C(O)O—, —OC(O)—, —OC(O)-M"-C(O)O—, —C(O)N(R')—, —N(R')C(O)—, —C(O)—, —C(S)—, —C(S)S—, —SC(S)—, —CH(OH)—, —P(O)(OR')O—, —$S(O)_2$—, —S—S—, an aryl group, and a heteroaryl group, in which M" is a bond, $C_{1-13}$ alkyl or $C_{2-13}$ alkenyl;

$R^7$ is selected from the group consisting of $C_{1-3}$ alkyl, $C_{2-3}$ alkenyl, and H;

each R is independently selected from the group consisting of H, $C_{1-3}$ alkyl, and $C_{2-3}$ alkenyl; $R^N$ is H, or $C_{1-3}$ alkyl;

each R' is independently selected from the group consisting of $C_{1-18}$ alkyl, $C_{2-13}$ alkenyl, —R*YR", —YR", and H;

each R" is independently selected from the group consisting of $C_{3-15}$ alkyl and $C_{3-15}$ alkenyl;

each R* is independently selected from the group consisting of $C_{1-12}$ alkyl and $C_{2-12}$ alkenyl;

each Y is independently a $C_{3-6}$ carbocycle;

each X is independently selected from the group consisting of F, Cl, Br, and I;

$X^a$ and $X^b$ are each independently O or S;

$R^{10}$ is selected from the group consisting of H, halo, —OH, R, —$N(R)_2$, —CN, —$N_3$, —C(O)OH, —C(O)OR, —OC(O)R, —OR, —SR, —S(O)R, —S(O)OR, $—S(O)_2OR$, $—NO_2$, $—S(O)_2N(R)_2$, $—N(R)S(O)_2R$, $—NH(CH_2)_{t1}N(R)_2$, $—NH(CH_2)_{p1}O(CH_2)_{q1}N(R)_2$, $—NH(CH_2)_{s1}OR$, $—N((CH_2)_{s1}OR)_2$, —N(R)-carbocycle, —N(R)-heterocycle, —N(R)-aryl, —N(R)—heteroaryl, $—N(R)(CH_2)_{t1}$-carbocycle, $—N(R)(CH_2)_{t1}$-heterocycle, $—N(R)(CH_2)_{t1}$-aryl, $—N(R)(CH_2)_{t1}$-heteroaryl, a carbocycle, a heterocycle, aryl and heteroaryl;

m is selected from 5, 6, 7, 8, 9, 10, 11, 12, and 13;

n is selected from 1, 2, 3, 4, 5, 6, 7, 8, 9, and 10;

r is 0 or 1;

$t^1$ is selected from 1, 2, 3, 4, and 5;

$p^1$ is selected from 1, 2, 3, 4, and 5;

$q^1$ is selected from 1, 2, 3, 4, and 5; and $s^1$ is selected from 1, 2, 3, 4, and 5.

In some embodiments, the ionizable lipid is of Formula (IL-IIi):

(IL-IIi)

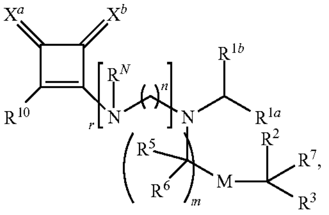

or its N-oxide, or a salt or isomer thereof, wherein $R^{1a}$ and $R^{1b}$ are independently selected from the group consisting of $C_{1-14}$ alkyl and $C_{2-14}$ alkenyl; and $R^2$ and $R^3$ are independently selected from the group consisting of $C_{1-14}$ alkyl, $C_{2-14}$ alkenyl, —R*YR", —YR", and —R*OR", or $R^2$ and $R^3$, together with the atom to which they are attached, form a heterocycle or carbocycle.

In some embodiments, the ionizable lipid is of Formula (IL-IIj):

(IL-IIj)

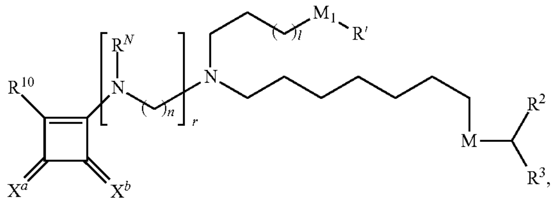

or its N-oxide, or a salt or isomer thereof, wherein l is selected from 1, 2, 3, 4, and 5;

$M_1$ is a bond or M'; and $R^2$ and $R^3$ are independently selected from the group consisting of H, $C_{1-14}$ alkyl, and $C_{2-14}$ alkenyl.

In some embodiments, the ionizable lipid is of Formula (IL-IIk):

(IL-IIk)

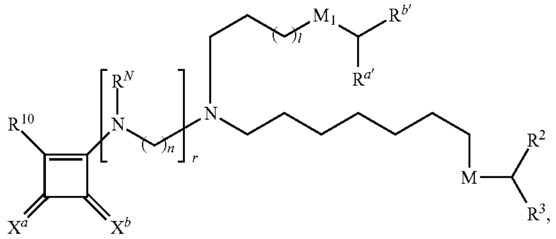

or its N-oxide, or a salt or isomer thereof, wherein l is selected from 1, 2, 3, 4, and 5;

$M_1$ is a bond or M'; and $R^{a'}$ and $R^{b'}$ are independently selected from the group consisting of $C_{1-14}$ alkyl and $C_{2-14}$ alkenyl; and $R^2$ and $R^3$ are independently selected from the group consisting of $C_{1-14}$ alkyl, and $C_{2-14}$ alkenyl.

In some embodiments, the ionizable lipid is

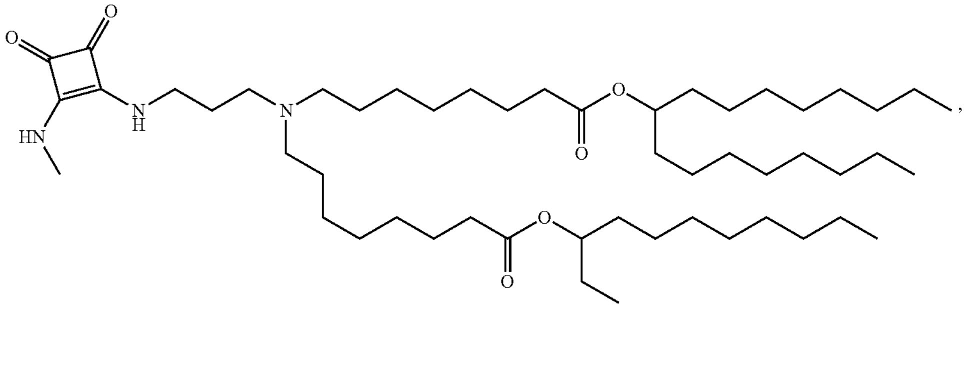 [SMILES: CCCCCCCCC(CC)OC(=O)CCCCCCCN(CCCCCCCC(=O)OC(CCCCCCCC)CCCCCCCC)CCCNc1c(NC)c(=O)c1=O]

or a salt thereof.

In some aspects, the ionizable lipids of the present disclosure may be one or more of compounds of formula (IL-III), (IL-III)

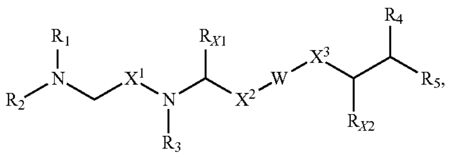

or salts or isomers thereof, wherein

W is

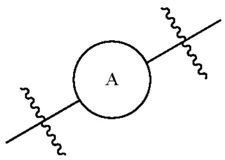

or

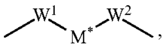

ring A is

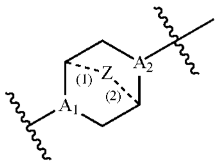

or

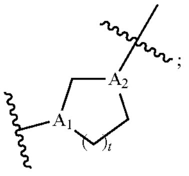

t is 1 or 2;

$A_1$ and $A_2$ are each independently selected from CH or N;

Z is $CH_2$ or absent wherein when Z is $CH_2$, the dashed lines (1) and (2) each represent a single bond; and when Z is absent, the dashed lines (1) and (2) are both absent;

$R_1$, $R_2$, $R_3$, $R_4$, and $R_5$ are independently selected from the group consisting of $C_{5-20}$ alkyl, $C_{5-20}$ alkenyl, —R"MR', —R*YR", —YR", and —R*OR";

$R_{X1}$ and $R_{X2}$ are each independently H or $C_{1-3}$ alkyl;

each M is independently selected from the group consisting of —C(O)O—, —OC(O)—, —OC(O)O—, —C(O)N(R')—, —N(R')C(O)—, —C(O)—, —C(S)—, —C(S)S—, —SC(S)—, —CH(OH)—, —P(O)(OR')O—, —$S(O)_2$—, —C(O)S—, —SC(O)—, an aryl group, and a heteroaryl group;

M* is $C_1$-$C_6$ alkyl, $W^1$ and $W^2$ are each independently selected from the group consisting of —O— and —$N(R_6)$—;

each $R^6$ is independently selected from the group consisting of H and $C_{1-5}$ alkyl;

$X^1$, $X^2$, and $X^3$ are independently selected from the group consisting of a bond, —$CH_2$—, —$(CH_2)_2$—, —CHR—, —CHY—, —C(O)—, —C(O)O—, —OC(O)—, —$(CH_2)_n$—C(O)—, —C(O)—$(CH_2)_n$—, —$(CH_2)_n$—C(O)O—, —OC(O)—$(CH_2)_n$—, —$(CH_2)_n$—OC(O)—, —C(O)O—$(CH_2)_n$—, —CH(OH)—, —C(S)—, and —CH(SH)—;

each Y is independently a $C_{3-6}$ carbocycle;

each R* is independently selected from the group consisting of $C_{1-12}$ alkyl and $C_{2-12}$ alkenyl;

each R is independently selected from the group consisting of $C_{1-3}$ alkyl and a $C_{3-6}$ carbocycle;

each R' is independently selected from the group consisting of $C_{1-12}$ alkyl, $C_{2-12}$ alkenyl, and H;

each R" is independently selected from the group consisting of $C_{3-12}$ alkyl, $C_{3-12}$ alkenyl and —R*MR'; and n is an integer from 1-6;

wherein when ring A is

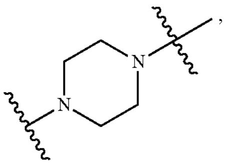 [SMILES: *N1CCN(*)CC1]

then i) at least one of $X^1$, $X^2$, and $X^3$ is not —$CH_2$—; and/or ii) at least one of $R_1$, $R_2$, $R_3$, $R_4$, and $R_5$ is —R"MR'.

In some embodiments, the compound is of any of formulae (IL-IIIa1)-(IL-IIIa8):

(IL-IIIa1)

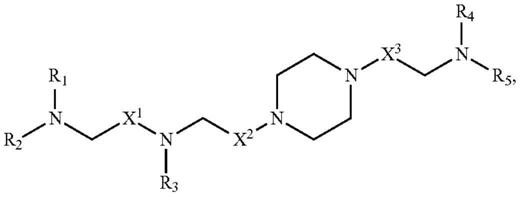

(IL-IIIa2)

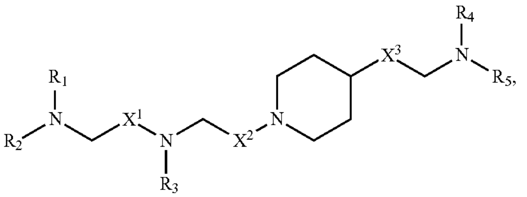

(IL-IIIa3)

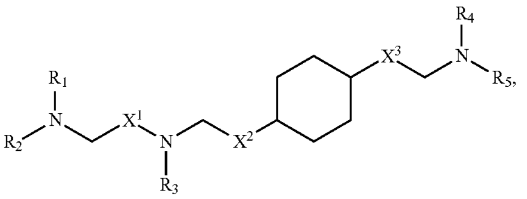

(IL-IIIa4)

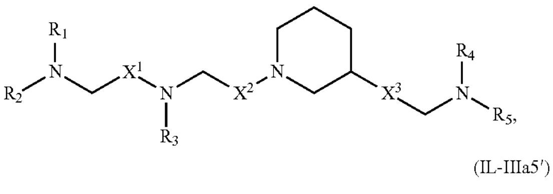

(IL-IIIa5')

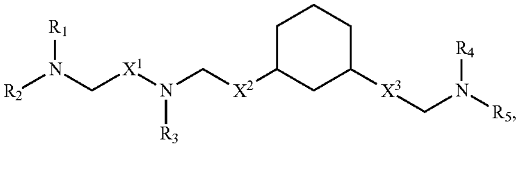

-continued (IL-IIIa6)

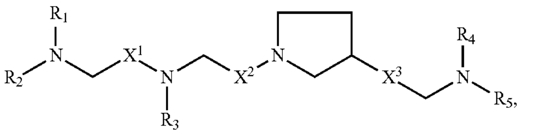

(IL-IIIa7)

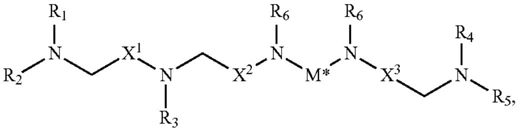

or (IL-IIIa8)

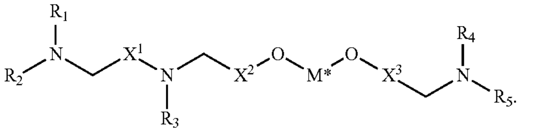

In some embodiments, the ionizable lipids are one or more of the compounds described in U.S. Application Nos. 62/271,146, 62/338,474, 62/413,345, and 62/519,826, and PCT Application No. PCT/US2016/068300.

In some embodiments, the ionizable lipids are selected from Compounds 1-156 described in U.S. Application No. 62/519,826.

In some embodiments, the ionizable lipids are selected from Compounds 1-16, 42-66, 68-76, and 78-156 described in U.S. Application No. 62/519,826.

In some embodiments, the ionizable lipid is

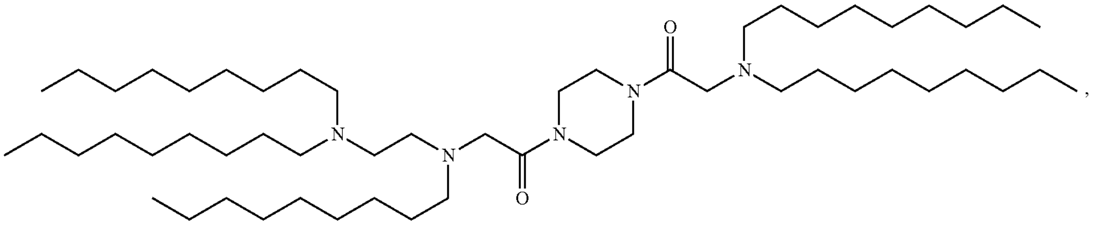 [SMILES: CCCCCCCCCN(CCCCCCCCC)CCN(CCCCCCCCC)CC(=O)N1CCN(C(=O)CN(CCCCCCCCC)CCCCCCCCC)CC1]

or a salt thereof.

The central amine moiety of a lipid according to Formula (IL-I), (IL-IA), (IL-IB), (IL-II), (IL-IIa), (IL-IIb), (IL-IIc), (IL-IId), (IL-IIe), (IL-IIf), (IL-IIg), (IL-III), (IL-IIIa1), (IL-IIIa2), (IL-IIIa3), (IL-IIIa4), (IL-IIIa5), (IL-IIIa6), (IL-IIIa7), or (IL-IIIa8) may be protonated at a physiological pH. Thus, a lipid may have a positive or partial positive charge at physiological pH. Such lipids may be referred to as cationic or ionizable (amino) lipids. Lipids may also be zwitterionic, i.e., neutral molecules having both a positive and a negative charge.

Polyethylene Glycol (PEG) Lipids

As used herein, the term "PEG lipid" refers to polyethylene glycol (PEG)-modified lipids. Non-limiting examples of PEG lipids include PEG-modified phosphatidylethanolamine and phosphatidic acid, PEG-ceramide conjugates (e.g., PEG-CerC14 or PEG-CerC20), PEG-modified dialkylamines and PEG-modified 1,2-diacyloxypropan-3-amines. Such lipids are also referred to as PEGylated lipids. In some embodiments, a PEG lipid can be PEG-c-DOMG, PEG-DMG, PEG-DLPE, PEG-DMPE, PEG-DPPC, or a PEG-DSPE lipid.

In some embodiments, the PEG lipid includes, but not limited to 1,2-dimyristoyl-sn-glycerol methoxypolyethylene glycol (PEG-DMG), 1,2-distearoyl-sn-glycero-3-phosphoethanolamine-N-[amino(polyethylene glycol)] (PEG-DSPE), PEG-disteryl glycerol (PEG-DSG), PEG-dipalmetoleyl, PEG-dioleyl, PEG-distearyl, PEG-diacylglycamide (PEG-DAG), PEG-dipalmitoyl phosphatidylethanolamine (PEG-DPPE), or PEG-1,2-dimyristyloxlpropyl-3-amine (PEG-c-DMA).

In some embodiments, the PEG lipid is selected from the group consisting of a PEG-modified phosphatidylethanolamine, a PEG-modified phosphatidic acid, a PEG-modified ceramide, a PEG-modified dialkylamine, a PEG-modified diacylglycerol, a PEG-modified dialkylglycerol, and mixtures thereof.

In some embodiments, the lipid moiety of the PEG lipids includes those having lengths of from about $C_{14}$ to about $C_{22}$, preferably from about $C_{14}$ to about $C_{16}$. In some embodiments, a PEG moiety, for example an mPEG-$NH_2$, has a size of about 1000, 2000, 5000, 10,000, 15,000 or 20,000 daltons. In some embodiments, the PEG lipid is $PEG_{2k}$-DMG.

In some embodiments, the lipid nanoparticles described herein can comprise a PEG lipid which is a non-diffusible PEG. Non-limiting examples of non-diffusible PEGs include PEG-DSG and PEG-DSPE.

PEG lipids are known in the art, such as those described in U.S. Pat. No. 8,158,601 and International Publ. No. WO 2015/130584 A2, which are incorporated herein by reference in their entirety.

In general, some of the other lipid components (e.g., PEG lipids) of various formulae, described herein may be synthesized as described International Patent Application No. PCT/US2016/000129, filed Dec. 10, 2016, entitled "Compositions and Methods for Delivery of Therapeutic Agents," which is incorporated by reference in its entirety.

A PEG lipid is a lipid modified with polyethylene glycol. A PEG lipid may be selected from the non-limiting group including PEG-modified phosphatidylethanolamines, PEG-modified phosphatidic acids, PEG-modified ceramides, PEG-modified dialkylamines, PEG-modified diacylglycerols, PEG-modified dialkylglycerols, and mixtures thereof. In some embodiments, a PEG lipid may be PEG-c-DOMG, PEG-DMG, PEG-DLPE, PEG-DMPE, PEG-DPPC, or a PEG-DSPE lipid.

In some embodiments, PEG lipids useful in the present invention can be PEGylated lipids described in International Publication No. WO2012099755, the contents of which is herein incorporated by reference in its entirety. Any of these exemplary PEG lipids described herein may be modified to comprise a hydroxyl group on the PEG chain. In some embodiments, the PEG lipid is a PEG-OH lipid. As generally defined herein, a "PEG-OH lipid" (also referred to herein as "hydroxy-PEGylated lipid") is a PEGylated lipid having one or more hydroxyl (—OH) groups on the lipid. In some embodiments, the PEG-OH lipid includes one or more hydroxyl groups on the PEG chain. In some embodiments, a PEG-OH or hydroxy-PEGylated lipid comprises an —OH group at the terminus of the PEG chain. Each possibility represents a separate embodiment of the present invention.

In some embodiments, a PEG lipid useful in the present invention is a compound of Formula (PL-I). Provided herein are compounds of Formula (PL-I):

(PL-I)

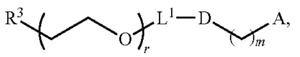

or salts thereof, wherein:

$R^3$ is —$OR^O$;

$R^O$ is hydrogen, optionally substituted alkyl, or an oxygen protecting group;

r is an integer between 1 and 100, inclusive;

$L^1$ is optionally substituted $C_{1-10}$ alkylene, wherein at least one methylene of the optionally substituted $C_{1-10}$ alkylene is independently replaced with optionally substituted carbocyclylene, optionally substituted heterocyclylene, optionally substituted arylene, optionally substituted heteroarylene, O, $N(R^N)$, S, C(O), $C(O)N(R^N)$, $NR^NC(O)$, C(O)O, OC(O), OC(O)O, —$OC(O)N(R^N)$, $NR^NC(O)O$, or $NR^NC(O)N(R^N)$;

D is a moiety obtained by click chemistry or a moiety cleavable under physiological conditions;

m is 0, 1, 2, 3, 4, 5, 6, 7, 8, 9, or 10;

A is of the formula:

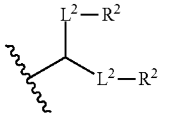

or

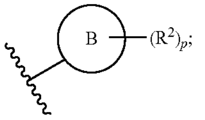

each instance of $L^2$ is independently a bond or optionally substituted $C_{1-6}$ alkylene, wherein one methylene unit of the optionally substituted $C_{1-6}$ alkylene is optionally replaced with O, $N(R^N)$, S, C(O), $C(O)N(R^N)$, $NR^NC(O)$, C(O)O, OC(O), OC(O)O, $OC(O)N(R^N)$, $NR^NC(O)O$, or $NR^NC(O)N(R^N)$;

each instance of $R^2$ is independently optionally substituted $C_{1-30}$ alkyl, optionally substituted $C_{1-30}$ alkenyl, or optionally substituted $C_{1-30}$ alkynyl; optionally wherein one or more methylene units of $R^2$ are independently replaced with optionally substituted carbocyclylene, optionally substituted heterocyclylene, optionally substituted arylene, optionally substituted heteroarylene, $N(R^N)$, O, S, C(O), $C(O)N(R^N)$, $NR^NC(O)$, $NR^NC(O)N(R^N)$, C(O)O, OC(O), OC(O)O, $OC(O)N(R^N)$, $NR^NC(O)O$, C(O)S, SC(O), $C(=NR^N)$, $C(=NR^N)N(R^N)$, —$NR^NC(=NR^N)$, $NR^NC(=NR^N)N(R^N)$, C(S), $C(S)N(R^N)$, $NR^NC(S)$, $NR^NC(S)N(R^N)$, S(O), —OS(O), S(O)O, OS(O)O, $OS(O)_2$, $S(O)_2O$, $OS(O)_2O$, $N(R^N)S(O)$, $S(O)N(R^N)$, —$N(R^N)S(O)N(R^N)$, $OS(O)N(R^N)$, $N(R^N)S(O)O$, $S(O)_2$, $N(R^N)S(O)_2$, $S(O)_2N(R^N)$, —$N(R^N)S(O)_2N(R^N)$, $OS(O)_2N(R^N)$, or $N(R^N)S(O)_2O$;

each instance of $R^N$ is independently hydrogen, optionally substituted alkyl, or a nitrogen protecting group;

Ring B is optionally substituted carbocyclyl, optionally substituted heterocyclyl, optionally substituted aryl, or optionally substituted heteroaryl; and p is 1 or 2.

In some embodiments, the compound of Formula (PL-I) is a PEG-OH lipid (i.e., $R^3$ is —$OR^O$, and $R^O$ is hydrogen). In some embodiments, the compound of Formula (PL-I) is of Formula (PL-I-OH):

(PL-I-OH)

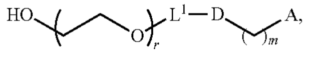

or a salt thereof.

In some embodiments, a PEG lipid useful in the present invention is a PEGylated fatty acid. In some embodiments, a PEG lipid useful in the present invention is a compound of Formula (PL-II). Provided herein are compounds of Formula (PL-II):

(PL-II)

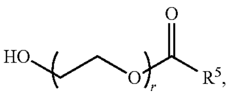

or a salts thereof, wherein:

$R^3$ is-$OR^O$;

$R^O$ is hydrogen, optionally substituted alkyl or an oxygen protecting group;

r is an integer between 1 and 100, inclusive;

$R^5$ is optionally substituted $C_{10-40}$ alkyl, optionally substituted $C_{10-40}$ alkenyl, or optionally substituted $C_{10-40}$ alkynyl; and optionally one or more methylene groups of $R^5$ are replaced with optionally substituted carbocyclylene, optionally substituted heterocyclylene, optionally substituted arylene, optionally substituted heteroarylene, $N(R^N)$, O, S, C(O), $C(O)N(R^N)$, —$NR^NC(O)$, $NR^NC(O)N(R^N)$, C(O)O, OC(O), OC(O)O, $OC(O)N(R^N)$, $NR^NC(O)O$, C(O)S, —SC(O), $C(=NR^N)$, $C(=NR^N)N(R^N)$, $NR^NC(=NR^N)$, $NR^NC(=NR^N)N(R^N)$, C(S), $C(S)N(R^N)$, —$NR^NC(S)$, $NR^NC(S)N(R^N)$, S(O), OS(O), S(O)O, OS(O)O, $OS(O)_2$, $S(O)_2O$, $OS(O)_2O$, —$N(R^N)S(O)$, $S(O)N(R^N)$, $N(R^N)S(O)N(R^N)$, $OS(O)N(R^N)$, $N(R^N)S(O)O$, $S(O)_2$, $N(R^N)S(O)_2$, —$S(O)_2N(R^N)$, $N(R^N)S(O)_2N(R^N)$, $OS(O)_2N(R^N)$, or $N(R^N)S(O)_2O$; and each instance of $R^N$ is independently hydrogen, optionally substituted alkyl, or a nitrogen protecting group.

In some embodiments, the compound of Formula (PL-II) is of Formula (PL-II-OH):

(PL-II)

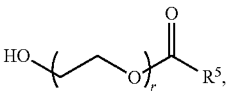

or a salt thereof. In some embodiments, r is 45.

In yet other embodiments the compound of Formula (PL-II) is:

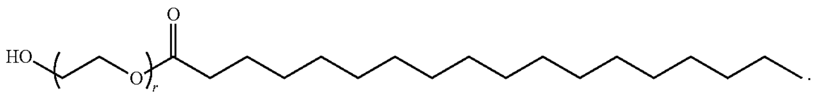

or a salt thereof.

In some embodiments, the compound of Formula (PL-II) is

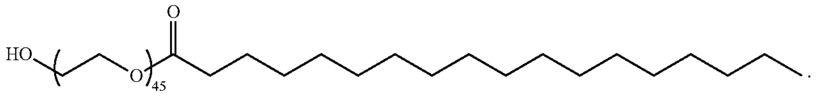

In some embodiments, the PEG lipids may be one or more of the PEG lipids described in U.S. Application No. 62/520, 530. In some embodiments, the PEG lipid is a compound of Formula (PL-III):

(PL-III)

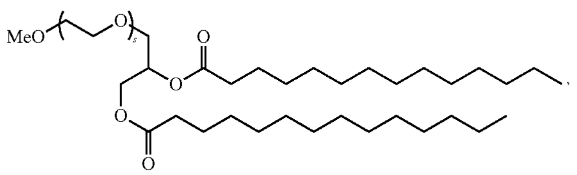

or a salt or isomer thereof, wherein s is an integer between 1 and 100.

In some embodiments, the PEG lipid is a compound of the following formula:

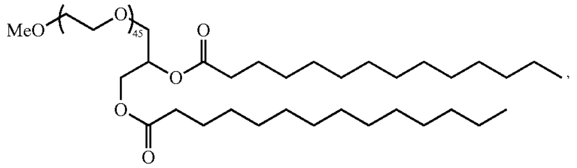

Structural Lipids

As used herein, the term “structural lipid” refers to sterols and also to lipids containing sterol moieties.

Incorporation of structural lipids in the lipid nanoparticle may help mitigate aggregation of other lipids in the particle. Structural lipids can be selected from the group including but not limited to, cholesterol, fecosterol, sitosterol, ergosterol, campesterol, stigmasterol, brassicasterol, tomatidine, tomatine, ursolic acid, alpha-tocopherol, hopanoids, phytosterols, steroids, and mixtures thereof. In some embodiments, the structural lipid is a sterol. As defined herein, “sterols” are a subgroup of steroids consisting of steroid alcohols. In some embodiments, the structural lipid is a steroid. In some embodiments, the structural lipid is cholesterol. In some embodiments, the structural lipid is an analog of cholesterol.

In some embodiments, the structural lipid is alpha-tocopherol.

In some embodiments, the structural lipids may be one or more of the structural lipids described in U.S. Application No. 62/520,530.

Phospholipids

Phospholipids may assemble into one or more lipid bilayers. In general, phospholipids comprise a phospholipid moiety and one or more fatty acid moieties.

A phospholipid moiety can be selected, for example, from the non-limiting group consisting of phosphatidyl choline, phosphatidyl ethanolamine, phosphatidyl glycerol, phosphatidyl serine, phosphatidic acid, 2-lysophosphatidyl choline, and a sphingomyelin.

A fatty acid moiety can be selected, for example, from the non-limiting group consisting of lauric acid, myristic acid, myristoleic acid, palmitic acid, palmitoleic acid, stearic acid, oleic acid, linoleic acid, alpha-linolenic acid, erucic acid, phytanoic acid, arachidic acid, arachidonic acid, eicosapentaenoic acid, behenic acid, docosapentaenoic acid, and docosahexaenoic acid.

Particular phospholipids can facilitate fusion to a membrane. In some embodiments, a cationic phospholipid can interact with one or more negatively charged phospholipids of a membrane (e.g., a cellular or intracellular membrane). Fusion of a phospholipid to a membrane can allow one or more elements (e.g., a therapeutic agent) of a lipid-containing composition to pass through the membrane permitting, e.g., delivery of the one or more elements to a target tissue.

Non-natural phospholipid species including natural species with modifications and substitutions including branching, oxidation, cyclization, and alkynes are also contemplated. In some embodiments, a phospholipid can be functionalized with or cross-linked to one or more alkynes (e.g., an alkenyl group in which one or more double bonds is replaced with a triple bond). Under appropriate reaction conditions, an alkyne group can undergo a copper-catalyzed cycloaddition upon exposure to an azide.

Phospholipids include, but are not limited to, glycerophospholipids such as phosphatidylcholines, phosphatidylethanolamines, phosphatidylserines, phosphatidylinositols, phosphatidy glycerols, and phosphatidic acids. Phospholipids also include phosphosphingolipid, such as sphingomyelin.

In some embodiments, a phospholipid useful or potentially useful in the present invention is an analog or variant of DSPC. In some embodiments, a phospholipid useful or potentially useful in the present invention is a compound of Formula (PL-I):

(PL-I)

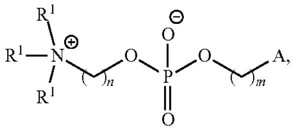

or a salt thereof, wherein:

each $R^1$ is independently optionally substituted alkyl; or optionally two $R^1$ are joined together with the intervening atoms to form optionally substituted monocyclic carbocyclyl or optionally substituted monocyclic heterocyclyl; or optionally three $R^1$ are joined together with the intervening atoms to form optionally substituted bicyclic carbocyclyl or optionally substitute bicyclic heterocyclyl;

n is 1, 2, 3, 4, 5, 6, 7, 8, 9, or 10;

m is 0, 1, 2, 3, 4, 5, 6, 7, 8, 9, or 10;

A is of the formula:

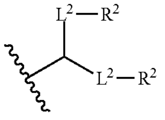

or

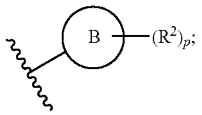

each instance of $L^2$ is independently a bond or optionally substituted $C_{1-6}$ alkylene, wherein one methylene unit of the optionally substituted $C_{1-6}$ alkylene is optionally replaced with —O—, —N($R^N$)—, —S—, —C(O)—, —C(O)N($R^N$)—, —$NR^N$C(O—, —C(O)O—, —OC(O—, —OC(O)O—, —OC(O)N($R^N$)—, —$NR^N$C(O)O—, or —$NR^N$C(O)N($R^N$)—;

each instance of $R^2$ is independently optionally substituted $C_{1-30}$ alkyl, optionally substituted $C_{1-30}$ alkenyl, or optionally substituted $C_{1-30}$ alkynyl; optionally wherein one or more methylene units of $R^2$ are independently replaced with optionally substituted carbocyclylene, optionally substituted heterocyclylene, optionally substituted arylene, optionally substituted heteroarylene, —N($R^N$)—, —O—, —S—, —C(O)—, —C(O)N($R^N$)—, —$NR^N$C(O)—, —$NR^N$C(O)N($R^N$)—, —C(O)O—, —OC(O)—, —OC(O)O—, —OC(O)N($R^N$)—, —$NR^N$C(O)O—, —C(O)S—, —SC(O)—, —C(=$NR^N$)—, —C(=$NR^N$)N($R^N$)—, —$NR^N$C(=$NR^N$)—, —$NR^N$C(=$NR^N$)N($R^N$)—, —C(S)—, —C(S)N($R^N$)—, —$NR^N$C(S)—, —$NR^N$C(S)N($R^N$)—, —S(O—, —S(O—, —S(O)O—, —S(O)O—, —OS($O)_2$—, —S$(O)_2$O—, —OS$(O)_2$O—, —N($R^N$)S(O)—, —S(O)N($R^N$)—, —N($R^N$)S(O)N($R^N$)—, —OS(O)N($R^N$)—, —N($R^N$)S(O)O—, —S$(O)_2$—, —N($R^N$)S$(O)_2$—, —S$(O)_2$N($R^N$)—, —N($R^N$)S$(O)_2$N($R^N$)—, —OS$(O)_2$N($R^N$)—, or —N($R^N$)S$(O)_2$O—;

each instance of $R^N$ is independently hydrogen, optionally substituted alkyl, or a nitrogen protecting group;

Ring B is optionally substituted carbocyclyl, optionally substituted heterocyclyl, optionally substituted aryl, or optionally substituted heteroaryl; and p is 1 or 2;

provided that the compound is not of the formula:

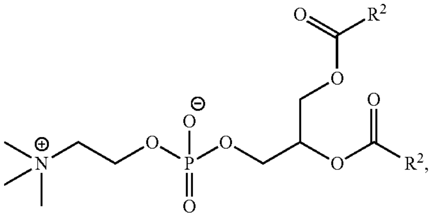

wherein each instance of $R^2$ is independently unsubstituted alkyl, unsubstituted alkenyl, or unsubstituted alkynyl.

In some embodiments, the phospholipids may be one or more of the phospholipids described in U.S. Application No. 62/520,530.

i) Phospholipid Head Modifications

In some embodiments, a phospholipid useful or potentially useful in the present invention comprises a modified phospholipid head (e.g., a modified choline group). In some embodiments, a phospholipid with a modified head is DSPC, or analog thereof, with a modified quaternary amine. In some embodiments, in embodiments of Formula (PL-I), at least one of $R_1$ is not methyl. In some embodiments, at least one of $R^1$ is not hydrogen or methyl. In some embodiments, the compound of Formula (PL-I) is of one of the following formulae:

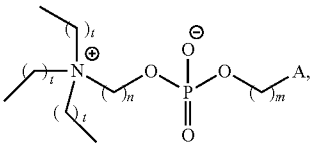

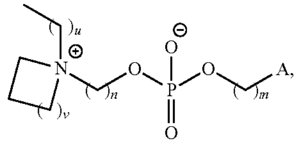

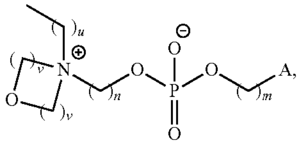

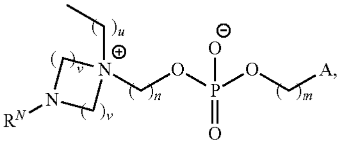

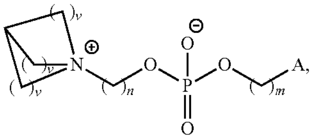

or a salt thereof, wherein:

each t is independently 1, 2, 3, 4, 5, 6, 7, 8, 9, or 10;

each u is independently 0, 1, 2, 3, 4, 5, 6, 7, 8, 9, or 10; and each v is independently 1, 2, or 3.

In some embodiments, a compound of Formula (PL-I) is of Formula (PL-I-a):

(PL-I-a)

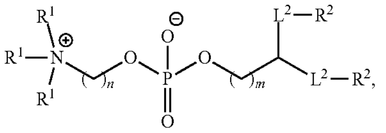

or a salt thereof.

In some embodiments, a phospholipid useful or potentially useful in the present invention comprises a cyclic moiety in place of the glyceride moiety. In some embodiments, a phospholipid useful in the present invention is DSPC, or analog thereof, with a cyclic moiety in place of the glyceride moiety. In some embodiments, the compound of Formula (PL-I) is of Formula (PL-I-b):

(PL-I-b)

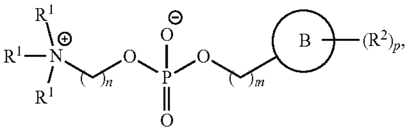

or a salt thereof.

(ii) Phospholipid Tail Modifications

In some embodiments, a phospholipid useful or potentially useful in the present invention comprises a modified tail. In some embodiments, a phospholipid useful or potentially useful in the present invention is DSPC, or analog thereof, with a modified tail. As described herein, a "modified tail" may be a tail with shorter or longer aliphatic chains, aliphatic chains with branching introduced, aliphatic chains with substituents introduced, aliphatic chains wherein one or more methylenes are replaced by cyclic or heteroatom groups, or any combination thereof. In some embodiments, In some embodiments, the compound of (PL-I) is of Formula (PL-I-a), or a salt thereof, wherein at least one instance of $R^2$ is each instance of $R^2$ is optionally substituted $C_{1-30}$ alkyl, wherein one or more methylene units of $R^2$ are independently replaced with optionally substituted carbocyclylene, optionally substituted heterocyclylene, optionally substituted arylene, optionally substituted heteroarylene, —N($R^N$)—, —O—, —S—, —C(O)—, —C(O)N($R^N$)—, —$NR^N$C(O)—, —$NR^N$C(O)N($R^N$—, —C(O)O—, —OC(O—, —OC(O)O—, —OC(O)N($R^N$)—, —$NR^N$C(O)O—, —C(O)S—, —SC(O)—, —C(=$NR^N$)—, —C(=$NR^N$)N($R^N$)—, —$NR^N$C(=$NR^N$)—, —$NR^N$C(=$NR^N$)N($R^N$)—, —C(S)—, —C(S)N($R^N$)—, —$NR^N$C(S)—, —$NR^N$C(S)N($R^N$)—, —S(O)—, —OS(O)—, —S(O)O—, —OS(O)O—, —$OS(O)_2$—, —$S(O)_2O$—, —$OS(O)_2O$—, —N($R^N$)S(O)—, —S(O)N($R^N$)—, —N($R^N$)S(O)N($R^N$)—, —OS(O)N($R^N$)—, —N($R^N$)S(O)O—, —$S(O)_2$—, —N($R^N$)$S(O)_2$—, —$S(O)_2$N($R^N$)—, —N($R^N$)$S(O)_2$N($R^N$—, —$OS(O)_2$N($R^N$)—, or —N($R^N$)$S(O)_2O$—.

In some embodiments, the compound of Formula (PL-I) is of Formula (PL-I-c):

(PL-I-c)

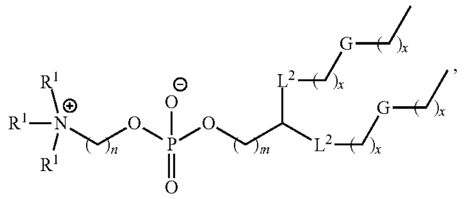

or a salt thereof, wherein:

each x is independently an integer between 0-30, inclusive; and each instance is G is independently selected from the group consisting of optionally substituted carbocyclylene, optionally substituted heterocyclylene, optionally substituted arylene, optionally substituted heteroarylene, —N($R^N$)—, —O—, —S—, —C(O)—, —C(O)N($R^N$)—, —$NR^N$C(O)—, —$NR^N$C(O)N($R^N$)—, —C(O)O—, —OC(O)—, —OC(O)O—, —OC(O)N($R^N$)—, —$NR^N$C(O)O—, —C(O)—, —SC(O)—, —C(=$NR^N$)—, —C(=$NR^N$)N($R^N$)—, —$NR^N$C(=$NR^N$)—, —$NR^N$C(=$NR^N$)N($R^N$)—, —C(S)—, —C(S)N($R^N$)—, —$NR^N$C(S)—, —$NR^N$C(S)N($R^N$—, —S(O—, —OS(O—, —S(O)O—, —OS(O)O—, —$OS(O)_2$—, —$S(O)_2O$—, —$OS(O)_2O$—, —N($R^N$)S(O)—, —S(O)N($R^N$)—, —N($R^N$)S(O)N($R^N$)—, —OS(O)N($R^N$)—, —N($R^N$)S(O)O—, —$S(O)_2$—, —N($R^N$)$S(O)_2$—, —$S(O)_2$N($R^N$)—, —N($R^N$)$S(O)_2$N($R^N$)—, —$OS(O)_2$N($R^N$)—, or —N($R^N$)$S(O)_2O$—. Each possibility represents a separate embodiment of the present invention.

In some embodiments, a phospholipid useful or potentially useful in the present invention comprises a modified phosphocholine moiety, wherein the alkyl chain linking the quaternary amine to the phosphoryl group is not ethylene (e.g., n is not 2). Therefore, In some embodiments, a phospholipid useful or potentially useful in the present invention is a compound of Formula (PL-I), wherein n is 1, 3, 4, 5, 6, 7, 8, 9, or 10. In some embodiments, In some embodiments, a compound of Formula (PL-I) is of one of the following formulae:

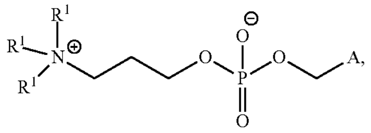

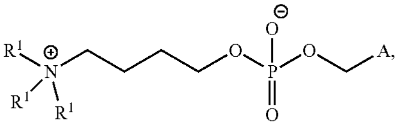

or a salt thereof.

Alternative Lipids

In some embodiments, an alternative lipid is used in place of a phospholipid of the present disclosure. Non-limiting examples of such alternative lipids include the following:

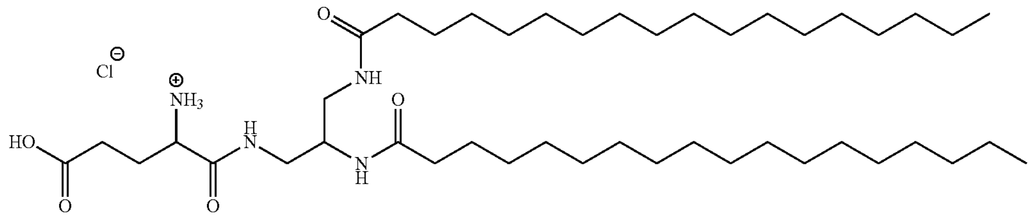

,

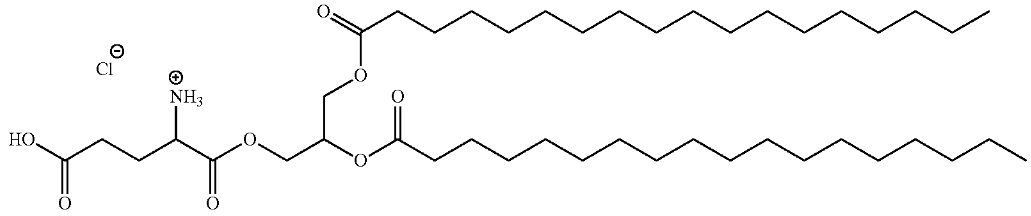

,

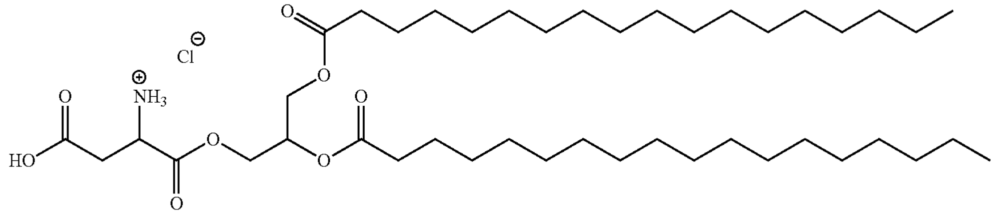

,

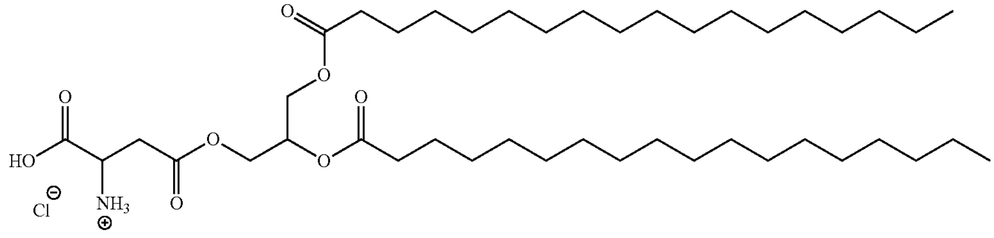

,

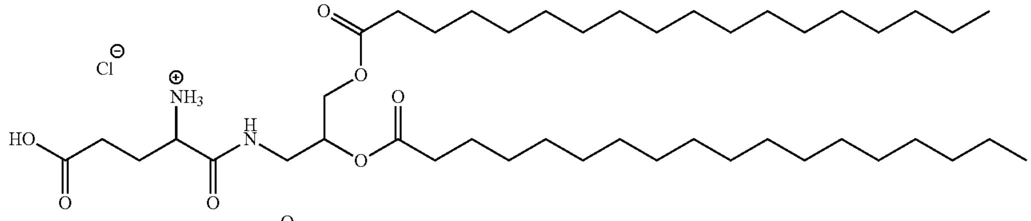

,

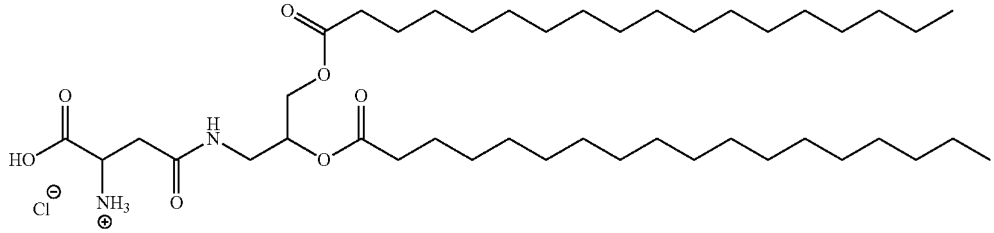

, and

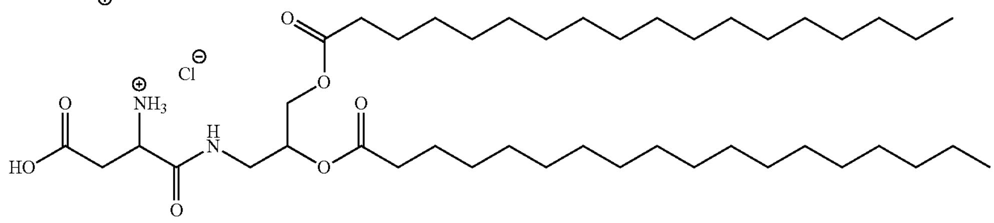

.

EQUIVALENT

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements from any other disclosed methods, systems, and devices, including any and all elements corresponding to target particle separation, focusing/concentration. In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

The invention claimed is:

1. A system, comprising:

a first vortex mixer comprising:

a first vortex mixing chamber having a first wall, a second wall, and a side wall connecting the first wall and the second wall;

at least two inlet ports configured along the side wall, each inlet port having an inlet channel connected thereto, the at least two inlet ports approximately equally spaced around the first vortex mixing chamber and configured tangentially to the first vortex mixing chamber;

an additional inlet port configured approximately at a radial center of the first wall; and an exit port having an exit channel connected thereto, the exit port configured approximately at a radial center of the second wall, the exit channel extending from the exit port and away from the first vortex mixing chamber;

a splitter having an inlet, a first outlet, and a second outlet, the first outlet connected to a first of the at least two inlet ports of the first vortex mixer, and the second outlet connected to a second of the at least two inlet ports of the first vortex mixer; and a second vortex mixer, comprising:

a second vortex mixing chamber having a first wall, a second wall, and a side wall connecting the first wall and the second wall;

at least two inlet ports configured along the side wall, each inlet port having an inlet channel connected thereto, the at least two inlet ports approximately equally spaced around the second vortex mixing chamber and configured tangentially to the second vortex mixing chamber; and an exit port having an exit channel connected thereto, the exit port configured approximately at a radial center of the second wall, the exit channel extending from the exit port away from the second vortex mixing chamber;

wherein the splitter is configured at an end of the exit channel extending from the second vortex mixer exit port.

2. The system of claim 1, wherein the first vortex mixing chamber is round and the side wall extends around the circumference of the first wall and the second wall.

3. The system of claim 1, wherein each inlet channel from the first vortex mixer receives fluid from a single source.

4. The system of claim 1, wherein the inlet channel connected to the first of the at least two inlet ports of the first vortex mixer is perpendicular to the first outlet of the splitter and the inlet channel connected to the second of the at least two inlet ports of the first vortex mixer is perpendicular to the second outlet of the splitter.

5. The system of claim 1, wherein each inlet channel of the second vortex mixer receives fluid from a single source.

6. The system of claim 1, wherein each inlet channel of the second vortex mixer receives fluid from a different source.

7. The system of claim 1, wherein the additional inlet port is connected to an additional inlet channel.

8. The system of claim 7, wherein the additional inlet channel is approximately perpendicular to (1) the inlet channel connected to the first of the at least two inlet ports of the first vortex mixer, and (2) the inlet channel connected to the second of the at least two inlet ports of the first vortex mixer.

9. The system of claim 1, wherein the second vortex mixer has four inlet ports.

10. The system of claim 9, wherein a first two of the four inlet ports of the second vortex mixer receive fluid from a first source, and a second two of the four inlet ports of the second vortex mixer receive fluid from a second source.

11. The system of claim 1, wherein the first vortex mixer has four inlet ports.

12. The system of claim 11, wherein a first two of the four inlet ports receive fluid from a first source and a second two of the four inlet ports receive fluid from a second source.

13. The system of claim 12, wherein the first two inlet ports are configured opposite each other and the second two inlet ports are configured opposite each other, such that the first two inlet ports are about 180 degrees apart and the second two inlet ports are about 180 degrees apart, and each of the first two inlet ports is about 90 degrees from each of the second two inlet ports.

14. A system, comprising:

a first vortex mixer, the first vortex mixer comprising:

a first vortex mixing chamber having a first wall, a second wall, and a side wall connecting the first wall and the second wall;

at least two primary inlet ports configured along the side wall, each primary inlet port having a primary inlet channel connected thereto, the at least two primary inlet ports approximately equally spaced around the first vortex mixing chamber and configured tangentially to the first vortex mixing chamber;

a secondary inlet port configured approximately at a radial center of the first wall having a secondary inlet channel connected thereto; and an exit port having an exit channel connected thereto, said exit port configured approximately at a radial center of the second wall, the exit channel extending from the exit port and away from the first vortex mixing chamber;

a splitter having an inlet, a first outlet, and a second outlet, the first outlet connected to a first of the at least two primary inlet ports of the first vortex mixer, and the second outlet connected to a second of the at least two primary inlet ports of the first vortex mixer; and a second vortex mixer, the second vortex mixer comprising:

a second vortex mixing chamber having a first wall, a second wall, and a side wall connecting the first wall and the second wall;

four inlet ports configured along the side wall, each inlet port having an inlet channel connected thereto, the four inlet ports approximately equally spaced around the second vortex mixing chamber and configured tangentially to the second vortex mixing chamber; and an exit port having an exit channel connected thereto, the exit port configured approximately at a radial center of the second wall, the exit channel extending from the exit port away from the second vortex mixing chamber;

wherein the splitter is configured at an end of the exit channel extending from the second vortex mixer exit port.

15. The system of claim 14, wherein the first vortex mixing chamber is round and the side wall extends around the circumference of the first wall and the second wall.

16. The system of claim 14, wherein each primary inlet channel from the first vortex mixer receives fluid from a single source.

17. The system of claim 14, wherein the primary inlet channel connected to the first of the at least two primary inlet ports of the first vortex mixer is perpendicular to the first outlet of the splitter and the primary inlet channel connected to the second of the at least two primary inlet ports of the first vortex mixer is perpendicular to the second outlet of the splitter.

18. The system of claim 14, wherein a first two of the four inlet ports of the second vortex mixer receive fluid from a first source, and a second two of the four inlet ports of the second vortex mixer receive fluid from a second source.

19. The system of claim 14, wherein the first vortex mixer has four primary inlet ports.

20. The system of claim 19, wherein a first two of the four primary inlet ports receive fluid from a first source, a second two of the four primary inlet ports receive fluid from a second source and the secondary inlet port receives fluid from a third source.

21. The system of claim 20, wherein the first two primary inlet ports are configured opposite each other and the second two primary inlet ports are configured opposite each other, such that the first two primary inlet ports are about 180 degrees apart and the second two primary inlet ports are about 180 degrees apart, and each of the first two primary inlet ports is about 90 degrees from each of the second two primary inlet ports.

22. A mixing method comprising:

receiving, along a curved sidewall of a first vortex mixing chamber and from at least two inlet ports, a first fluid;

receiving, along the curved sidewall of the first vortex mixing chamber and from at least two inlet ports, a second fluid;

mixing the first fluid and the second fluid in the first vortex mixing chamber to form a first outflow fluid;

outflowing the first outflow fluid into a first exit channel;

splitting the first outflow fluid into at least two channels via a splitter;

receiving, along a curved sidewall of a second vortex mixing chamber, the first outflow fluid from at least two inlet ports connected to the at least two channels;

receiving, at an additional inlet port configured approximately at a radial center of a first wall of the second vortex mixing chamber, a third fluid;

mixing the outflow fluid and the third fluid in the second vortex mixing chamber to form a second outflow fluid; and outflowing the second outflow fluid into a second exit channel.

23. The mixing method of claim 22, wherein the first fluid comprises a buffer and the second fluid comprises a lipid mixture, and wherein the first outflow fluid comprises empty nanoparticles.

24. The mixing method of claim 23, wherein the third fluid comprises nucleic acid, and wherein the second outflow fluid comprises nucleic acid-holding nanoparticles.

25. The mixing method of claim 24, wherein the nucleic acid integrates into the nanoparticles by at least one of hydrophobic interaction and charged interaction.

26. The mixing method of claim 24, wherein formation of empty nanoparticles in the first vortex mixing chamber prior to the nucleic acid being received in the second vortex mixing chamber prevents direct exposure of the nucleic acid to the buffer before it is mixed with the lipid mixture.

27. The mixing method of claim 26, wherein preventing direct exposure of the nucleic acid to the buffer prevents at least one of acidification and degradation of the nucleic acid.

28. The mixing method of claim 26, wherein the nucleic acid is RNA.

* * * * *

```
                          SEQUENCE LISTING


<160> NUMBER OF SEQ ID NOS: 2

<210> SEQ ID NO 1
<211> LENGTH: 24
<212> TYPE: DNA
<213> ORGANISM: Artificial Sequence
<220> FEATURE:
<223> OTHER INFORMATION: Artificial Polynucleotide

<400> SEQUENCE: 1

caaaggctct tttcagagcc acca                                        24


<210> SEQ ID NO 2
<211> LENGTH: 24
<212> TYPE: RNA
<213> ORGANISM: Artificial Sequence
<220> FEATURE:
<223> OTHER INFORMATION: Artificial Polynucleotide

<400> SEQUENCE: 2

caaaggcucu uuucagagcc acca                                        24
```